United States Patent
Gao et al.

(10) Patent No.: US 11,659,175 B2
(45) Date of Patent: May 23, 2023

(54) CODING METHOD, DEVICE, SYSTEM WITH MERGE MODE

(71) Applicant: HUAWEI TECHNOLOGIES CO., LTD., Guangdong (CN)

(72) Inventors: Han Gao, Munich (DE); Semih Esenlik, Munich (DE); Biao Wang, Shenzhen (CN); Anand Meher Kotra, Munich (DE); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 140 days.

(21) Appl. No.: 17/245,037

(22) Filed: Apr. 30, 2021

(65) Prior Publication Data

US 2021/0266538 A1    Aug. 26, 2021

Related U.S. Application Data

(63) Continuation of application No. PCT/CN2019/012295, filed on Dec. 4, 2019.
(Continued)

(51) Int. Cl.
*H04N 19/119* (2014.01)
*H04N 19/132* (2014.01)
(Continued)

(52) U.S. Cl.
CPC ......... *H04N 19/119* (2014.11); *H04N 19/132* (2014.11); *H04N 19/159* (2014.11); *H04N 19/176* (2014.11); *H04N 19/96* (2014.11)

(58) Field of Classification Search
CPC .. H04N 19/119; H04N 19/132; H04N 19/159; H04N 19/176; H04N 19/96; H04N 19/105; H04N 19/136
See application file for complete search history.

(56) References Cited

U.S. PATENT DOCUMENTS

2017/0347096 A1   11/2017   Hong et al.
2017/0347128 A1   11/2017   Panusopone et al.
(Continued)

FOREIGN PATENT DOCUMENTS

CN      103888763 A      6/2014
WO      2018142903 A1    8/2018

OTHER PUBLICATIONS

Bross et al., "Versatile Video Coding (Draft 2)," Joint Video Experts Team (JVET) of ITU-T SG 16 WP 3 and ISO/IEC JTC 1/SC 29/WG 11, Document: JVET-K1001-v4, 11th Meeting: Ljubljana, SI, Jul. 10-18, 2018, 86 pages.
(Continued)

*Primary Examiner* — Nam D Pham
(74) *Attorney, Agent, or Firm* — Fish & Richardson P.C.

(57) ABSTRACT

Methods, systems, and computer programs encoded on a computer storage medium for marking the availability of a potential candidate coding block for intra prediction mode estimation of a current coding block are provided. One example method includes obtaining a parent block of a current coding block (parentCurr), and a parent block of a candidate coding block (parentCand). The current coding block and the candidate coding block are each obtained by splitting of the parentCurr and the parentCand, respectively. In one aspect, the current coding block cannot use an intra prediction mode of a potential candidate coding block when parentCand and parentCurr are the same block, a function of a number of quadtree, ternary tree, and binary tree splitting operations is greater than a threshold minus 1, and a split mode of the parent block of the current coding block parentCurr is a ternary tree split.

15 Claims, 31 Drawing Sheets

Related U.S. Application Data

(60) Provisional application No. 62/808,254, filed on Feb. 20, 2019, provisional application No. 62/800,362, filed on Feb. 1, 2019, provisional application No. 62/777,740, filed on Dec. 10, 2018, provisional application No. 62/775,853, filed on Dec. 5, 2018.

(51) Int. Cl.
    *H04N 19/159* (2014.01)
    *H04N 19/176* (2014.01)
    *H04N 19/96* (2014.01)

(56) References Cited

U.S. PATENT DOCUMENTS

2018/0242024 A1  8/2018  Chen et al.
2018/0359491 A1* 12/2018  Kang ................... H04N 19/186

OTHER PUBLICATIONS

Chen et al., "CE4-related: Shared merge list," Joint Video Experts Team (JVET) of ITU-T SG 16 WP 3 and ISO/IEC JTC 1/SC 29/WG11, Document: JVET-L0091-v2, 12th Meeting: Macao, CN, Oct. 3-12, 2018, 4 pages.

Ding et al., "a Fast Intra Mode Decision Scheme for HEVC," 2014 International Conference on Digital Home, Nov. 28, 2014, 4 pages.

Extended European Search Report issued in European Application No. 19893611.4 dated Aug. 20, 2021, 8 pages.

ITU-T H.263 (Jan. 2005), "Series H: Audiovisual and Multimedia Systems, Infrastructure of audiovisual services—Coding of moving video, Video coding for low bit rate communication," Jan. 2005, 226 pages.

ITU-T H.223 (Jul. 2001), "Series H: Audiovisual and Multimedia Systems, Infrastructure of audiovisual services—Transmission multiplexing and synchronization. Multiplexing protocol for low bit rate multimedia communication," Jul. 2001, 74 pages.

ITU-T H.264 (Apr. 2017), "Series H: Audiovisual and Multimedia Systems, Infrastructure of audiovisual services—Coding of moving video, Advanced video coding for generic audiovisual services," Apr. 2017, 812 pages.

ITU-T H.265 (Feb. 2018), "Series H: Audiovisual and Multimedia Systems Infrastructure of audiovisual services—Coding of moving video, High efficiency video coding," Feb. 2018, 692 pages.

Jeong et al., "CE4 Ultimate motion vector expression in J0024 (Test 4.2.9)," Joint Video Experts Team (JVET) of ITU-T SG 16 WP 3 and ISO/IEC JTC 1/SC 29/WG 11, Document: JVET-K0115-v4, 11th Meeting: Ljubljana, SI, Jul. 10-18, 2018, 7 pages.

PCT International Search Report and Written Opinion issued in International Application No. PCT/CN2019/122958 dated Feb. 26, 2020, 9 pages (English translation).

Zhang et al., "CE4-related: History-based Motion Vector Prediction," Joint Video Experts Team (JVET) of ITU-T SG 16 WP 3 and ISO/IEC JTC 1/SC 29/WG 11, Document: JVET-K0104-v5, 11th Meeting: Ljubljana, SI, Jul. 10-18, 2018, 7 pages.

* cited by examiner

FIG. 16

MPM (Most Probable Mode) list construction in VVC, the MPM list of the current block is constructed based on the intra modes of neighboring left and above blocks.

(a)               (b)               (c)

CODING METHOD, DEVICE, SYSTEM WITH MERGE MODE

CROSS-REFERENCE TO RELATED APPLICATIONS

This application is a continuation of International Application No. PCT/CN2019/122958, filed on Dec. 4, 2019, which claims priority from U.S. provisional Application No. 62/775,853, filed on Dec. 5, 2018 and U.S. provisional Application No. 62/777,740, filed on Dec. 10, 2018 and U.S. provisional Application No. 62/800,362, filed on Feb. 1, 2019 and U.S. provisional Application No. 62/808,254, filed on Feb. 20, 2019. All of the aforementioned patent applications are hereby incorporated by reference in their entireties.

TECHNICAL FIELD

The embodiments of the present application (disclosure) generally relates to the field of video coding and more particularly to the field of merge mode.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable. High Efficiency Video Coding is the latest video compression issued by ISO/IEC Moving Picture Experts Group and ITU-T Video Coding Experts Group as ISO/IEC 23008-2 MPEG-H Part 2 or called ITU-T H.265, and offers about double the data compression ratio at the same level of video quality, or substantially improved video quality at the same bit rate. Several coding tools were developed and adopted by HEVC, and one of them is merge mode that is used in the inter-prediction to estimate a proper motion vector (MV) for current prediction block from spatial or temporal candidate blocks. Specifically, the merge mode in Merge mode in HEVC is composed of 2 parts:

First Part:

Merge list construction which includes:

(1) inserting motion information of spatial candidates: up to four candidates are inserted in the merge list by sequentially checking A1, B1, B0, A0 and B2;

(2) one temporal merge candidate is derived from two temporal, co-located blocks;

(3) additional merge candidates including combined bi-predictive candidates; and (4) zero motion vector candidates.

Second Part:

Index signaling, one entry that in the merge list is selected as the motion information of the current block and signaled to a decoding side to deriving the MV of current prediction block correspondingly.

A parallel merge estimation level was introduced in HEVC that indicates the region in which merge candidate lists can be independently derived by checking whether a candidate block is located in that merge estimation region (MER). A candidate block that is in the same MER is not included in the merge candidate list. Hence, its motion data does not need to be available at the time of the list construction. When this level is e.g. 32, all prediction units in a 32×32 area can construct the merge candidate list in parallel since all merge candidates that are in the same 32×32 MER, are not inserted in the list. As shown in FIG. 6, there is a CTU partitioning with seven CUs and ten PUs. All potential merge candidates for the first PU0 are available because they are outside the first 32×32 MER. For the second MER, merge candidate lists of PUs 2-6 cannot include motion data from these PUs when the merge estimation inside that MER should be independent. Therefore, when looking at a PU5 for example, no merge candidates are available and hence not inserted in the merge candidate list. In that case, the merge list of PU5 consists only of the temporal candidate (if available) and zero MV candidates. In order to enable an encoder to trade-off parallelism and coding efficiency, the parallel merge estimation level is adaptive and signaled as log 2_parallel_merge_level_minus2 in the picture parameter set.

In HEVC quad tree (QT) partitions are used, that always result in partitions that satisfy one of the following conditions (where N is 4, 8, 16, 32 or 64). All of the samples of a coding block are contained in an N×N region. All of the samples of an N×N region are contained in a coding block. However, in the newest developing of Versatile Video Coding, those conditions the merge mode relays on are not always satisfied because new partitions patterns are used, for instance, Binary-Tree BT and Triple-Tree (TT) partitions are allowed with which non-square partition is allowed, and the checking of whether a candidate block belongs to a MER is not accurately applicable anymore and the coding performance is degenerated, especially the parallel processing the merge estimation will be severely impacted. Three different scenarios are chosen to show how does the MER based merge estimation in HEVC impact the parallelism of the merge estimation in VVC.

Scenario 1:

FIG. 7 illustrate a partition result based on partition modes allowed in VVC, If a top-left sample of blk1 (A) and a top-left sample of blk2 (B) are in same MER (N×N grid), then motion information of blk1 is set unavailable for prediction by blk2 whit a processing order blk1→blk2. Based on the MER based estimation in HEVC, the for prediction dependencies of coding blocks A, B, C, and D are: C can predict from B.

D can predict from C.

B can predict from A.

C cannot predict from A.

However, based on HEVC, none pair of those coding blocks can be processed in parallel with the proceeding order A→B→C→D.

According to the HEVC rule, two blocks are considered to be in the same MER if their top-left coordinates are in the same MER. Block B can predict from block A (since they are in different MER). Therefore block B needs to wait for block A to be available, hence they cannot be processed in parallel. Block D can predict from block C (since they are in different MER), hence they cannot be processed in parallel. Block C cannot predict from block A (since they are in the same MER), however C and A still cannot be processed in parallel since block C can predict from block B, and block B can predict from block A. Therefore, in Scenario 1, parallel processing of those coding block is impossible which will cost more coding time to do the merge estimation for each of those coding blocks.

Scenario 2:

FIG. 8 illustrate anther partition result based on partition modes allowed in VVC, where only coding blocks A and B can be processed in parallel with a processing order A→B→C→D→E→F. According to the HEVC rule, two blocks are considered to be in the same MER if their top-left coordinates are in the same MER, therefore, coding blocks C and E are supposed to be processed in parallel. As contrast, in this scenario 2, coding blocks C and E cannot be processed in parallel although they are in the same MER because coding block E can predict from coding block D, and coding block D can predict from coding block C which results the later one coding block waiting until the prior one's MV according to the processing order is available. Therefore, in Scenario 1, parallel processing of those coding block is limited which will still cost more coding time to do the merge estimation for those coding blocks.

Scenario 3:

FIG. 9 illustrate anther partition result based on partition modes allowed in VVC, where none pair of coding blocks can be processed in parallel. Based on the HEVC rule, coding block C cannot predict from coding block A, but coding block C and coding block A still cannot be processed in parallel, since coding block C can predict from coding block B and coding block B can predict from coding block A. Based on the HEVC rule, coding block D cannot predict from coding block B, but coding block B and coding block D still cannot be processed in parallel, since coding block C can predict from coding block B and coding block D can predict from coding block C. Therefore, in similar as Scenario 1, in Scenario 3, parallel processing of those coding block is impossible which will cost more coding time to do the merge estimation for each of those coding blocks.

SUMMARY

Embodiments of the present application (or the present disclosure) provide inter prediction apparatuses and methods for encoding and decoding an image which can mitigate even eliminate the problem mentioned above.

The present disclosure provides a method of coding implemented by an encoding/decoding device for marking the availability of a potential candidate coding block for merge estimation of a current coding block. The method includes, based on a predefined principle which is made based on the closeness of two respective points within the potential candidate coding block and the current coding block, adoptively obtaining the coordination (x, y) of a specific of the current coding block, and the coordination of a specific point in the potential candidate coding block, wherein the coordination of the specific point in the potential candidate coding block is (x1, y1), marking the potential candidate coding block as unavailable, if floor(x1/mer_width) is equal to floor(x/mer_width), or if floor(y1/mer_height) is equal to floor(y/mer_height), where the mer_width and mer_height are the width and height of a merge estimation region (MER), and the function that takes as input a real number X and gives as output the greatest integer less than or equal to X.

Specifically, the method comprising: obtaining the coordination (x, y) of a corner of the current coding block, and the coordination of a specific point in the potential candidate coding block, wherein the coordination of the specific point in the potential candidate coding block is (x+a, y+b), a∈(−1,0,1), b∈(−1,0,1), and a and b are selected depends on the relationship of the relative position between the potential candidate coding block and the current coding block, and for one potential candidate coding block, one value from (−1, 0,1) is selected as the a, and one value from the (−1,0,1) is selected as the b; marking the potential candidate coding block as unavailable, if floor((x+a)/mer_width) is equal to floor(x/mer_width), or if floor((y+b)/mer_height) is equal to floor(y/mer_height), where the mer_width and mer_height are the width and height of a merge estimation region (MER), and the function that takes as input a real number X and gives as output the greatest integer less than or equal to X.

Alternatively, the present disclosure further provides a method of coding implemented by a decoding device for marking the availability of a potential candidate coding block for merge estimation of a current coding block. The method includes, obtaining the coordination (x, y) of a corner of the current coding block, and the coordination of a specific point in the potential candidate coding block, wherein the coordination of the specific point in the potential candidate coding block is the coordination (x1, y1) of the bottom right corner of the potential candidate coding block or the top-left corner of the potential candidate coding block, marking the potential candidate coding block as unavailable, if floor(x1/mer_width) is equal to floor(x/mer_width), or if floor(y1/mer_height) is equal to floor(y/mer_height), where the mer_width and mer_height are the width and height of a merge estimation region (MER), and the function that takes as input a real number X and gives as output the greatest integer less than or equal to X.

Alternatively, the condition used for marking the unavailability of the potential candidate coding block could be extended as if floor((x+a)/mer_width) is equal to floor(x/mer_width) and floor((y+b)/mer_height)>=floor(y/mer_height) or if floor((y+b)/mer_height) is equal to floor(y/mer_height) and floor((x+a)/mer_width)>=floor(x/mer_width).

Alternatively, the condition used for marking the unavailability of the potential candidate coding block could be extended as if floor(x1/mer_width) is equal to floor(x/mer_width) and floor(y1/mer_height)>=floor(y/mer_height) or if floor(y1/mer_height) is equal to floor(y/mer_height) and floor(x1/mer_width)>=floor(x/mer_width).

Alternatively, the present disclosure further provides a method of coding implemented by a encoding/decoding device for marking the availability of a potential candidate coding block for merge estimation of a current coding block. The method includes, obtaining the coordination (x, y) of a corner of the current coding block, and the coordination of a specific point in the potential candidate coding block, wherein the coordination of the specific point in the potential candidate coding block is (x+a, y+b), a∈(−1,0,1), b∈(−1,0, 1), and a and b are selected depends on the relationship of the relative position between the potential candidate coding block and the current coding block, and for one potential candidate coding block, one value from (−1,0,1) is selected as the a, and one value from the (−1,0,1) is selected as the b; marking the potential candidate coding block as unavailable, when the (x, y) and the (x+a, y+b) are located within one merge estimation region (MER), and the cqtDepth of the current coding block is greater or equal to a threshold, where the cqtDepth is a parameter that decide the quad-tree partition depth of a coding tree block to which the current coding block belongs. Alternatively, if the potential candidate coding block comes from a history list, then the coordination of the specific point in the potential candidate coding block is the coordination (x1, y1) of the top-left corner of the potential candidate coding block, or the bottom-right corner of the potential candidate coding block.

The present disclosure further provides a decoding device and an encoding device for performing the methods above.

By the disclosure provided above, more coding blocks can be parallel processed during the merge estimation, therefore improving the performance of coding/decoding technology, especially, the VVC.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 16:
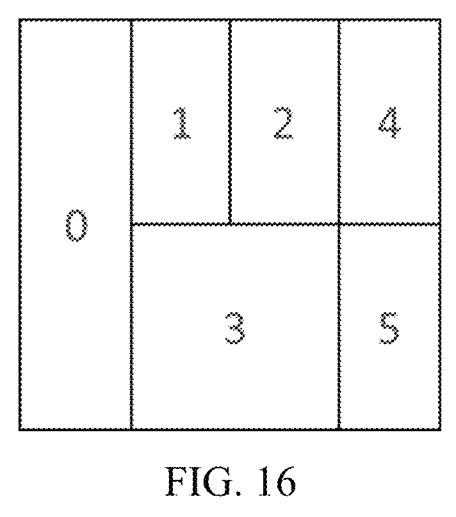

FIG. 16 illustrates a diagram of an example of labeled block partitions where the availability checking FIG. 15 is applied.

FIG. 17 is applied.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1A:
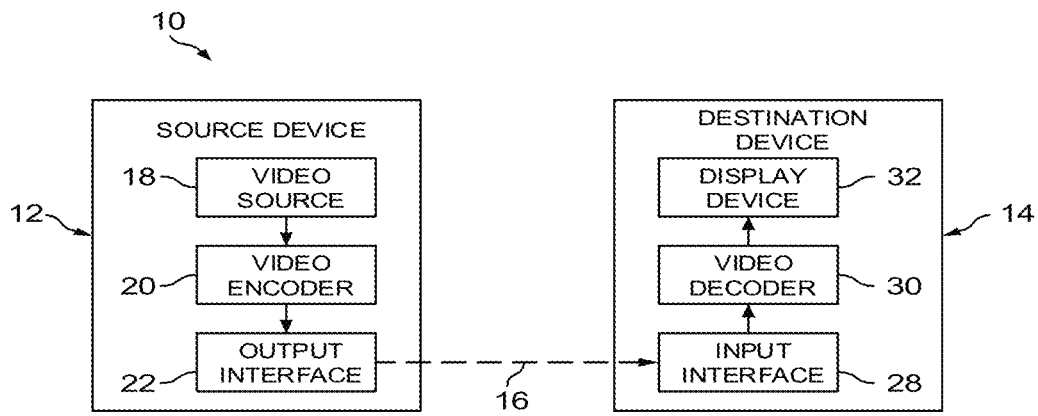
FIG. 1A is a block diagram illustrating an example coding system that may implement embodiments of the disclosure.

FIG. 1A is a block diagram illustrating an example coding system 10 that may utilize bidirectional prediction techniques. As shown in FIG. 1A, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, digital video disks (DVDs), Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1A, source device 12 includes video source 18, video encoder 20, and output interface 22. Destination device 14 includes input interface 28, video decoder 30, and display device 32. In accordance with this disclosure, video encoder 20 of source device 12 and/or the video decoder 30 of the destination device 14 may be configured to apply the techniques for bidirectional prediction. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1A is merely one example. Techniques for bidirectional prediction may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the International Telecommunications Union Telecommunication Standardization Sector (ITU-T) H.264 standard, alternatively referred to as Motion Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1A, in some aspects, video encoder 20 and video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 1B:
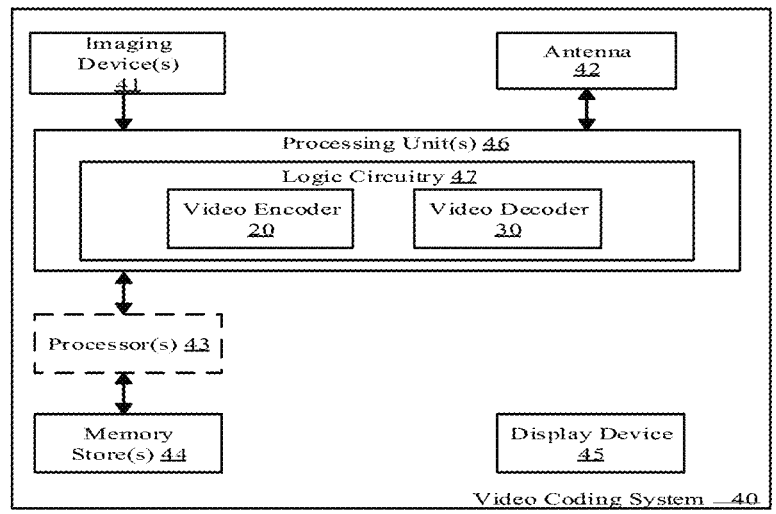
FIG. 1B is a block diagram illustrating another example coding system that may implement embodiments of the disclosure.
Figure 2:
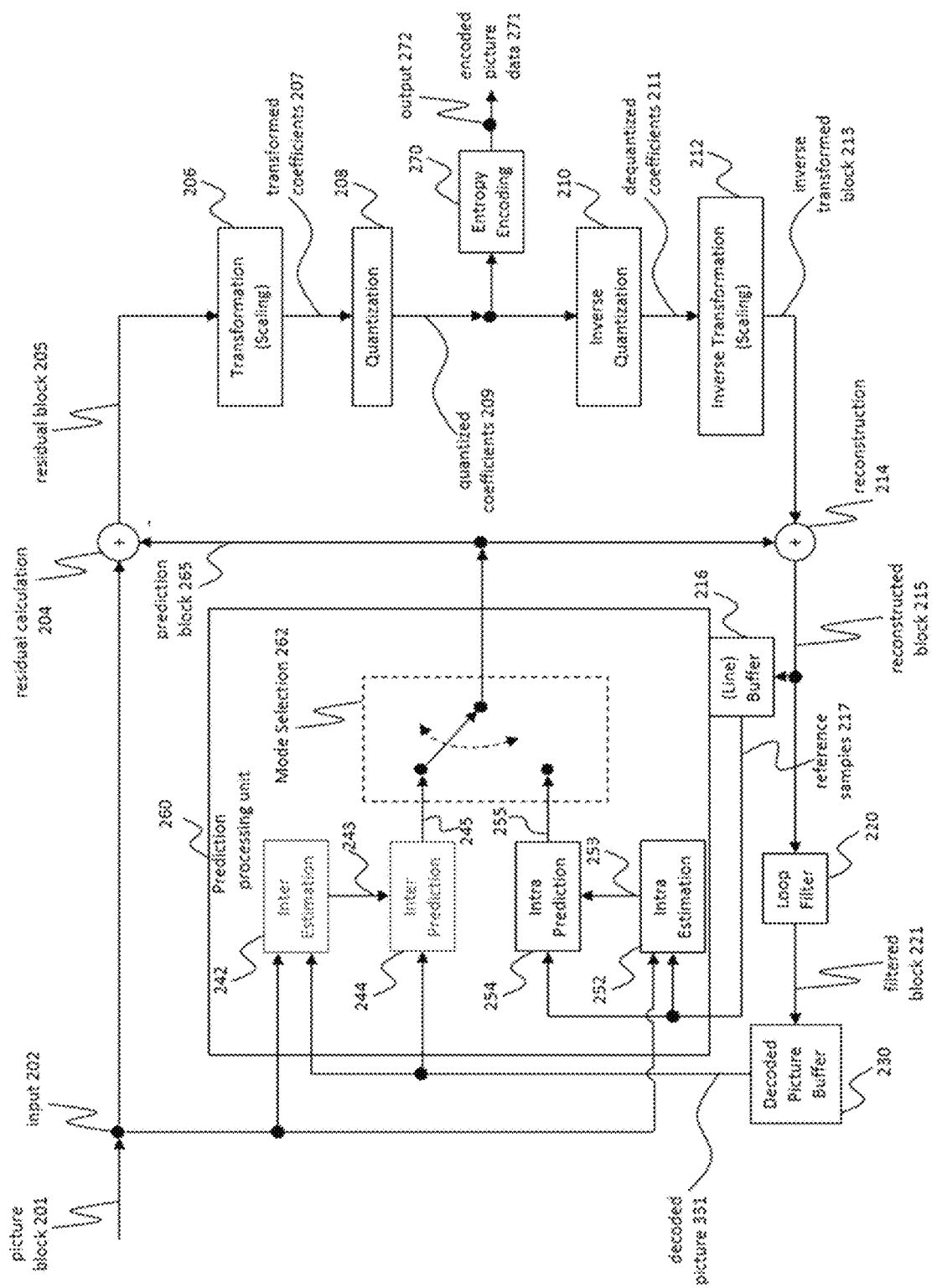
FIG. 2 is a block diagram illustrating an example video encoder that may implement embodiments of the disclosure.
Figure 3:
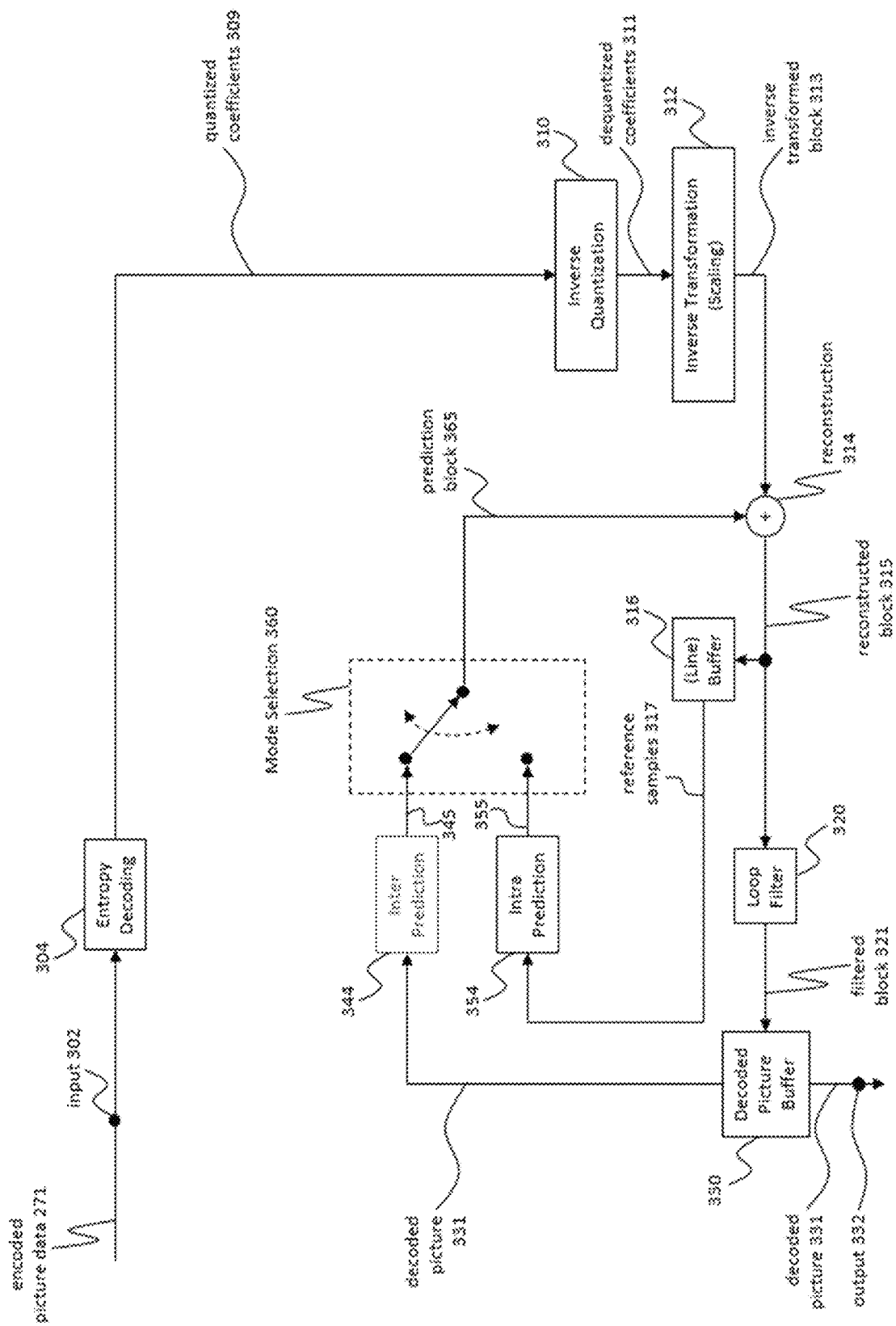
FIG. 3 is a block diagram illustrating an example of a video decoder that may implement embodiments of the disclosure.

FIG. 1B is an illustrative diagram of an example video coding system 40 including encoder 200 of FIG. 2 and/or decoder 300 of FIG. 3 according to an exemplary embodiment. The system 40 can implement techniques of this present application, e.g. the merge estimation in the inter prediction. In the illustrated implementation, video coding system 40 may include imaging device(s) 41, video encoder 20, video decoder 30 (and/or a video coder implemented via logic circuitry 47 of processing unit(s) 46), an antenna 42, one or more processor(s) 43, one or more memory store(s) 44, and/or a display device 45.

As illustrated, imaging device(s) 41, antenna 42, processing unit(s) 46, logic circuitry 47, video encoder 20, video decoder 30, processor(s) 43, memory store(s) 44, and/or display device 45 may be capable of communication with one another. As discussed, although illustrated with both video encoder 20 and video decoder 30, video coding system 40 may include only video encoder 20 or only video decoder 30 in various practical scenario.

As shown, in some examples, video coding system 40 may include antenna 42. Antenna 42 may be configured to transmit or receive an encoded bitstream of video data, for example. Further, in some examples, video coding system 40 may include display device 45. Display device 45 may be configured to present video data. As shown, in some examples, logic circuitry 54 may be implemented via processing unit(s) 46. Processing unit(s) 46 may include application-specific integrated circuit (ASIC) logic, graphics processor(s), general purpose processor(s), or the like. Video coding system 40 also may include optional processor(s) 43, which may similarly include application-specific integrated circuit (ASIC) logic, graphics processor(s), general purpose processor(s), or the like. In some examples, logic circuitry 54 may be implemented via hardware, video coding dedicated hardware, or the like, and processor(s) 43 may implemented general purpose software, operating systems, or the like. In addition, memory store(s) 44 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 44 may be implemented by cache memory. In some examples, logic circuitry 54 may access memory store(s) 44 (for implementation of an image buffer for example). In other examples, logic circuitry 47 and/or processing unit(s) 46 may include memory stores (e.g., cache or the like) for the implementation of an image buffer or the like.

In some examples, video encoder 20 implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video encoder 20 as implemented via logic circuitry 47 to embody the various modules as discussed with respect to FIG. 2 and/or any other encoder system or subsystem described herein. The logic circuitry may be configured to perform the various operations as discussed herein.

Video decoder 30 may be implemented in a similar manner as implemented via logic circuitry 47 to embody the various modules as discussed with respect to decoder 300 of FIG. 3 and/or any other decoder system or subsystem described herein. In some examples, video decoder 30 may be implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video decoder 30 as implemented via logic circuitry 47 to embody the various modules as discussed with respect to FIG. 3 and/or any other decoder system or subsystem described herein.

In some examples, antenna 42 of video coding system 40 may be configured to receive an encoded bitstream of video data. As discussed, the encoded bitstream may include data, indicators, index values, mode selection data, or the like associated with encoding a video frame as discussed herein, such as data associated with the coding partition (e.g., transform coefficients or quantized transform coefficients, optional indicators (as discussed), and/or data defining the coding partition). Video coding system 40 may also include video decoder 30 coupled to antenna 42 and configured to decode the encoded bitstream. The display device 45 configured to present video frames.

FIG. 2 is a block diagram illustrating an example of video encoder 200 that may implement the techniques of the present application. Video encoder 200 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

FIG. 2 shows a schematic/conceptual block diagram of an example video encoder 200 that is configured to implement the techniques of the present disclosure. In the example of FIG. 2, the video encoder 200 comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer (DPB) 230, a prediction processing unit 260 and an entropy encoding unit 270. The prediction processing unit 260 may include an inter estimation 242, inter prediction unit 244, an intra estimation 252, an intra prediction unit 254 and a mode selection unit 262. Inter prediction unit 244 may further include a motion compensation unit (not shown). A video encoder 200 as shown in FIG. 2 may also be referred to as hybrid video encoder or a video encoder according to a hybrid video codec.

For example, the residual calculation unit 204, the transform processing unit 206, the quantization unit 208, the prediction processing unit 260 and the entropy encoding unit 270 form a forward signal path of the encoder 200, whereas, for example, the inverse quantization unit 210, the inverse transform processing unit 212, the reconstruction unit 214, the buffer 216, the loop filter 220, the decoded picture buffer (DPB) 230, prediction processing unit 260 form a backward signal path of the encoder, wherein the backward signal path of the encoder corresponds to the signal path of the decoder (see decoder 300 in FIG. 3).

The encoder 200 is configured to receive, e.g. by input 202, a picture 201 or a block 203 of the picture 201, e.g. picture of a sequence of pictures forming a video or video sequence. The picture block 203 may also be referred to as current picture block or picture block to be coded, and the picture 201 as current picture or picture to be coded (in particular in video coding to distinguish the current picture from other pictures, e.g. previously encoded and/or decoded pictures of the same video sequence, i.e. the video sequence which also comprises the current picture).

Partitioning

Embodiments of the encoder 200 may comprise a partitioning unit (not depicted in FIG. 2) configured to partition the picture 201 into a plurality of blocks, e.g. blocks like block 203, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

In HEVC and other video coding specifications, to generate an encoded representation of a picture, a set of coding tree units (CTUs) may be generated. Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

In HEVC, a CTU is split into CUs by using a quad-tree structure denoted as coding tree to adapt to various local characteristics. The decision whether to code a picture area using inter-picture (temporal) or intra-picture (spatial) prediction is made at the CU level. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block. A coding block is an N×N block of samples. In some examples, a CU may be the same size of a CTU. Each CU is coded with one coding mode, which could be, e.g., an intra coding mode or an inter coding mode. Other coding modes are also possible. Encoder 200 receives video data. Encoder 200 may encode each CTU in a slice of a picture of the video data. As part of encoding a CTU, prediction processing unit 260 or another processing unit (Including but not limited to unit of encoder 200 shown in FIG. 2) of encoder 200 may perform partitioning to divide the CTBs of the CTU into progressively-smaller blocks 203. The smaller blocks may be coding blocks of CUs.

Syntax data within a bitstream may also define a size for the CTU. A slice includes a number of consecutive CTUs in coding order. A video frame or image or picture may be partitioned into one or more slices. As mentioned above, each tree block may be split into coding units (CUs) according to a quad-tree. In general, a quad-tree data structure includes one node per CU, with a root node corresponding to the treeblock (e.g., CTU). If a CU is split into four sub-CUs, the node corresponding to the CU includes four child nodes, each of which corresponds to one of the sub-CUs. The plurality of nodes in a quad-tree structure includes leaf nodes and non-leaf nodes. The leaf nodes have no child nodes in the tree structure (i.e., the leaf nodes are not further split). The, non-leaf nodes include a root node of the tree structure. For each respective non-root node of the plurality of nodes, the respective non-root node corresponds to a sub-CU of a CU corresponding to a parent node in the tree structure of the respective non-root node. Each respective non-leaf node has one or more child nodes in the tree structure.

Each node of the quad-tree data structure may provide syntax data for the corresponding CU. For example, a node in the quad-tree may include a split flag, indicating whether the CU corresponding to the node is split into sub-CUs.

Syntax elements for a CU may be defined recursively, and may depend on whether the CU is split into sub-CUs. If a CU is not split further, it is referred as a leaf-CU. If a block of CU is split further, it may be generally referred to as a non-leaf-CU. As shown in FIG. 2, each level of partitioning is a quad-tree split into four sub-CUs. The black CU is an example of a leaf-node (i.e., a block that is not further split).

A CU has a similar purpose as a macroblock of the H.264 standard, except that a CU does not have a size distinction. For example, a tree block may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a tree block may be split, referred to as a maximum CU depth, and may also define a minimum size of the coding nodes. Accordingly, a bitstream may also define a smallest coding unit (SCU). The term "block" is used to refer to any of a CU, PU, or TU, in the context of HEVC, or similar data structures in the context of other standards (e.g., macroblocks and sub-blocks thereof in H.264/AVC).

In HEVC, each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quad-tree structure similar to the coding tree for the CU. One of key feature of the HEVC structure is that it has the multiple partition conceptions including CU, PU, and TU. PUs may be partitioned to be non-square in shape. Syntax data associated with a CU may also describe, for example, partitioning of the CU into one or more PUs. A TU can be square or non-square (e.g., rectangular) in shape, syntax data associated with a CU may describe, for example, partitioning of the CU into one or more TUs according to a quad-tree. Partitioning modes may differ between whether the CU is skip or direct mode encoded, intra-prediction mode encoded, or inter-prediction mode encoded.

While VVC (Versatile Video Coding) removes the separation of the PU and TU concepts, and supports more flexibility for CU partition shapes. A size of the CU corresponds to a size of the coding node and may be square or non-square (e.g., rectangular) in shape. The size of the CU may range from 4×4 pixels (or 8×8 pixels) up to the size of the tree block with a maximum of 128×128 pixels or greater (for example, 256×256 pixels).

After encoder 200 generates a predictive block (e.g., luma, Cb, and Cr predictive block) for CU, encoder 200 may generate a residual block for the CU. For instance, encoder 100 may generate a luma residual block for the CU. Each sample in the CUs luma residual block indicates a difference between a luma sample in the CU's predictive luma block and a corresponding sample in the CU's original luma coding block. In addition, encoder 200 may generate a Cb residual block for the CU. Each sample in the Cb residual block of a CU may indicate a difference between a Cb sample in the CU's predictive Cb block and a corresponding sample in the CU's original Cb coding block. Encoder 100 may also generate a Cr residual block for the CU. Each sample in the CU's Cr residual block may indicate a difference between a Cr sample in the CU's predictive Cr block and a corresponding sample in the CUs original Cr coding block.

In some examples, encoder 100 skips application of the transforms to the transform block. In such examples, encoder 200 may treat residual sample values in the same way as transform coefficients. Thus, in examples where encoder 100 skips application of the transforms, the following discussion of transform coefficients and coefficient blocks may be applicable to transform blocks of residual samples.

After generating a coefficient block (e.g., a luma coefficient block, a Cb coefficient block or a Cr coefficient block), encoder 200 may quantize the coefficient block to possibly reduce the amount of data used to represent the coefficient block, potentially providing further compression. Quantization generally refers to a process in which a range of values is compressed to a single value. After encoder 200 quantizes a coefficient block, encoder 200 may entropy encode syntax elements indicating the quantized transform coefficients. For example, encoder 200 may perform Context-Adaptive Binary Arithmetic Coding (CABAC) or other entropy coding techniques on the syntax elements indicating the quantized transform coefficients.

Encoder 200 may output a bitstream of encoded picture data 271 that includes a sequence of bits that forms a representation of coded pictures and associated data. Thus, the bitstream comprises an encoded representation of video data.

In J. An et al., "Block partitioning structure for next generation video coding", International Telecommunication Union, COM16-C966, September 2015 (hereinafter, "VCEG proposal COM16-C966"), quad-tree-binary-tree (QTBT) partitioning techniques were proposed for future video coding standard beyond HEVC. Simulations have shown that the proposed QTBT structure is more efficient than the quad-tree structure in used HEVC. In HEVC, inter prediction for small blocks is restricted to reduce the memory access of motion compensation, such that bi-prediction is not supported for 4×8 and 8×4 blocks, and inter prediction is not supported for 4-4 blocks. In the QTBT of the JEM, these restrictions are removed.

Figure 10:
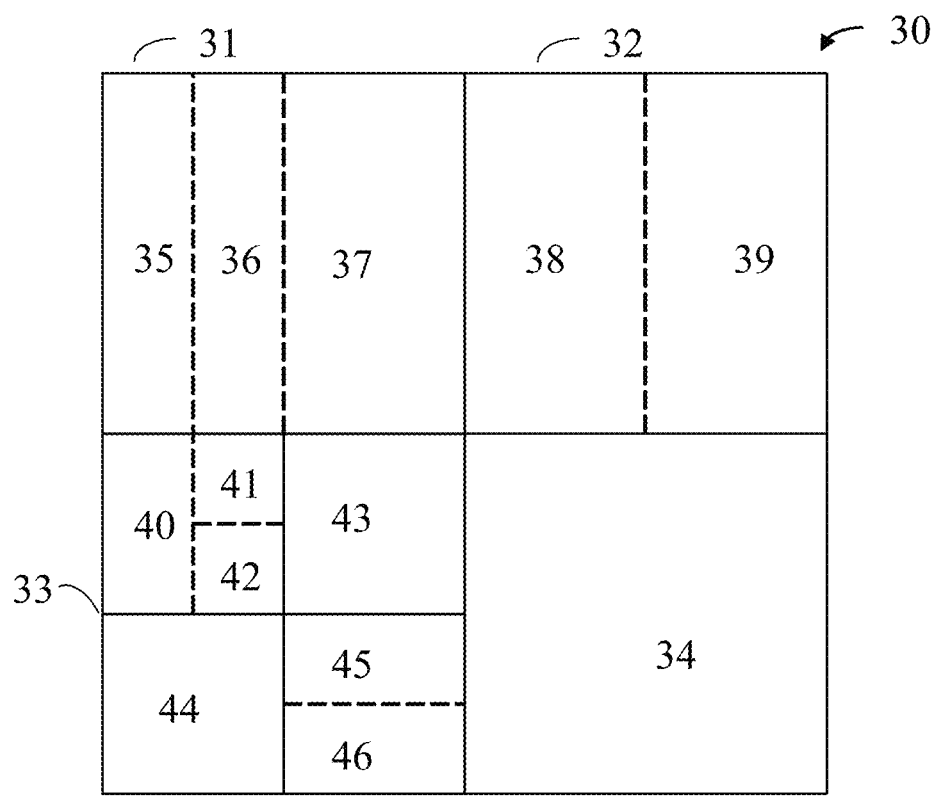
FIG. 10 illustrates a diagram of an example of block partitioning using a quad-tree-binary-tree (QTBT) structure.

In the QTBT, a CU can have either a square or rectangular shape. As shown in FIG. 10, a coding tree unit (CTU) is first partitioned by a quadtree structure. The quadtree leaf nodes can be further partitioned by a binary tree structure. There are two splitting types, symmetric horizontal splitting and symmetric vertical splitting, in the binary tree splitting. In each case, a node is split by dividing the node down the middle, either horizontally or vertically. The binary tree leaf nodes are called coding units (CUs), and that segmentation is used for prediction and transform processing without any further partitioning. This means that the CU, PU and TU have the same block size in the QTBT coding block structure. A CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.
  CTU size: the root node size of a quadtree, the same concept as in HEVC
  MinQTSize: the minimum allowed quadtree leaf node size
  MaxBTSize: the maximum allowed binary tree root node size
  MaxBTDepth: the maximum allowed binary tree depth MinBTSize: the minimum allowed binary tree leaf node size In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). When the quadtree node has size equal to MinQTSize, no further quadtree is considered. If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples. The leaf nodes of the binary-tree (CUs) may be further processed (e.g., by performing a prediction process and a transform process) without any further partitioning.

Figure 11:
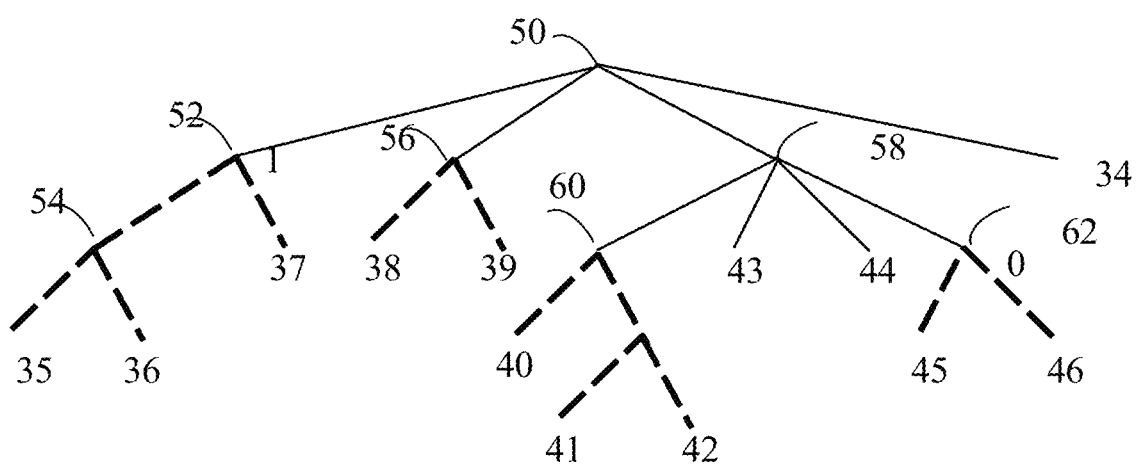
FIG. 11 illustrates a diagram of an example of tree structure corresponding to the block partitioning using the QTBT structure of FIG. 10.

FIG. 10 illustrates an example of a block 30 (e.g., a CTB) partitioned using QTBT partitioning techniques. As shown in FIG. 10, using QTBT partition techniques, each of the blocks is split symmetrically through the center of each block. FIG. 11 illustrates the tree structure corresponding to the block partitioning of FIG. 11. The solid lines in FIG. 11 indicate quad-tree splitting and dotted lines indicate binary-tree splitting. In one example, in each splitting (i.e., non-leaf) node of the binary-tree, a syntax element (e.g., a flag) is signaled to indicate the type of splitting performed (e.g., horizontal or vertical), where 0 indicates horizontal splitting and 1 indicates vertical splitting. For the quad-tree splitting, there is no need to indicate the splitting type, as quad-tree splitting always splits a block horizontally and vertically into 4 sub-blocks with an equal size.

Figure 4:
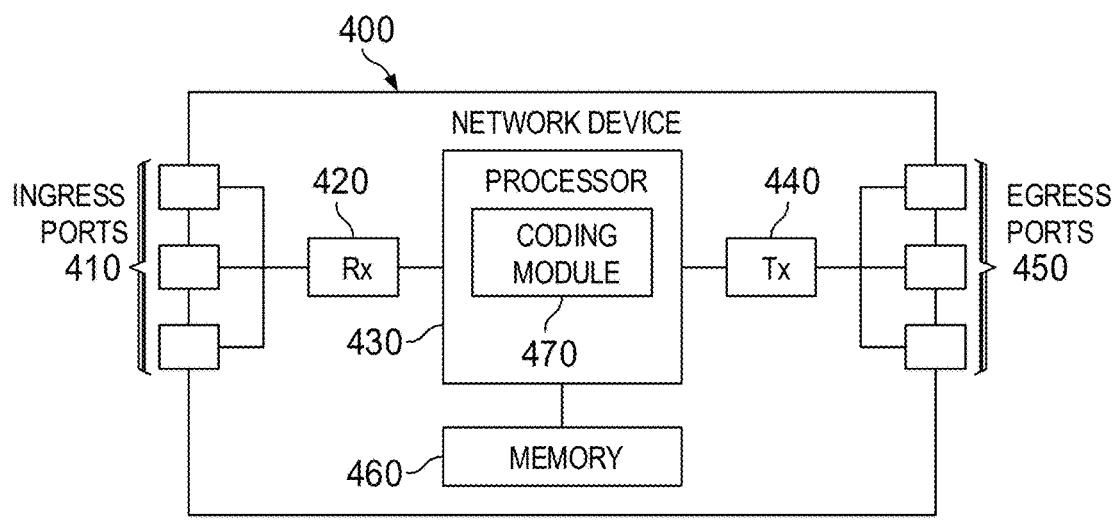
FIG. 4 is a schematic diagram of a network device.

As shown in FIG. 11, at node 50, block 30 is split into the four blocks 31, 32, 33, and 34, shown in FIG. 10, using QT partitioning. Block 34 is not further split, and is therefore a leaf node. At node 52, block 31 is further split into two blocks using BT partitioning. As shown in FIG. 4, node 52 is marked with a 1, indicating vertical splitting. As such, the splitting at node 52 results in block 37 and the block including both blocks 35 and 36. Blocks 35 and 36 are created by a further vertical splitting at node 54. At node 56, block 32 is further split into two blocks 38 and 39 using BT partitioning.

At node 58, block 33 is split into 4 equal size blocks using QT partitioning. Blocks 43 and 44 are created from this QT partitioning and are not further split. At node 60, the upper left block is first split using vertical binary-tree splitting resulting in block 40 and a right vertical block. The right vertical block is then split using horizontal binary-tree splitting into blocks 41 and 42. The lower right block created from the quad-tree splitting at node 58, is split at node 62 using horizontal binary-tree splitting into blocks 45 and 46. As shown in FIG. 11, node 62 is marked with a 0, indicating vertical splitting.

In addition, the QTBT scheme supports the ability for the luma and chroma to have a separate QTBT structure. Currently, for P and B slices, the luma and chroma CTBs in one CTU may share the same QTBT structure. However, for I slices, the luma CTB is partitioned into CUs by a QTBT structure, and the chroma CTBs may be partitioned into chroma CUs by another QTBT structure. This means that a CU in an I slice consists of a coding block of the luma component or coding blocks of two chroma components, and a CU in a P or B slice consists of coding blocks of all three colour components.

The encoder 200 applies a rate-distortion optimization (RDO) process for the QTBT structure to determine the block partitioning.

In addition, a block partitioning structure named multi-type-tree (MTT) is proposed in U.S. Patent Application Publication No. 20170208336 to replace QT, BT, and/or QTBT based CU structures. The MTT partitioning structure is still a recursive tree structure. In MTT, multiple different partition structures (e.g., three or more) are used. For example, according to the MTT techniques, three or more different partition structures may be used for each respective non-leaf node of a tree structure, at each depth of the tree structure. The depth of a node in a tree structure may refer to the length of the path (e.g., the number of splits) from the node to the root of the tree structure. A partition structure may generally refer to how many different blocks a block may be divided into. A Partition structure may be a quad-tree partitioning structure may divide a block into four blocks, a binary-tree partitioning structure may divide a block into two blocks, or a triple-tree partitioning structure may divide a block into three blocks, furthermore, triple-tree partitioning structure may be without dividing the block through the center. A partition structure may have multiple different partition types. A partition type may additionally define how a block is divided, including symmetric or asymmetric partitioning, uniform or non-uniform partitioning, and/or horizontal or vertical partitioning.

In MTT, at each depth of the tree structure, encoder 200 may be configured to further split sub-trees using a particular partition type from among one of three more partitioning structures. For example, encoder 100 may be configured to determine a particular partition type from QT, BT, triple-tree (TT) and other partitioning structures. In one example, the QT partitioning structure may include square quad-tree or rectangular quad-tree partitioning types. Encoder 200 may partition a square block using square quad-tree partitioning by dividing the block, down the center both horizontally and vertically, into four equal-sized square blocks. Likewise, encoder 200 may partition a rectangular (e.g., non-square) block using rectangular quad-tree partition by dividing the rectangular block, down the center both horizontally and vertically, into four equal-sized rectangular blocs.

The BT partitioning structure may include at least one of horizontal symmetric binary-tree, vertical symmetric binary-tree, horizontal non-symmetric binary-tree, or vertical non-symmetric binary-tree partition types. For the horizontal symmetric binary-tree partition type, encoder 200 may be configured to split a block, down the center of the block horizontally, into two symmetric blocks of the same size. For the vertical symmetric binary-tree partition type, encoder 200 may be configured to split a block, down the center of the block vertically, into two symmetric blocks of the same size. For the horizontal non-symmetric binary-tree partition type, encoder 100 may be configured to split a block, horizontally, into two blocks of differing size. For example, one block may be ¼ the size of the parent block and the other block may be ¾ the size of the parent blocks, similar to the PART_2N×nU or PART_2N×nD partition type. For the vertical non-symmetric binary-tree partition type, encoder 100 may be configured to split a block, vertically, into two blocks of differing size. For example, one block may be ¼ the size of the parent block and the other block may be ¾ the size of the parent blocks, similar to the PART_nL×2N or PART_nR×2N partition type. In other examples, an asymmetric binary-tree partition type may divide a parent block into different size fractions. For example, one sub-block may be ⅜ of the parent block and the other sub-block may be ⅝ of the parent block. Of course, such a partition type may be either vertical or horizontal.

The TT partition structure differs from that of the QT or BT structures, in that the TT partition structure does not split a block down the center. The center region of the block remains together in the same sub-block. Different from QT, which produces four blocks, or binary tree, which produces two blocks, splitting according to a TT partition structure produces three blocks. Example partition types according to the TT partition structure include symmetric partition types (both horizontal and vertical), as well as asymmetric partition types (both horizontal and vertical). Furthermore, the symmetric partition types according to the TT partition structure may be uneven/non-uniform or even/uniform. The asymmetric partition types according to the TT partition structure are uneven/non-uniform. In one example, a TT partition structure may include at least one of the following partition types: horizontal even/uniform symmetric triple-tree, vertical even/uniform symmetric triple-tree, horizontal uneven/non-uniform symmetric triple-tree, vertical uneven/non-uniform symmetric triple-tree, horizontal uneven/non-uniform asymmetric triple-tree, or vertical uneven/non-uniform asymmetric triple-tree partition types.

In general, an uneven/non-uniform symmetric triple-tree partition type is a partition type that is symmetric about a center line of the block, but where at least one of the resultant three blocks is not the same size as the other two. One preferred example is where the side blocks are ¼ the size of the block, and the center block is ½ the size of the block. An even/uniform symmetric triple-tree partition type is a partition type that is symmetric about a center line of the block, and the resultant blocks are all the same size. Such a partition is possible if the block height or width, depending on a vertical or horizontal split, is a multiple of 3. An uneven/non-uniform asymmetric triple-tree partition type is a partition type that is not symmetric about a center line of the block, and where at least one of the resultant blocks is not the same size as the other two.

Figure 11A:
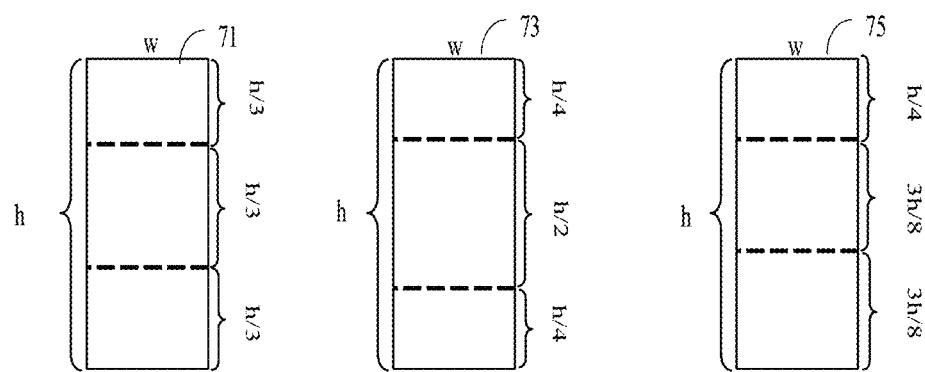
FIG. 11a illustrates a diagram of an example of horizontal triple-tree partition types.
Figure 11B:
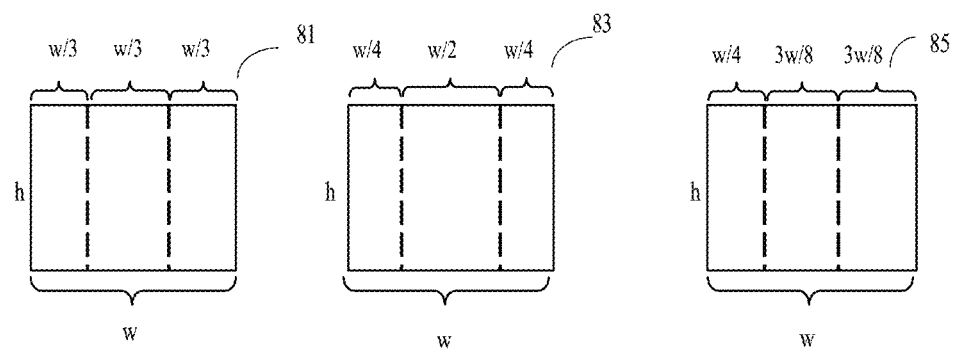
FIG. 11b illustrates a diagram of an example of vertical triple-tree partition types.

FIG. 11a is a conceptual diagram illustrating example horizontal triple-tree partition types. FIG. 11b is a conceptual diagram illustrating example vertical triple-tree partition types. In both FIG. 11a and FIG. 11b, h represents the height of the block in luma or chroma samples and w represents the width of the block in luma or chroma samples. Note that the respective center line of a block do not represent the boundary of the block (i.e., the triple-tree partitions do not spit a block through the center line). Rather, the center line\are used to depict whether or not a particular partition type is symmetric or asymmetric relative to the center line of the original block. The center line are also along the direction of the split.

As shown in FIG. 11a, block 71 is partitioned with a horizontal even/uniform symmetric partition type. The horizontal even/uniform symmetric partition type produces symmetrical top and bottom halves relative to the center line of block 71. The horizontal even/uniform symmetric partition type produces three sub-blocks of equal size, each with a height of h/3 and a width of w. The horizontal even/uniform symmetric partition type is possible when the height of block 71 is evenly divisible by 3.

Block 73 is partitioned with a horizontal uneven/non-uniform symmetric partition type. The horizontal uneven/non-uniform symmetric partition type produces symmetrical top and bottom halves relative to the center line of block 73. The horizontal uneven/non-uniform symmetric partition type produces two blocks of equal size (e.g., the top and bottom blocks with a height of h/4), and a center block of a different size (e.g., a center block with a height of h/2). In one example, according to the horizontal uneven/non-uniform symmetric partition type, the area of the center block is equal to the combined areas of the top and bottom blocks. In some examples, the horizontal uneven/non-uniform symmetric partition type may be preferred for blocks having a height that is a power of 2 (e.g., 2, 4, 8, 16, 32, etc.).

Figure 7:
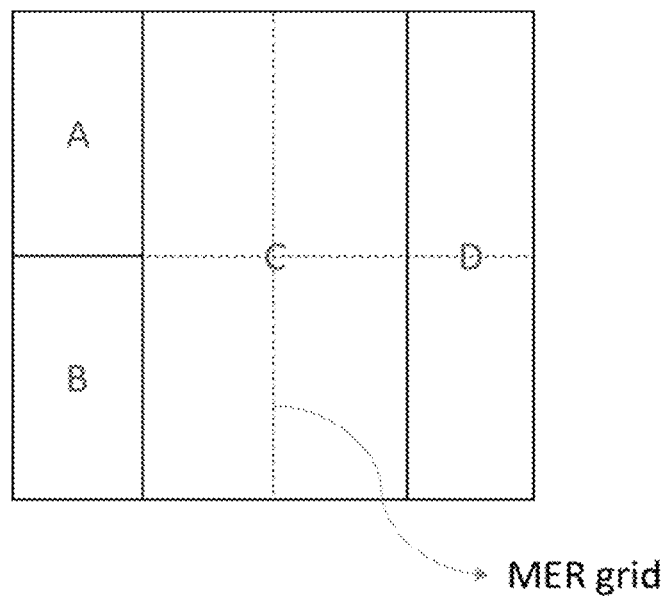
FIG. 7 to FIG. 9 are partition resulted based on the partition modes allowed in VVC.

Block 75 is partitioned with a horizontal uneven/non-uniform asymmetric partition type. The horizontal uneven/non-uniform asymmetric partition type does not produce a symmetrical top and bottom half relative to the center line of block 75 (i.e., the top and bottom halves are asymmetric). In the example of FIG. 7, the horizontal uneven/non-uniform asymmetric partition type produces a top block with height of h/4, a center block with height of 3h/8, and a bottom block with a height of 3h/8. Of course, other asymmetric arrangements may be used.

As shown in FIG. 11b, block 81 is partitioned with a vertical even/uniform symmetric partition type. The vertical even/uniform symmetric partition type produces symmetrical left and right halves relative to the center line of block 81. The vertical even/uniform symmetric partition type produces three sub-blocks of equal size, each with a width of w/3 and a height of h. The vertical even/uniform symmetric partition type is possible when the width of block 81 is evenly divisible by 3.

Block 83 is partitioned with a vertical uneven/non-uniform symmetric partition type. The vertical uneven/non-uniform symmetric partition type produces symmetrical left and right halves relative to the center line of block 83. The vertical uneven/non-uniform symmetric partition type produces symmetrical left and right halves relative to the center line of 83. The vertical uneven/non-uniform symmetric partition type produces two blocks of equal size (e.g., the left and right blocks with a width of w/4), and a center block of a different size (e.g., a center block with a width of w/2). In one example, according to the vertical uneven/non-uniform symmetric partition type, the area of the center block is equal to the combined areas of the left and right blocks. In some examples, the vertical uneven/non-uniform symmetric partition type may be preferred for blocks having a width that is a power of 2 (e.g., 2, 4, 8, 16, 32, etc.).

Figure 8:
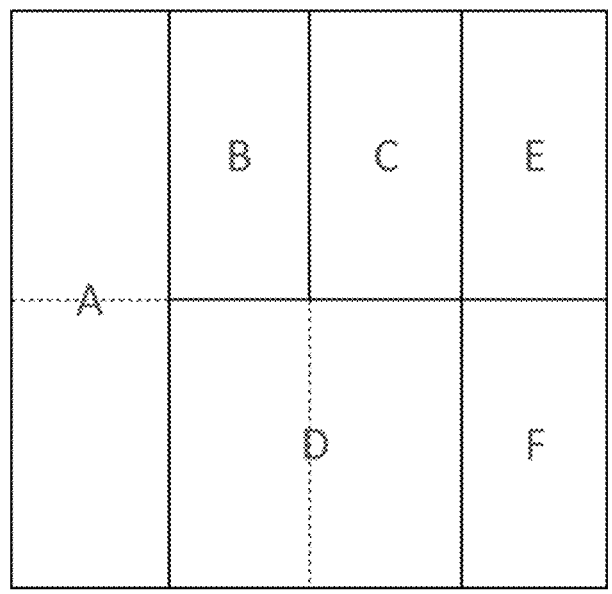
Figure 9:
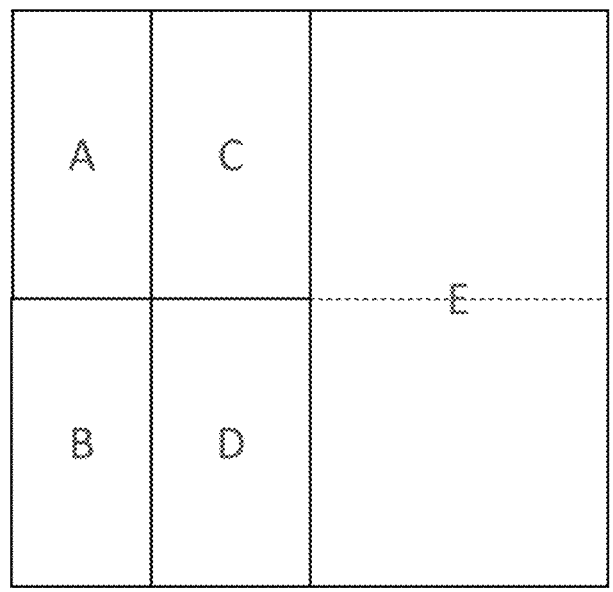

Block 85 is partitioned with a vertical uneven/non-uniform asymmetric partition type. The vertical uneven/non-uniform asymmetric partition type does not produce a symmetrical left and right half relative to the center line of block 85 (i.e., the left and right halves are asymmetric). In the example of FIG. 8, the vertical uneven/non-uniform asymmetric partition type produces a left block with width of w/4, a center block with width of 3w/8, and a bottom block with a width of 3w/8. Of course, other asymmetric arrangements may be used.

In examples where a block (e.g., at a sub-tree node) is split to a non-symmetric triple-tree partition type, encoder 200 and/or decoder 300 may apply a restriction such that two of the three partitions have the same size. Such a restriction may correspond to a limitation to which encoder 200 must comply when encoding video data. Furthermore, in some examples, encoder 200 and decoder 300 may apply a restriction whereby the sum of the area of two partitions is equal to the area of the remaining partition when splitting according to a non-symmetric triple-tree partition type. In some examples, encoder 200 may be configured to select from among all the of the aforementioned partition types for each of the QT, BT, and TT partition structures. In other examples, encoder 200 may be configured to only determine a partition type from among a subset of the aforementioned partition types. For example, a subset of the above-discussed partition types (or other partition types) may be used for certain block sizes or for certain depths of a quadtree structure. The subset of supported partition types may be signaled in the bitstream for use by decoder 200 or may be predefined such that encoder 200 and decoder 300 may determine the subsets without any signaling.

In other examples, the number of supported partitioning types may be fixed for all depths in all CTUs. That is, encoder 200 and decoder 300 may be preconfigured to use the same number of partitioning types for any depth of a CTU. In other examples, the number of supported partitioning types may vary and may be dependent on depth, slice type, or other previously coded information. In one example, at depth 0 or depth 1 of the tree structure, only the QT partition structure is used. At depths greater than 1, each of the QT, BT, and TT partition structures may be used.

In some examples, encoder 200 and/or decoder 300 may apply preconfigured constraints on supported partitioning types in order to avoid duplicated partitioning for a certain region of a video picture or region of a CTU. In one example, when a block is split with non-symmetric partition type, encoder 200 and/or decoder 300 may be configured to not further split the largest sub-block that is split from the current block. For example, when a square block is split according to a non-symmetric partition type (similar to the PART_2N×nU partition type), the largest sub-block among all sub-blocks (similar to the largest sub-block of PART_2N×nU partition type) is the noted leaf node and cannot be further split. However, the smaller sub-block (similar to the smaller sub-block of PART_2N×nU partition type) can be further split.

As another example where constraints on supported partitioning types may be applied to avoid duplicated partitioning for a certain region, when a block is split with non-symmetric partition type, the largest sub-block that is split from the current block cannot be further split in the same direction. For example, when a square block is split non-symmetric partition type (similar to the PART_2N×nU partition type), encoder 200 and/or 3ecoder 200 may be configured to not split the large sub-block among all sub-blocks (similar to the largest sub-block of PART_2N×nU partition type) in the horizontal direction.

As another example where constraints on supported partitioning types may be applied to avoid difficulty in further splitting, encoder 200 and/or decoder 300 may be configured to not split a block, either horizontally or vertically, when the width/height of a block is not a power of 2 (e.g., when the width height is not 2, 4, 8, 16, etc.).

The above examples describe how encoder 200 may be configured to perform MTT partitioning. Decoder 300 may also then apply the same MTT partitioning as was performed by encoder 200. In some examples, how a picture of video data was partitioned by encoder 200 may be determined by applying the same set of predefined rules at decoder 300. However, in many situations, encoder 200 may determine a particular partition structure and partition type to use based on rate-distortion criteria for the particular picture of video data being coded. As such, in order for decoder 300 to determine the partitioning for a particular picture, encoder 200 may signal syntax elements in the encoded bitstream that indicate how the picture, and CTUs of the picture, are to be partitioned. Decoder 200 may parse such syntax elements and partition the picture and CTUs accordingly.

In one example, the prediction processing unit 260 of video encoder 200 may be configured to perform any combination of the partitioning techniques described above, especially, for the motion estimation, and the details will be described later.

Like the picture 201, the block 203 again is or can be regarded as a two-dimensional array or matrix of samples with intensity values (sample values), although of smaller dimension than the picture 201. In other words, the block 203 may comprise, e.g., one sample array (e.g. a luma array in case of a monochrome picture 201) or three sample arrays (e.g. a luma and two chroma arrays in case of a color picture 201) or any other number and/or kind of arrays depending on the color format applied. The number of samples in horizontal and vertical direction (or axis) of the block 203 define the size of block 203.

Encoder 200 as shown in FIG. 2 is configured encode the picture 201 block by block, e.g. the encoding and prediction is performed per block 203.

Residual Calculation

The residual calculation unit 204 is configured to calculate a residual block 205 based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 is configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for HEVC/H.265. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transform coefficients, tradeoff between accuracy and implementation costs, etc. Specific scaling factors are, for example, specified for the inverse transform, e.g. by inverse transform processing unit 212, at a decoder 300 (and the corresponding inverse transform, e.g. by inverse transform processing unit 212 at an encoder 20) and corresponding scaling factors for the forward transform, e.g. by transform processing unit 206, at an encoder 200 may be specified accordingly.

Quantization

The quantization unit 208 is configured to quantize the transform coefficients 207 to obtain quantized transform coefficients 209, e.g. by applying scalar quantization or vector quantization. The quantized transform coefficients 209 may also be referred to as quantized residual coefficients 209. The quantization process may reduce the bit depth associated with some or all of the transform coefficients 207. For example, an n-bit Transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse dequantization, e.g. by inverse quantization 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

The inverse transform processing unit 212 is configured to apply the inverse transform of the transform applied by the transform processing unit 206, e.g. an inverse discrete cosine transform (DCT) or inverse discrete sine transform (DST), to obtain an inverse transform block 213 in the sample domain. The inverse transform block 213 may also be referred to as inverse transform dequantized block 213 or inverse transform residual block 213.

The reconstruction unit 214 (e.g. Summer 214) is configured to add the inverse transform block 213 (i.e. reconstructed residual block 213) to the prediction block 265 to obtain a reconstructed block 215 in the sample domain, e.g. by adding the sample values of the reconstructed residual block 213 and the sample values of the prediction block 265.

Optional, the buffer unit 216 (or short "buffer" 216), e.g. a line buffer 216, is configured to buffer or store the reconstructed block 215 and the respective sample values, for example for intra prediction. In further embodiments, the encoder may be configured to use unfiltered reconstructed blocks and/or the respective sample values stored in buffer unit 216 for any kind of estimation and/or prediction, e.g. intra prediction.

Embodiments of the encoder 200 may be configured such that, e.g. the buffer unit 216 is not only used for storing the reconstructed blocks 215 for intra prediction 254 but also for the loop filter unit 220 (not shown in FIG. 2), and/or such that, e.g. the buffer unit 216 and the decoded picture buffer unit 230 form one buffer. Further embodiments may be configured to use filtered blocks 221 and/or blocks or samples from the decoded picture buffer 230 (both not shown in FIG. 2) as input or basis for intra prediction 254.

The loop filter unit 220 (or short "loop filter" 220), is configured to filter the reconstructed block 215 to obtain a filtered block 221, e.g. to smooth pixel transitions, or otherwise improve the video quality. The loop filter unit 220 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 220 is shown in FIG. 2 as being an in loop filter, in other configurations, the loop filter unit 220 may be implemented as a post loop filter. The filtered block 221 may also be referred to as filtered reconstructed block 221. Decoded picture buffer 230 may store the reconstructed coding blocks after the loop filter unit 220 performs the filtering operations on the reconstructed coding blocks.

Embodiments of the encoder 200 (respectively loop filter unit 220) may be configured to output loop filter parameters (such as sample adaptive offset information), e.g. directly or entropy encoded via the entropy encoding unit 270 or any other entropy coding unit, so that, e.g., a decoder 300 may receive and apply the same loop filter parameters for decoding.

The decoded picture buffer (DPB) 230 may be a reference picture memory that stores reference picture data for use in encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The DPB 230 and the buffer 216 may be provided by the same memory device or separate memory devices. In some example, the decoded picture buffer (DPB) 230 is configured to store the filtered block 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. In some example, if the reconstructed block 215 is reconstructed but without in-loop filtering, the decoded picture buffer (DPB) 230 is configured to store the reconstructed block 215.

The prediction processing unit 260, also referred to as block prediction processing unit 260, is configured to receive or obtain the block 203 (current block 203 of the current picture 201) and reconstructed picture data, e.g. reference samples of the same (current) picture from buffer 216 and/or reference picture data 231 from one or a plurality of previously decoded pictures from decoded picture buffer 230, and to process such data for prediction, i.e. to provide a prediction block 265, which may be an inter-predicted block 245 or an intra-predicted block 255.

Mode selection unit 262 may be configured to select a prediction mode (e.g. an intra or inter prediction mode) and/or a corresponding prediction block 245 or 255 to be used as prediction block 265 for the calculation of the residual block 205 and for the reconstruction of the reconstructed block 215.

Embodiments of the mode selection unit 262 may be configured to select the prediction mode (e.g. from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on rate distortion optimization (RDO), i.e. select the prediction mode which provides a minimum rate distortion optimization or which associated rate distortion at least a fulfills a prediction mode selection criterion.

In the following the prediction processing (e.g. prediction processing unit 260 and mode selection (e.g. by mode selection unit 262) performed by an example encoder 200 will be explained in more detail.

As described above, the encoder 200 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 35 different intra-prediction modes, e.g. non-directional modes like DC (or mean) mode and planar mode, or directional modes, e.g. as defined in H.265, or may comprise 67 different intra-prediction modes, e.g. non-directional modes like DC (or mean) mode and planar mode, or directional modes, e.g. as defined in H.266 under developing.

For the signaling of intra mode, Most Probable Mode (MPM) list is used to improve coding efficiency. Due to the large number of intra modes (e.g. 35 in HEVC and 67 in VVC), the intra mode of current block is not signaled directly. Instead, a Most Probable Mode list of current block is constructed based on its neighboring blocks' intra prediction modes. As current block's intra mode is relevant to its neighbors', the MPM list usually provides a good prediction as its name (Most Probable Mode list) indicates, thus the intra mode of current block has a high chance falling into its MPM list. In this way, to derive the intra mode of current block, only the index of MPM list is signaled. Compared to the number of total intra modes, the length of MPM list is much smaller (e.g. 3-MPM list is used in HEVC and 6-MPM list is used in VVC), thus less bits are required to code the intra mode.

Figure 30:
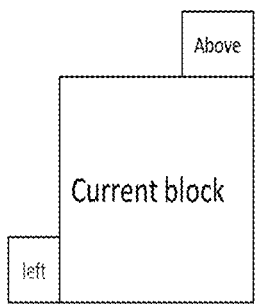
FIG. 30 illustrate an example of neighboring left and above block used for MPM list construction.

A flag (mpm_flag) is used to indicate whether current block's intra mode belongs to its MPM list or not. If it is true, the intra mode of current block can be indexed using MPM list. Otherwise, the intra mode is directly signaled using a binarized code. In both VVC and HEVC, the MPM list is constructed based on its neighboring left and above blocks. An example of neighboring left and above block used for MPM list construction in VVC is raised in FIG. 30.

When the left neighbor block and above neighbor block of the current block are non-angular modes (i.e. they are Planar or DC modes) or they are unavailable (e.g. out of picture boundary, or neighboring modes are not intra-predicted), a default mode list is used.

When angular mode is found in left or above blocks, the MPM list of the current block is filled using neighboring angular modes of the found angular mode, in addition to the intra mode used in left and above blocks.

The set of (or possible) inter-prediction modes depend on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The prediction processing unit 260 may be further configured to partition the block 203 into smaller block partitions or sub-blocks, e.g. iteratively using quad-tree-partitioning (QT), binary partitioning (BT) or triple-tree-partitioning (TT) or any combination thereof, and to perform, e.g. the prediction for each of the block partitions or sub-blocks, wherein the mode selection comprises the selection of the tree-structure of the partitioned block 203 and the prediction modes applied to each of the block partitions or sub-blocks.

The inter prediction unit 244 may include motion estimation (ME) unit and motion compensation (MC) unit (not shown in FIG. 2). The motion estimation unit is configured to receive or obtain the picture block 203 (current picture block 203 of the current picture 201) and a decoded picture 331, or at least one or a plurality of previously reconstructed blocks, e.g. reconstructed blocks of one or a plurality of other/different previously decoded pictures 331, for motion estimation. E.g. a video sequence may comprise the current picture and the previously decoded pictures 331, or in other words, the current picture and the previously decoded pictures 331 may be part of or form a sequence of pictures forming a video sequence. The encoder 200 may, e.g., be configured to select a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter prediction parameters to the motion estimation unit (not shown in FIG. 2). This offset is also called motion vector (MV). Merging is an important motion estimation tool used in HEVC and inherited to VVC. For performing the merge estimation, the first thing should be done is construct a merge candidate list where each of the candidate contains all motion data including the information whether one or two reference picture lists are used as well as a reference index and a motion vector for each list. The merge candidate list is constructed based on the following candidates: a. up to four spatial merge candidates that are derived from five spatial neighboring blocks; b. one temporal merge candidate derived from two temporal, co-located blocks; c. additional merge candidates including combined bi-predictive candidates and zero motion vector candidates.

The first candidates in the merge candidate list are the spatial neighbors. Up to four candidates are inserted in the merge list by sequentially checking A1, B1, B0, A0 and B2, in that order, according to the right part of FIG. 12.

Instead of just checking whether a coding block is available and contains motion information, some additional redundancy checks are performed before taking all the motion data of the coding block as a merge candidate. These redundancy checks can be divided into two categories for two different purposes: a. avoid having candidates with redundant motion data in the list; b. prevent merging two partitions that could be expressed by other means which would create redundant syntax.

When N is the number of spatial merge candidates, a complete redundancy check would consist of $$\frac{N \cdot (N-1)}{2}$$

motion data comparisons. In case of the five potential spatial merge candidates, ten motion data comparisons would be needed to assure that all candidates in the merge list have different motion data. During the development of HEVC, the checks for redundant motion data have been reduced to a subset in a way that the coding efficiency is kept while the comparison logic is significantly reduced. In the final design, no more than two comparisons are performed per candidate resulting in five overall comparisons. Given the order of {A1, B1, B0, A0, B2}, B0 only checks B1, A0 only A1 and B2 only A1 and B1. In an embodiment of the partitioning redundancy check, the bottom PU of a 2N×N partitioning is merged with the top one by choosing candidate B1. This would result in one CU with two PUs having the same motion data which could be equally signaled as a 2N×2N CU. Overall, this check applies for all second PUs of the rectangular and asymmetric partitions 2N×N, 2N×nU, 2N×nD, N×2N, nR×2N and nL×2N. It is noted that for the spatial merge candidates, only the redundancy checks are performed and the motion data is copied from the candidate blocks as it is. Hence, no motion vector scaling is needed here.

The derivation of the motion vectors for the temporal merge candidate is the same as for the TMVP. Since a merge candidate comprises all motion data and the TMVP is only one motion vector, the derivation of the whole motion data only depends on the slice type. For bi-predictive slices, a TMVP is derived for each reference picture list. Depending on the availability of the TMVP for each list, the prediction type is set to bi-prediction or to the list for which the TMVP is available. All associated reference picture indices are set equal to zero. Consequently for uni-predictive slices, only the TMVP for list 0 is derived together with the reference picture index equal to zero.

When at least one TMVP is available and the temporal merge candidate is added to the list, no redundancy check is performed. This makes the merge list construction independent of the co-located picture which improves error resilience. Consider the case where the temporal merge candidate would be redundant and therefore not included in the merge candidate list. In the event of a lost co-located picture, the decoder could not derive the temporal candidates and hence not check whether it would be redundant. The indexing of all subsequent candidates would be affected by this.

For parsing robustness reasons, the length of the merge candidate list is fixed. After the spatial and the temporal merge candidates have been added, it can happen that the list has not yet the fixed length. In order to compensate for the coding efficiency loss that comes along with the non-length adaptive list index signaling, additional candidates are generated. Depending on the slice type, up to two kind of candidates are used to fully populate the list: a. Combined bi-predictive candidates; b. Zero motion vector candidates.

In bi-predictive slices, additional candidates can be generated based on the existing ones by combining reference picture list 0 motion data of one candidate with and the list 1 motion data of another one. This is done by copying $\Delta x_0$, $\Delta y_0$, $\Delta t_0$ from one candidate, e.g. the first one, and $\Delta x_1$, $\Delta y_1$, $\Delta t_1$ from another, e.g. the second one. The different combinations are predefined and given in Table 1.1.

TABLE 1

| Combination Order | 0 | 1 | 2 | 3 | 4 | 5 | 6 | 7 | 8 | 9 | 10 | 11 |
|---|---|---|---|---|---|---|---|---|---|---|---|---|
| $\Delta x_0$, $\Delta y_0$, $\Delta t_0$ from Cand. | 0 | 1 | 0 | 2 | 1 | 2 | 0 | 3 | 1 | 3 | 2 | 3 |
| $\Delta x_1$, $\Delta y_1$, $\Delta t_1$ from Cand. | 1 | 0 | 2 | 0 | 2 | 1 | 3 | 0 | 3 | 1 | 3 | 2 |

When the list is still not full after adding the combined bi-predictive candidates, or for uni-predictive slices, zero motion vector candidates are calculated to complete the list. All zero motion vector candidates have one zero displacement motion vector for uni-predictive slices and two for bi-predictive slices. The reference indices are set equal to zero and are incremented by one for each additional candidate until the maximum number of reference indices is reached. If that is the case and there are still additional candidates missing, a reference index equal to zero is used to create these. For all the additional candidates, no redundancy checks are performed as it turned out that omitting these checks will not introduce a coding efficiency loss.

For each PU coded in inter-picture prediction mode, a so called merge_flag indicates that block merging is used to derive the motion data. The merge_idx further determines the candidate in the merge list that provides all the motion data needed for the MCP. Besides this PU-level signaling, the number of candidates in the merge list is signaled in the slice header. Since the default value is five, it is represented as a difference to five (five_minus_max_num_merge_cand). That way, the five is signaled with a short codeword for the 0 whereas using only one candidate, is signaled with a longer codeword for the 4. Regarding the impact on the merge candidate list construction process, the overall process remains the same although it terminates after the list contains the maximum number of merge candidates. In the initial design, the maximum value for the merge index coding was given by the number of available spatial and temporal candidates in the list. When e.g. only two candidates are available, the index can be efficiently coded as a flag. But, in order to parse the merge index, the whole merge candidate list has to be constructed to know the actual number of candidates. Assuming unavailable neighboring blocks due to transmission errors, it would not be possible to parse the merge index anymore.

A crucial application of the block merging concept in HEVC is its combination with a skip mode. In previous video coding standards, the skip mode was used to indicate for a block that the motion data is inferred instead of explicitly signaled and that the prediction residual is zero, i.e. no transform coefficients are transmitted. In HEVC, at the beginning of each CU in an inter-picture prediction slice, a skip_flag is signaled that implies the following: a. the CU only contains one PU (2N×2N partition type); b. the merge mode is used to derive the motion data (merge_flag equal to 1); c. no residual data is present in the bitstream.

Another important motion estimation tool introduced in HEVC and inherent in VVC is called Advanced Motion Vector Prediction (AMVP). In the AMVP mode, the motion vectors are coded in terms of horizontal (x) and vertical (y) components as a difference to a so called motion predictor (MVP). The calculation of both motion vector difference (MVD) components is shown as $MVDx=MVx-MVPx$, $MVDy=MVy-MVPy$.

Motion vectors of the current block are usually correlated with the motion vectors of neighboring blocks in the current picture or in the earlier coded pictures. This is because neighboring blocks are likely to correspond to the same moving object with similar motion and the motion of the object is not likely to change abruptly over time. Consequently, using the motion vectors in neighboring blocks as predictors reduces the size of the signaled motion vector difference. The MVPs are usually derived from already decoded motion vectors from spatial neighboring blocks or from temporally neighboring blocks in the co-located picture 1. In HEVC, the approach of implicitly deriving the MVP was replaced by a technique known as motion vector competition, which explicitly signals which MVP from a list of MVPs, is used for motion vector derivation. The variable coding quadtree block structure in HEVC can result in one block having several neighboring blocks with motion vectors as potential MVP candidates. Taking the left neighbor as an example, in the worst case a 64×64 luma prediction block could have 16 8×4 luma prediction blocks to the left, when a 64×64 luma coding tree block is not further split and the left one is split to the maximum depth. Advanced Motion Vector Prediction (AMVP) was introduced to modify motion vector competition to account for such a flexible block structure. During the development of HEVC, the initial AMVP design was significantly simplified to provide a good trade-off between coding efficiency and an implementation friendly design.

The initial design of AMVP included five MVPs from three different classes of predictors: three motion vectors from spatial neighbors, the median of the three spatial predictors and a scaled motion vector from a co-located, temporally neighboring block. Furthermore, the list of predictors was modified by reordering to place the most probable motion predictor in the first position, and by removing redundant candidates to assure minimal signaling overhead. Exhaustive experiments throughout the standardization process investigated how the complexity of this motion vector prediction and signaling scheme could be reduced without sacrificing too much coding efficiency. This led to significant simplifications of the AMVP design such as removing the median predictor, reducing the number of candidates in the list from five to two, fixing the candidate order in the list and reducing the number of redundancy checks. The final design of the AMVP candidate list construction includes the following two MVP candidates:

up to two spatial candidate MVPs that are derived from five spatial neighboring blocks;

one temporal candidate MVPs derived from two temporal, co-located blocks when both spatial candidate MVPs are not available or they are identical;

zero motion vectors when the spatial, the temporal or both candidates are not available.

Figure 32:
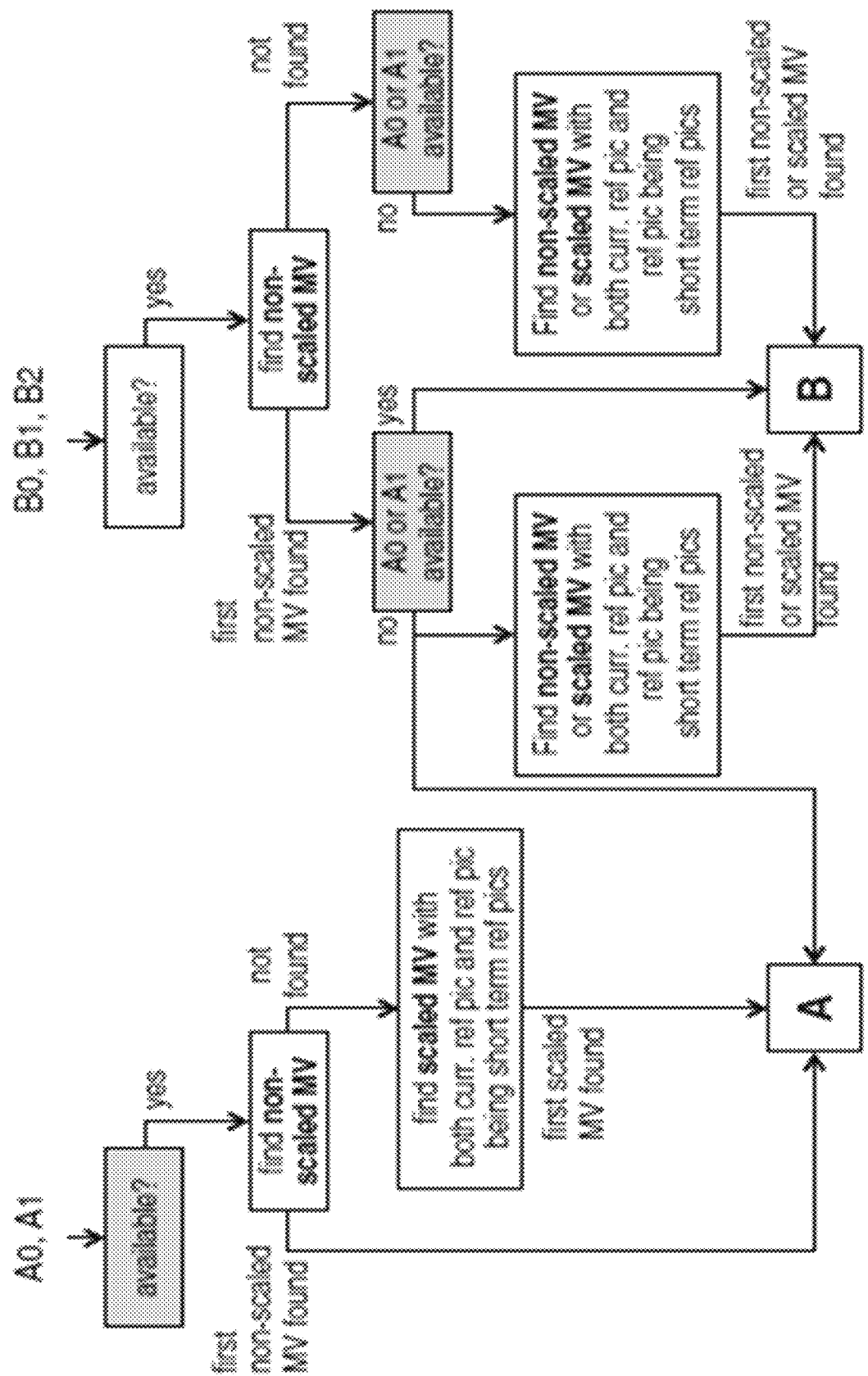
FIG. 32 illustrates a diagram of an example of quadrant partitions for the present disclosure.

In the spatial candidate description, the derivation process flow for the two spatial candidates A and B is depicted in FIG. 32. For candidate A, motion data from the two blocks A0 and A1 at the bottom left corner is taken into account in a two pass approach. In the first pass, it is checked whether any of the candidate blocks contain a reference index that is equal to the reference index of the current block. The first motion vector found will be taken as candidate A. When all reference indices from A0 and A1 are pointing to a different reference picture than the reference index of the current block, the associated motion vector cannot be used as is. Therefore, in a second pass, the motion vectors need to be scaled according to the temporal distances between the candidate reference picture and the current reference picture. The temporal distance is expressed in terms of difference between the picture order count (POC) values which define the display order of the pictures.

For candidate B, the candidates B0 to B2 are checked sequentially in the same way as A0 and A1 are checked in the first pass. The second pass, however, is only performed when blocks A0 and A1 do not contain any motion information, e.g. A0 and A1 are not available or coded using intra-picture prediction. Then, candidate A is set equal to the non-scaled candidate B, if found, and candidate B is set equal to a second, non-scaled or scaled variant of candidate B. Since the process may be end up in the second pass when there still might be potential non-scaled candidates, the second pass searches for non-scaled as well as for scaled MVs derived from candidates B0 to B2. Overall, this design allows to process A0 and A1 independently from B0, B1, and B2. The derivation of B be aware of the availability of both A0 and A1 in order to search for a scaled or an additional non-scaled MV derived from B0 to B2. This dependency is acceptable given that it significantly reduces the complex motion vector scaling operations for candidate B. Reducing the number of motion vector scalings represents a significant complexity reduction in the motion vector predictor derivation process.

Figure 12:
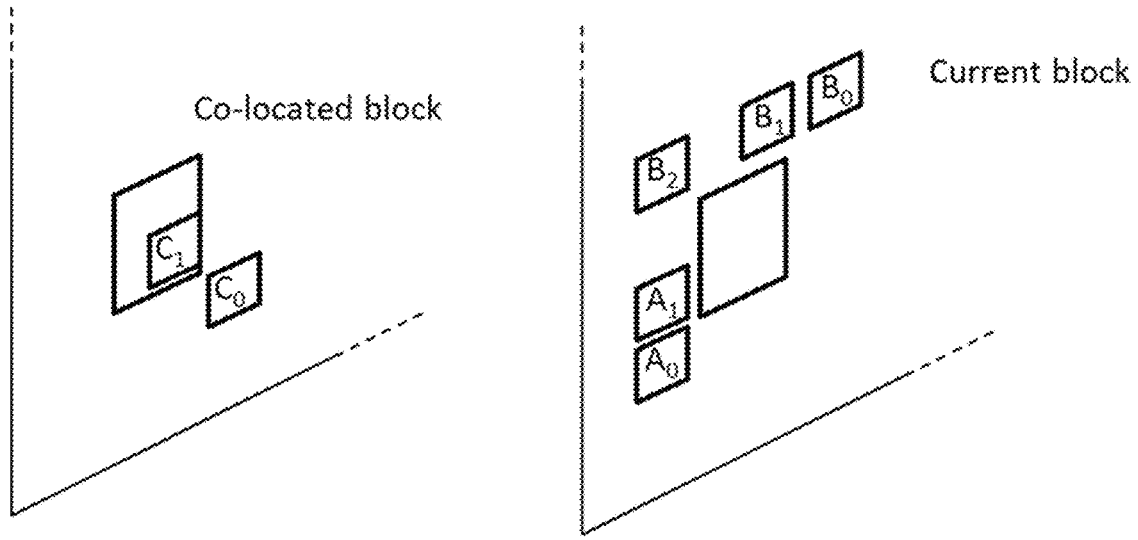
FIG. 12 illustrates potential merge estimation coding blocks in special and temporal domains.
Figure 13:
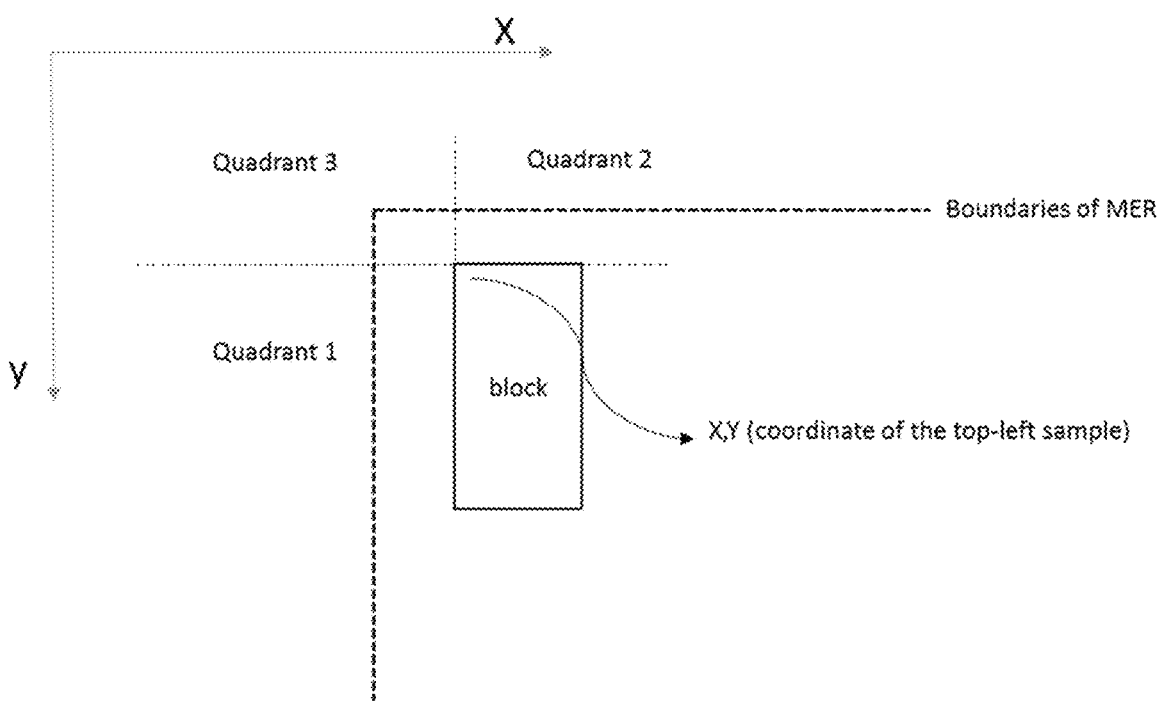
FIG. 13 illustrates a diagram of an example of quadrant partitions for the present disclosure.
Figure 14:
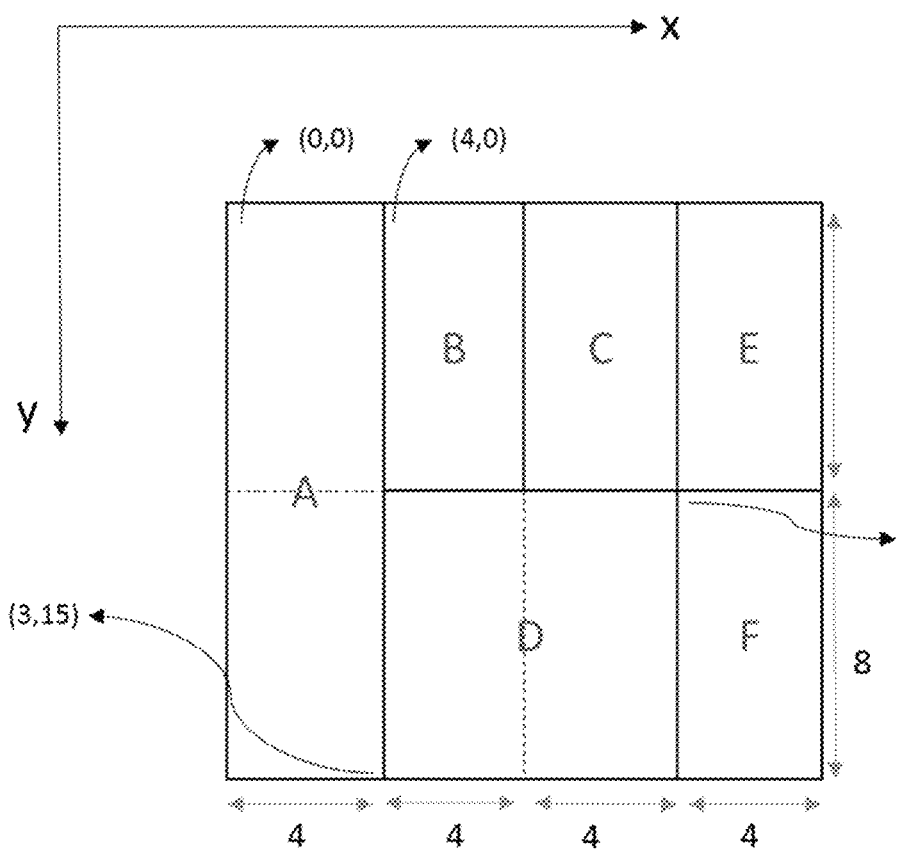
FIG. 14 illustrates a diagram of an example of block partitions an MER where the present disclosure applied.
Figure 15:
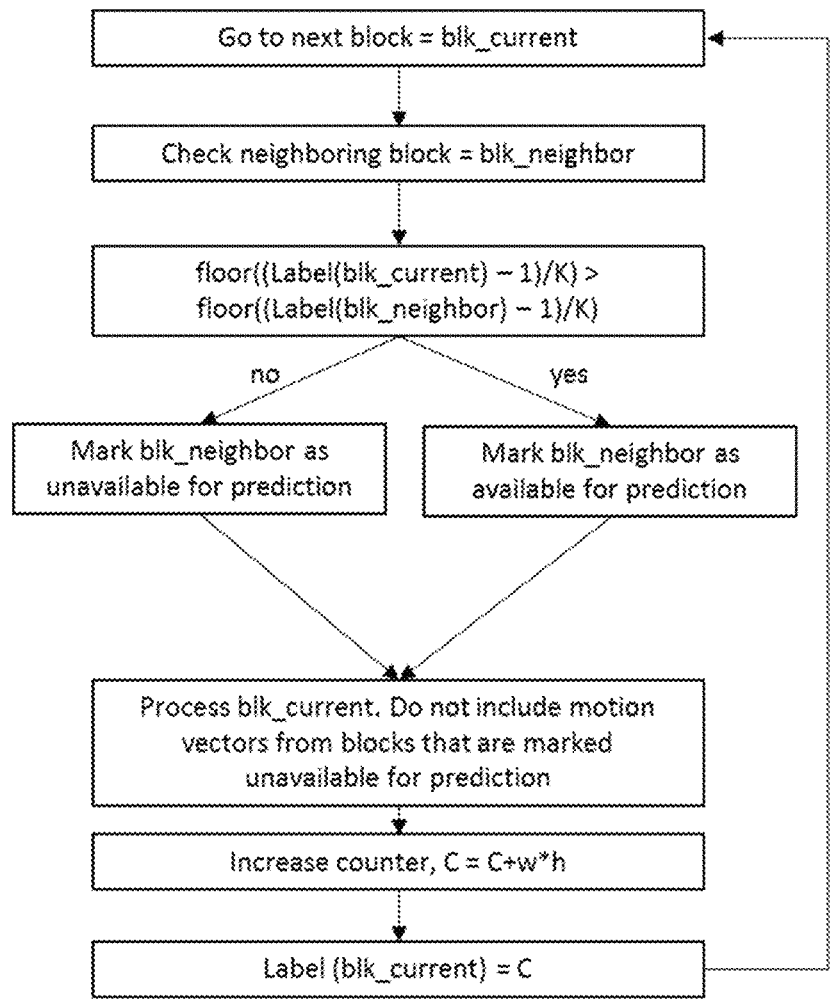
FIG. 15 is a working flow showing availability checking for a potential merge estimation coding blocks according to the present disclosure.
Figure 17:
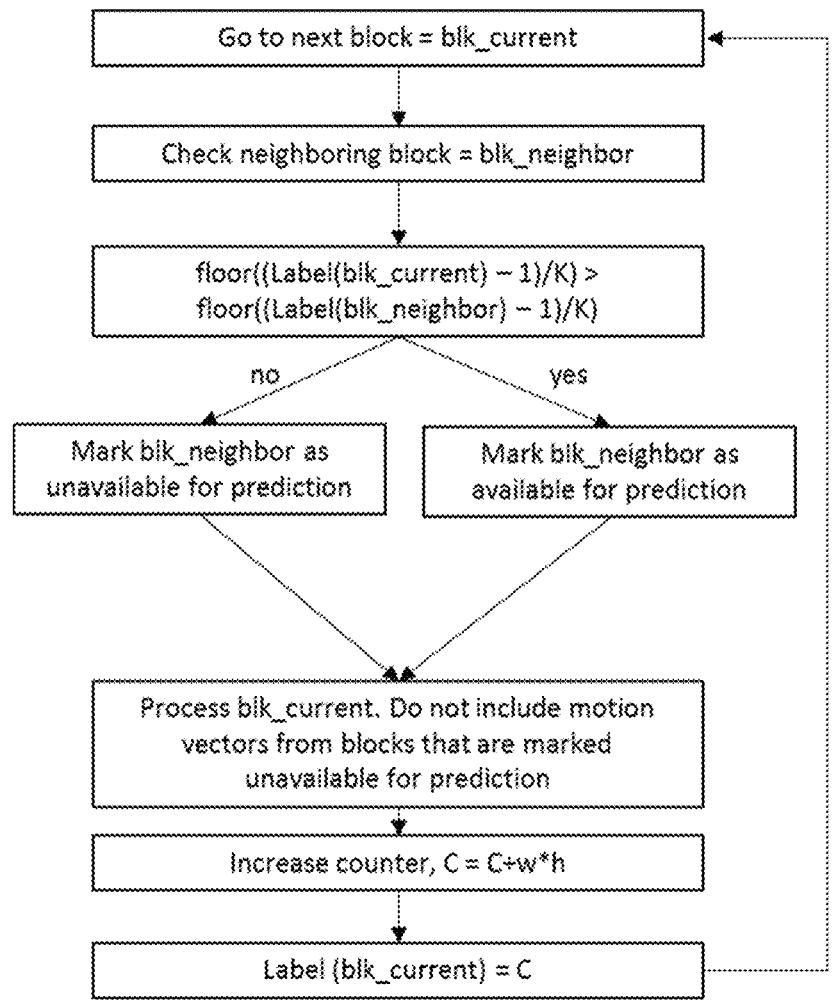
FIG. 17 is a working flow showing availability checking for a potential merge estimation coding blocks according to the present disclosure.
Figure 18:
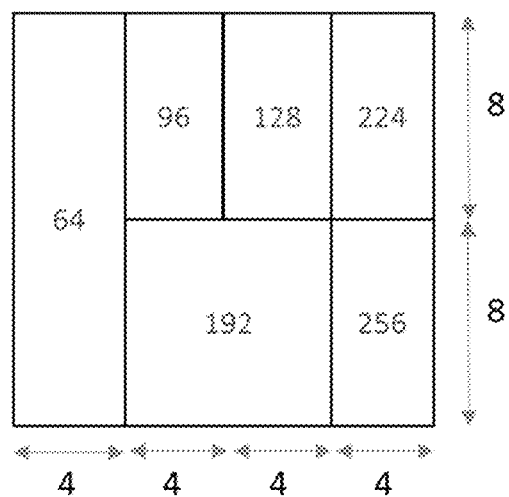
FIG. 18 illustrate a diagram of an example of labeled block partitions where the availability checking
Figure 19:
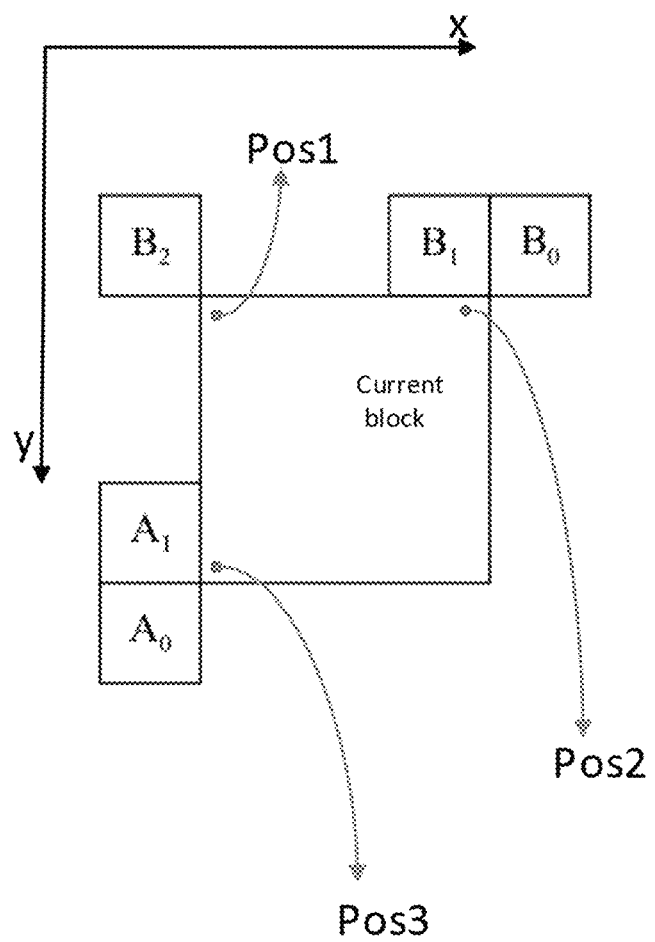
FIG. 19 illustrate an example about a current block and its spatial neighbor blocks.
Figure 20:
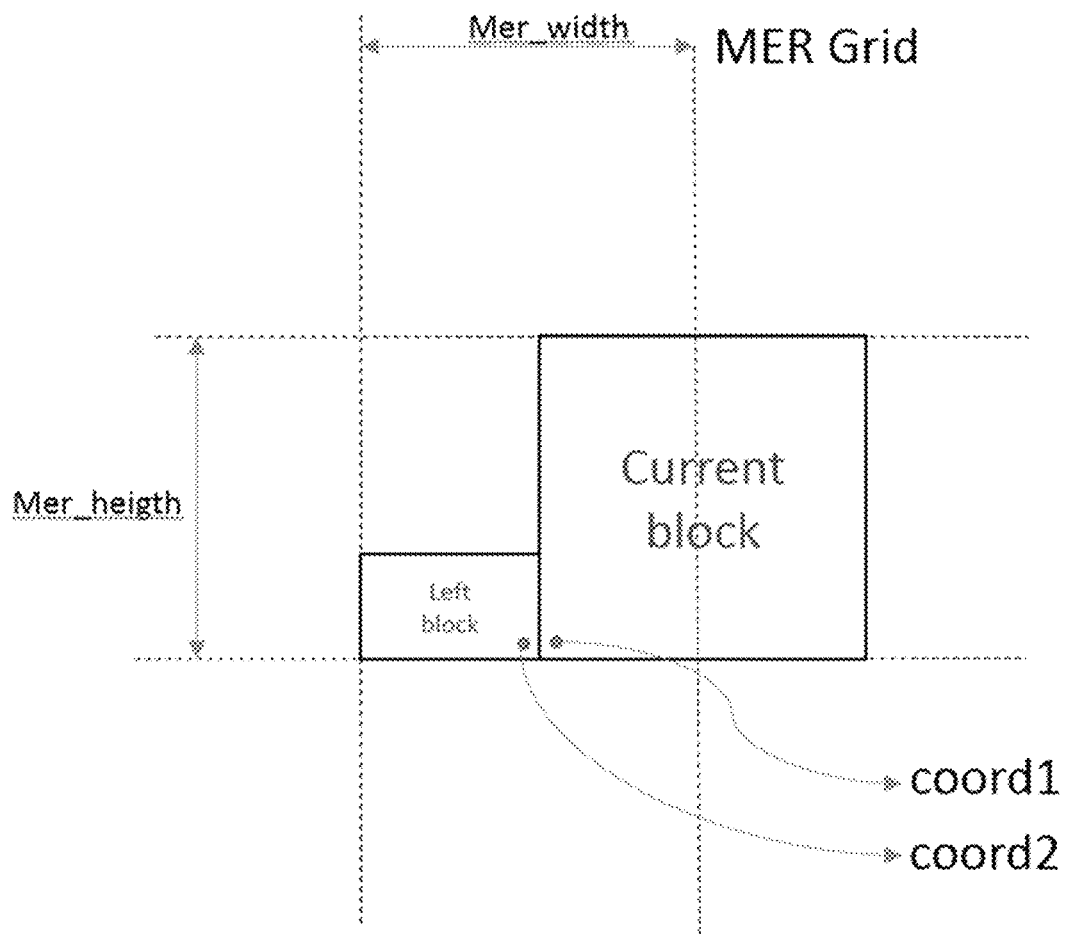
FIG. 20 illustrate an example about the sixth solution.
Figure 20A:
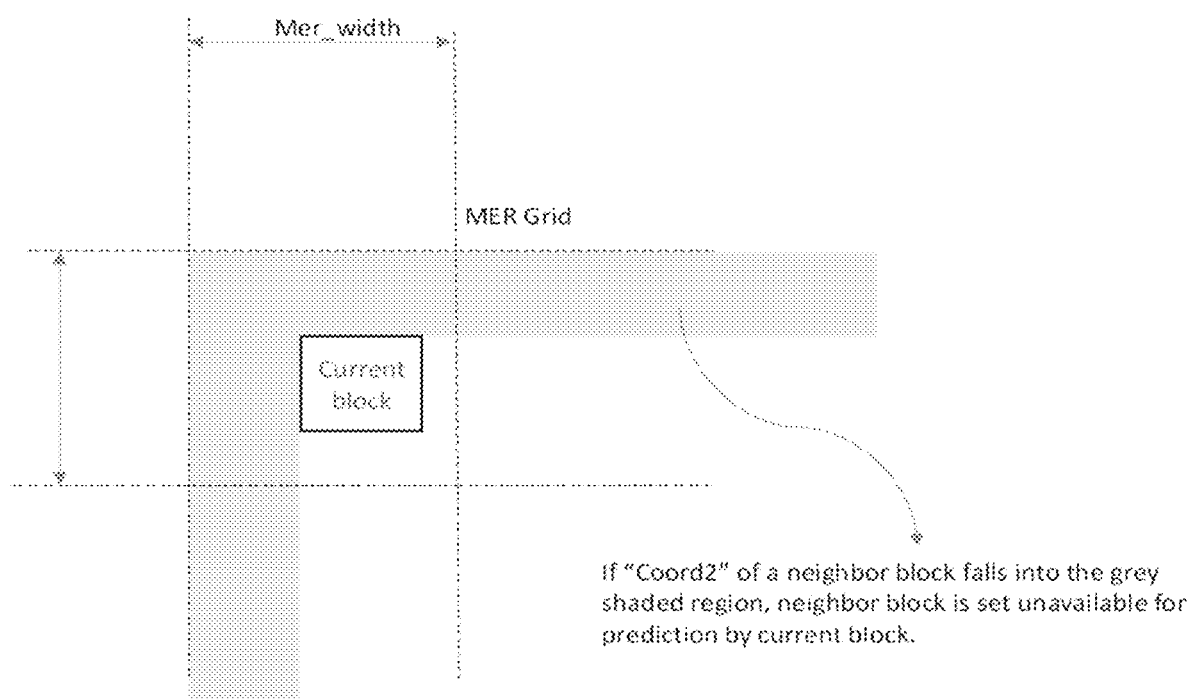
FIG. 20A illustrate an example of where a neighbor blocks falls into around the current block will be marked unavailable.
Figure 20B:
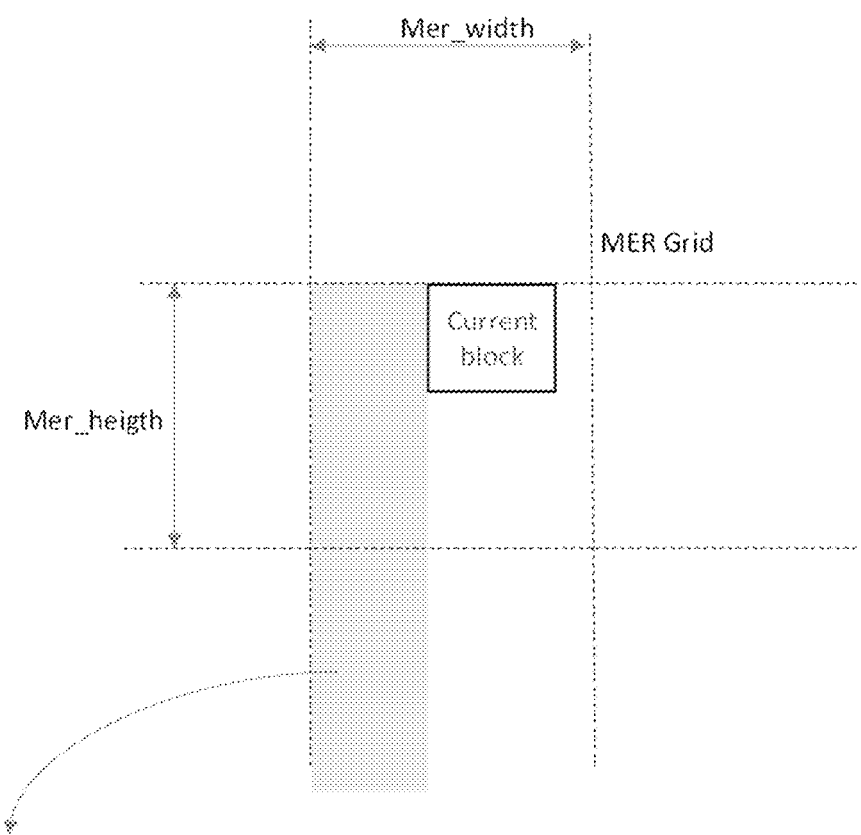
FIG. 20B illustrate another example of where a neighbor blocks falls into around the current block will be marked unavailable.
Figure 21:
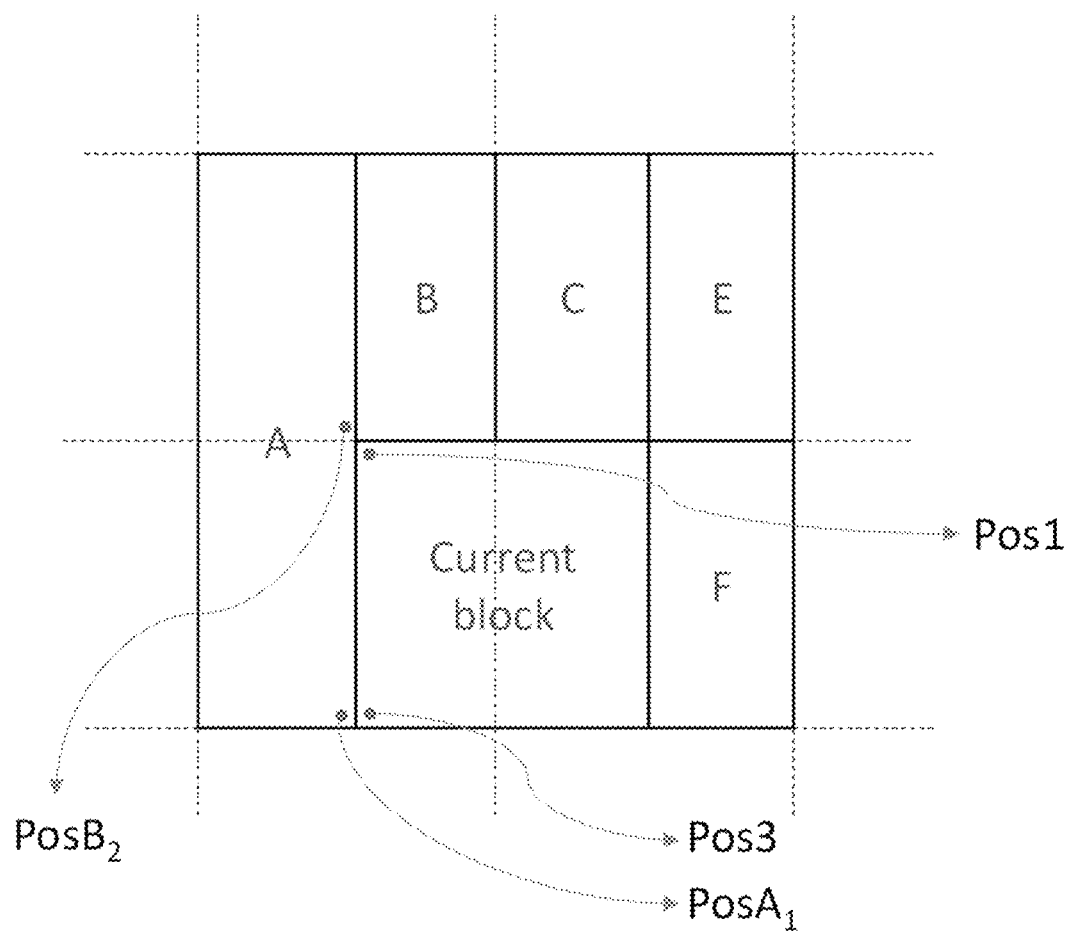
FIG. 21 illustrate an example of do merge estimation to remove the parallel processing restriction.
Figure 22:
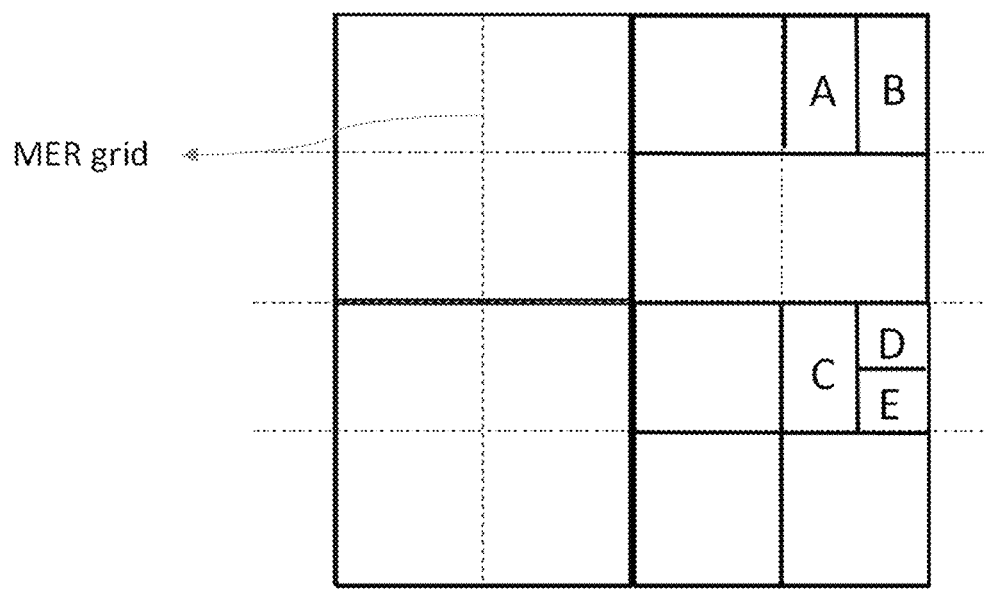
FIG. 22 illustrate an example of determine the availability of neighboring blocks FIG. 23 illustrate an example of the flowchart of the solution 12.

In the temporal candidate selection process. It can be seen from FIG. 12 that motion vectors from spatial neighboring blocks to the left and above the current block are considered as spatial MVP candidates. This can be explained by the fact that the blocks to the right and below the current block are not yet decoded and hence, their motion data is not available. Since the co-located picture is a reference picture which is already decoded, it is possible to also consider motion data from the block at the same position, from blocks to the right of the co-located block or from the blocks below. In HEVC, the block to the bottom right and at the center of the current block have been determined to be the most suitable to provide a good temporal motion vector predictor (TMVP). These candidates are illustrated in FIG. 12, where C0 represents the bottom right neighbor and C1 represents the center block. Motion data of C0 is considered first. If motion data of C0 is not available, motion data from the co-located candidate block at the center is used to derive the temporal MVP candidate C. The motion data of C0 is also considered as not being available when the associated PU belongs to a CTU beyond the current CTU row. This minimizes the memory bandwidth requirements to store the co-located motion data. In contrast to the spatial MVP candidates, where the motion vectors may refer to the same reference picture, motion vector scaling is mandatory for the TMVP.

For the Merge list construction or AMVP list construction, a history based motion vector predictor (HMVP) is used to the merge or AMVP list. The history-based MVP (HMVP) merge candidates are added to merge/AMVP list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

In VTM4, the HMVP table size S is set to be 6, which indicates up to 6 History-based MVP (HMVP) candidates may be added to the table. When inserting a new motion candidate to the table, a constrained first-in-first-out (FIFO) rule is utilized, wherein redundancy check is firstly applied to find whether there is an identical HMVP in the table. Identical HMVP is removed from the table and all the HMVP candidates afterwards are moved forward.

HMVP candidates could be used in the merge candidate list/AMVP list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:

Number of HMPV candidates is used for merge list generation is set as (N<=4) ? M: (8−N), wherein N indicates number of existing candidates in the merge list and M indicates number of available HMVP candidates in the table.

Once the total number of available merge candidates reaches the maximally allowed merge candidates minus 1, the merge candidate list construction process from HMVP is terminated.

In VVC Draft, paralleling to Inter mode, IBC mode is introduced.

Intra block copy (IBC) is a tool adopted in HEVC extensions on SCC. IBC mode is implemented as a block level coding mode, block matching (BM) is performed at the encoder to find the optimal block vector (or motion vector) for each CU. Here, a motion vector is used to indicate the displacement from the current block to a reference block, which is already reconstructed inside the current picture. The luma motion vector of an IBC-coded CU is in integer precision. The chroma motion vector is clipped to integer precision as well. When combined with AMVR, the IBC mode can switch between 1-pel and 4-pel motion vector precisions. An IBC-coded CU is treated as the third prediction mode other than intra or inter prediction modes.

To reduce memory consumption and decoder complexity, the IBC in VTM4 allows only the reconstructed portion of the predefined area including current CTU to be used. This restriction allows the IBC mode to be implemented using local on-chip memory for hardware implementations.

At the encoder side, hash-based motion estimation is performed for IBC. The encoder performs RD check for blocks with either width or height no larger than 16 luma samples. For non-merge mode, the block vector search is performed using hash-based search first. If hash search does not return valid candidate, block matching based local search will be performed.

In the hash-based search, hash key matching (32-bit CRC) between the current block and a reference block is extended to all allowed block sizes. The hash key calculation for every position in the current picture is based on 4×4 sub-blocks. For the current block of a larger size, a hash key is determined to match that of the reference block when all the hash keys of all 4×4 sub-blocks match the hash keys in the corresponding reference locations. If hash keys of multiple reference blocks are found to match that of the current block, the block vector costs of each matched reference are calculated and the one with the minimum cost is selected.

In block matching search, the search range is set to be N samples to the left and on top of the current block within the current CTU. At the beginning of a CTU, the value of N is initialized to 128 if there is no temporal reference picture, and initialized to 64 if there is at least one temporal reference picture. A hash hit ratio is defined as the percentage of samples in the CTU that found a match using hash-based search. While encoding the current CTU, if the hash hit ratio is below 5%, N is reduced by half.

At CU level, IBC mode is signaled with a flag and it can be signaled as IBC AMVP mode or IBC skip/merge mode as follows:

IBC skip/merge mode: a merge candidate index is used to indicate which of the block vectors in the list from neighboring candidate IBC coded blocks is used to predict the current block. The merge list consists of spatial, HMVP, and pairwise candidates.

IBC AMVP mode: block vector difference is coded in the same way as a motion vector difference. The block vector prediction method uses two candidates as predictors, one from left neighbor and one from above neighbor (if IBC coded). When either neighbor is not available, a default block vector will be used as a predictor. A flag is signaled to indicate the block vector predictor index.

Since IBC introduced the IBC merge/skip mode and IBC AMVP mode, there is additional IBC merge list and AMVP list to be constructed in the VVC Draft 4.0.

In VVC Draft 4.0 or U.S. provisional application 62/777, 740, a shared merge list method is introduced.

the merge sharing node will be decided for each CU inside a CTU, during parsing stage of decoding; moreover, the merge sharing node is an ancestor node of leaf CU which must satisfy the following 2 criteria:

(1) The merge sharing node size is equal to or larger than a size threshold;

(2) In the merge sharing node, one of the child CU size is smaller than the size threshold.

Moreover, no samples of the merge sharing node are outside the picture boundary has to be guaranteed. During parsing stage, if an ancestor node satisfies the criteria (1) and (2) but has some samples outside the picture boundary, this ancestor node will not be the merge sharing node and it proceeds to find the merge sharing node for its child CUs.

Additionally, the shared list region is determined based on the following steps:

Two leaf node blocks (block 1 and block 2) are considered to be in the same shared merge list region based on following steps:

Step 1: Defining the CTU of the block 1 (or block 2) as a parent block of block 1.

Step 2: If the parent block does not contain the block 2 (or block1), the two leaf node blocks are NOT considered to be in the same merge estimation region. The following steps are not performed and the checking process is terminated;

Otherwise (if the parent block contains both block 1 and block 2), if the parent block contains the block 2 (or block 1), the current split mode of the parent blocks is checked, and the parent block size is checked as follows.

Step 3:

If the current split mode of the parent block is binary tree split and the parent block size is equal to a threshold, the two leaf node blocks are considered to be in the same merge estimation region, the parent block is defined as the shared merge list region;

Otherwise, if the current split mode of the parent block is ternary tree split and the parent block size is equal to the said threshold multiplied by 2, the two leaf node blocks are considered to be in the same merge estimation region, the parent block is defined as the shared merge list region;

Otherwise, if the current split mode of the parent block is quadtree split and the parent block size is equal to the said threshold multiplied by 2, and the two leaf node blocks are both located in the parent block, the two leaf node blocks are considered to be in the same merge estimation region and the parent block is defined as the shared merge list region.

Step 4: If none of the conditions (listed as bullet items) are satisfied in Step 3, the parent block according to the current split mode of the parent block and the resulting child block which contains block 1 (or block 2) is updated as parent block, the updated parent block is recursively checked by going to the step 2.

The shared merge list method addressed to the hardware implementation i.e. bottleneck of 4×4 block merge list construction. However, the method in the latest VVC Draft 4.0 (JVET-M1001) is not applying shared merge list method into IBC mode.

Besides, the AMVP list construction bottleneck (4×4 block) may also hard for hardware implementation.

Additionally, the conventional solutions are not addressed to general jointed shared list for merge/AMVP list construction for IBC and Inter mode.

Figure 6:
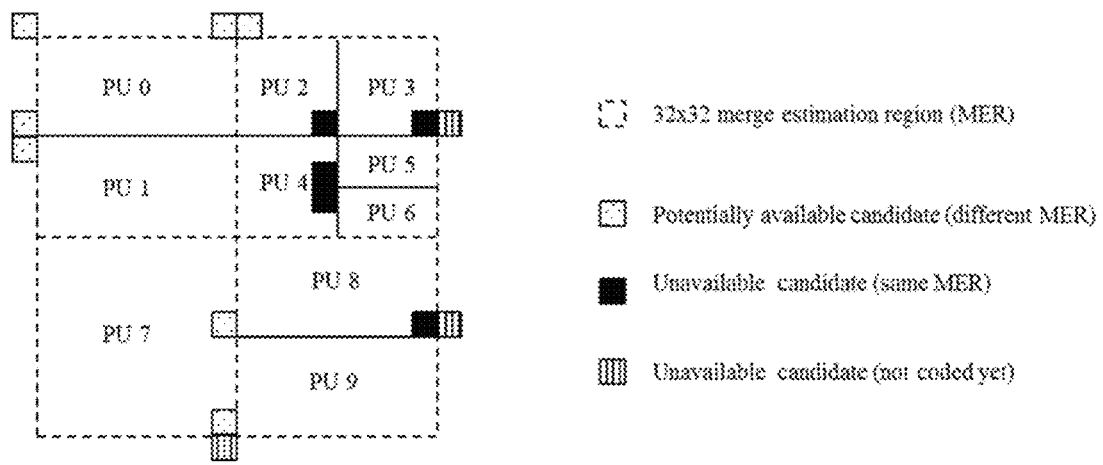
FIG. 6 illustrates an MER based candidate block availability status during a merge estimation.

A parallel merge estimation level was introduced in HEVC, that indicates the region in which merge candidate lists can be independently derived, by checking whether a candidate block is located in that merge estimation region (MER). A candidate block that is in the same MER is not included in the merge candidate list. Hence, its motion data does not need to be available at the time of the list construction. When this level is e.g. 32, all prediction units in a 32×32 area can construct the merge candidate list in parallel, since all merge candidates that are in the same 32×32 MER, are not inserted in the list. As shown in FIG. 6, there is a CTU partitioning with seven CUs and ten PUs. All potential merge candidates for the first PU0 are available because they are outside the first 32×32 MER. For the second MER, merge candidate lists of PUs 2-6 cannot include motion data from these Pus, when the merge estimation inside that MER should be independent. Therefore, take PU5 as an example, no merge candidates are available and hence not inserted in the merge candidate list. In that case, the merge list of PU5 consists of the temporal candidate (if available) and zero MV candidates. In order to enable an encoder to trade-off parallelism and coding efficiency, the parallel merge estimation level is adaptive and signaled as log 2_parallel_merge_level_minus2 in the picture parameter set.

However, as discussed in the background, that the parallel merge estimation level that is used in HEVC is not efficient, because the VVC introduces more partitions modes which results irregular (no-square) coding blocks which will hinder the parallel processing for merge estimation of the coding blocks. The present disclosure provides several solution to resolves the problems as discussed above.

Figure 31:
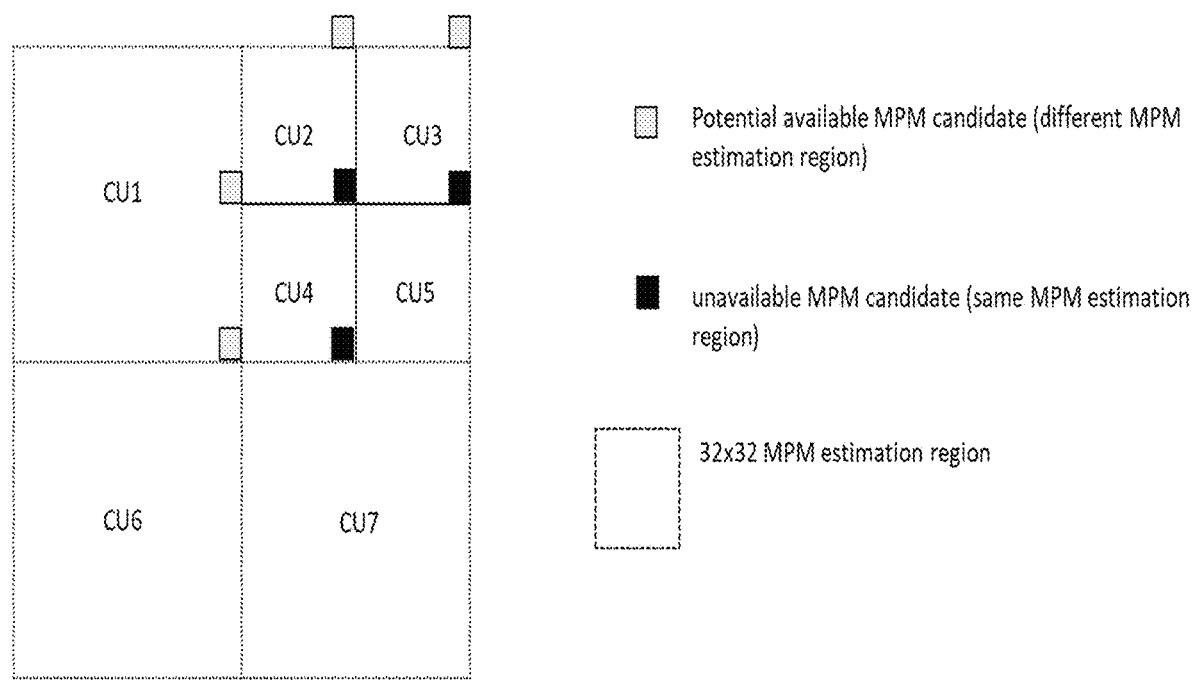
FIG. 31 illustrate an example of MPM estimation region.

Furthermore, a MPM estimation region is introduced in this disclosure. In a MPM estimation region, MPM candidate lists can be independently derived by checking whether a candidate block is located in that MPM estimation region. A candidate block that is in the same MPM estimation region is not included in the MPM candidate list. Hence, intra mode of this candidate block is not need to be available at the time of the list construction. When this level is e.g. 32, all prediction units in a 32×32 area may construct the MPM list in parallel since all most probable intra mode candidates that are in the same 32×32 MPM estimation region, are not inserted in the list. As illustrated in FIG. 31, the dash lines are illustrated the 32×32 MPM estimation region, for CU2, both left and above MPM candidates are potential available. For CU3, the left MPM candidate is not available because CU2 and CU3 are located in the same MPM estimation region. For CU4, the top MPM candidate estimation region is unavailable, because CU4 and CU2 are located in the same MPM estimation region. For CU4, both top and left MPM candidates are not available, because the CU2, CU4 and CU5 are located in the same MPM estimation region.

The following solutions are also addressing the MPM estimation region determination methods.

It could be understood that, if the two leaf blocks are determined not to be in the same MER or same MPM estimation region means that the two leaf blocks are determined not to be in the same MER or the two leaf blocks are determined not to be in the same MPM estimation region. As when the prediction mode of the leaf blocks are inter prediction, whether leaf blocks are considered to be in the same merge estimation region is determined; and when the prediction mode of the leaf blocks are intra prediction, whether leaf blocks are considered to be in the same MPM estimation region is determined.

Solution 1

According to solution 1, a shared merge list method is applied to IBC mode.

In the IBC mode, merge list is constructed by spatial candidate, LBC HVMP list and pairwise of the existing candidate. The IBC spatial candidates are selected same as regular merge mode spatial candidates. If the neighboring block is also used IBC mode, then the spatial candidate will be inserted to the IBC merge candidate list with pruning. The IBC HMVP list is constructed based on the rule of the regular HMVP list. When a mode of the history block is IBC mode, a HMVP candidate will be inserted to the HMVP list.

In the solution 1, if two blocks are belong to one shared list region. Then one IBC merge list is constructed based on the shared list region. A spatial candidate is determined by the shared list region area. The HMVP list which are constructed before the shared list region is used. In an example, the shared list region is determined same as JVET-M1001 or U.S. provisional application 62/777,740.

For example, if a 4×8 IBC shared list region contains two 4×4 IBC mode blocks (marked as block 1 and block 2). One IBC merge list is constructed for block 1 and block 2, the spatial candidate is A0, A1, B0, B1, and B2 of the 4×8 area. The HMVP candidate is selected from the list before block 1 is reconstructed. Note the motion information of block 1 is updated into a backup HMVP list, the backup HMVP list is used for blocks reconstructed later then the 4×8 shared list area, but the backup HMVP list is not used for the IBC block 2.

Solution 2

According to solution 2, a shared AMVP list/shared IBC AMVP list is disclosed.

A shared list region is determined for block based on the method in JVET-M1001 or U.S. provisional application 62/777,740.

When multiple inter blocks in a shared list region is processed by using AMVP mode, then one AMVP list is constructed based on the shared list region, the region is noticed as shared AMVP list region.

In a shared AMVP list mode. The spatial candidate is determined according to the shared AMVP list region. The HMVP list which are constructed before the shared AMVP list region is used.

For example, if a 4×8 shared AMVP list region contains two 4×4 inter mode blocks (marked as block 1 and block 2). One AMVP is constructed for inter block 1 and inter block 2, the spatial candidate is A0, A1, B0, B1, and B2 of the 4×8 area. The HMVP candidate is selected from the list before inter block 1 is reconstructed. Note the motion information of block 1 is updated into a backup HMVP list, the backup HMVP list is used for blocks reconstructed later then the 4×8 shared list area, but the backup HMVP list is not used for the IBC block 2.

When multiple IBC blocks in the shared list region are using IBC AMVP mode, then one IBC AMVP list is constructed based on the shared list region, the region is noticed as shared IBC AMVP list region.

In a shared IBC AMVP list mode, a spatial candidate is determined by the shared IBC AMVP list region. The IBC HMVP list which are constructed before the shared IBC AMVP list region is used.

For example, if a 4×8 shared IBC AMVP list region contains two 4×4 IBC mode blocks (marked as block 1 and block 2). One IBC AMVP is constructed for block 1 and block 2, the spatial candidate is A0, A1, B0, B1, and B2 of the 4×8 area. The IBC HMVP candidate is selected from the list before IBC block 1 is reconstructed. Note the motion information of block 1 is updated into a backup HMVP list, the backup HMVP list is used for blocks reconstructed later then the 4×8 shared list area, but the backup HMVP list is not used for the IBC block 2.

Solution 3

If both shard IBC merge list (solution 1), and shared IBC AMVP list (solution2) is applied, in one case of IBC merge/AMVP list interacted applied in a shared list region.

Figure 33:
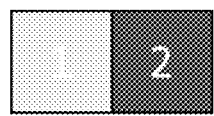
FIG. 33 illustrates a diagram of an example of shared list region where the present disclosure applied.
Figure 33:
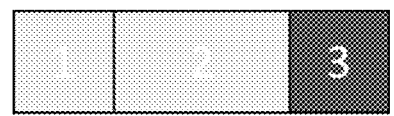
Figure 33:
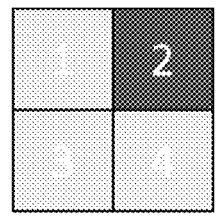

In an example, a threshold is 32 (for example, 32 luma samples). In FIG. 33 (*a*), a 8×4 block is split into 2 4×4 blocks according to a binary tree split mode. These two blocks are IBC block, left block (marked as block1) uses IBC Merge mode, right block (marked as block 2) uses IBC AMVP mode. In this case, one 4×4 IBC merge list is constructed based on the 8×4 shared list region for block 1. One 4×4 IBC AMVP list is constructed based on the 8×4 shared list region for block 2.

In solution 3, one kind of IBC motion estimation mode can be used in a shared list region for IBC blocks.

- If an IBC block belongs to a shared list region, and any one of the previous block is processed by using IBC merge mode, then the IBC AMVP mode for current block is disallowed;
- If an IBC block belongs to a shared list region, and any one of the previous block is processed by using IBC AMVP mode, then the IBC Merge mode for current block is disallowed.

In an example, in FIG. 33 (*a*), block 1 and block 2 are in a shared list region (for example, the block 1 and block 2 construct the shared list region, no other block in this region), block 1 is processed by using IBC merge mode. Block 2 cannot use IBC AMVP mode when block 2 is processed by using IBC mode. When block 2 is not IBC mode, all mode is allowed.

In an example, in FIG. 33 (*b*), block 1, block 2 and block 3 are in a shared list region (for example, the block 1, block 2 and block 3 construct the shared list region, no other block in this region), if block 1 is processed by using IBC merge mode, block 2 cannot use IBC AMVP mode when block 2 is processed by using IBC mode. When block 2 is not processed by using IBC mode, all mode is allowed. If any one of block 1 and block 2 is processed by using IBC merge mode, then block 3 cannot use IBC AMVP mode when block 3 is IBC mode. When block 3 is not IBC mode, all mode is allowed.

In an example, in FIG. 33 (*c*), block 1, block 2, block 3 and block 4 are in a shared list region (for example, the block 1, block 2, block 3 and block 4 construct the shared list region, no other block in this region), if block 1 is processed by using IBC merge mode, block 2 cannot use IBC AMVP mode when block 2 is processed by using IBC mode. When block 2 is not processed by using IBC mode, all mode is allowed. If any one of block 1 and block 2 is processed by using IBC merge mode, then block 3 cannot use IBC AMVP mode when block 3 is processed by using IBC mode. When block 3 is not processed by using IBC mode, all mode is allowed. If any one of block 1, block 2 or block 3 is processed by using IBC merge mode, then block 4 cannot use IBC AMVP mode when block 4 is IBC mode. When block 4 is not processed by using IBC mode, all mode is allowed.

Solution 4

For inter blocks, shared merge list (for example, shared merge list disclosed in JVET-M1001 or U.S. provisional application 62/777,740), and shared AMVP list (solution 2) applied. Then one case of merge/AMVP list interacted applied in a shared list region.

To avoid such kind of case, in solution 4, one kind of motion estimation mode can be used in a shared list region for inter blocks.

- If an inter block belongs to a shared list region, and any one of the previous block is processed by using merge mode, then the AMVP mode for current block is disallowed;
- If an inter block belongs to a shared list region, and any one of the previous block is processed by using AMVP mode, then the Merge mode for current block is disallowed.

In an example, in FIG. 33 (*a*), block 1 and block 2 are in a shared list region (for example, the block 1 and block 2 construct the shared list region, no other block in this region), if block 1 is processed by using merge mode, then block 2 cannot use AMVP mode when block 2 is inter mode. When block 2 is not processed by using inter mode, all mode is allowed.

In an example, in FIG. 33 (*b*), block 1, block 2 and block 3 are in a shared list region (for example, the block 1, block 2 and block 3 construct the shared list region, no other block in this region), if block 1 is processed by using merge mode, then block 2 cannot use AMVP mode when block 2 is inter mode. When block 2 is not processed by using inter mode, all mode is allowed. If any of block 1 and block 2 is processed by using merge mode, then block 3 cannot use AMVP mode when block 3 is processed by using inter mode. When block 3 is not processed by using inter mode, all mode is allowed.

In an example, in FIG. 33 (*c*), block 1, block 2, block 3 and block 4 are in a shared list region (for example, the block 1, block 2, block 3 and block 4 construct the shared list region, no other block in this region), if block 1 is processed by using merge mode, then block 2 cannot use AMVP mode when block 2 is inter mode. When block 2 is not processed by using inter mode, all mode is allowed. If any of block 1 and block 2 is processed by using merge mode, then block 3 cannot use AMVP mode when block 3 is inter mode. When block 3 is not processed by using inter mode, all mode is allowed. If any of block 1, block 2 or block 3 is processed by using merge mode, then block 4 cannot use AMVP mode when block 4 is inter mode. When block 4 is not processed by using inter mode, all mode is allowed.

Solution 5

According to Solution 5, the solution 3 and solution 4 can be applied together within the same shared list region without interaction. Namely, If an IBC block belongs to a shared list region, and any of the previous block is processed by using IBC merge mode, then the IBC AMVP mode for current block is disallowed If an IBC block belongs to the shared list region, and any of the previous block is processed by using IBC AMVP mode, then the IBC Merge mode for current block is disallowed.

If an inter block belongs to the shared list region, and any of the previous block is processed by using merge mode, then the AMVP mode for current block is disallowed If an inter block belongs to the shared list region, and any of the previous block is processed by using AMVP mode, then the Merge mode for current block is disallowed.

Solution 6

According to solution 6, the solution 3 and solution 4 can be applied together within the same shared list region with interaction. Namely, If an IBC block belongs to a shared list region, and any of the previous block is processed by using IBC merge mode, then the IBC AMVP mode, inter AMVP mode or inter merge mode for current block is disallowed If an IBC block belongs to the shared list region, and any of the previous block is processed by using IBC AMVP mode, then the IBC Merge mode, inter AMVP mode or inter merge mode for current block is disallowed.

If an inter block belongs to the shared list region, and any of the previous block is processed by using merge mode, then the AMVP mode, IBC AMVP mode or IBC merge mode for current block is disallowed.

If an inter block belongs to the shared list region, and any of the previous block is processed by using AMVP mode, then the Merge mode, IBC AMVP mode or IBC merge mode for current block is disallowed.

Solution 7

According to solution 7, the solution 3 and solution 4 can be applied together within the same shared list region with interaction. Namely, If an IBC block belongs to a shared list region, and any of the previous block is processed by using IBC merge mode, then the IBC AMVP mode or inter AMVP mode for current block is disallowed If an IBC block belongs to the shared list region, and any of the previous block is processed by using IBC AMVP mode, then the IBC Merge mode or inter merge mode for current block is disallowed.

If an inter block belongs to the shared list region, and any of the previous block is processed by using merge mode, then the AMVP mode or IBC AMVP mode for current block is disallowed If an inter block belongs to the shared list region, and any of the previous block is processed by using AMVP mode, then the Merge mode or IBC merge mode for current block is disallowed.

Solution 8

According to the solution 8, the solution 1 of shared IBC merge list and regular shared merge list (for example, shared merge list disclosed in JVET-M1001 or U.S. provisional application 62/777,740) can be applied together in the same shared list region.

This solution is avoiding the case that in one shared list region one block is construct a IBC merge list, and the other block is construct a regular merge list.

To avoid such kind of worst case, in solution 8,

If an IBC block belongs to a shared list region, and any of the previous block is processed by using inter merge mode, then the IBC merge mode for current block is disallowed If an inter block belongs to a shared list region, and any of the previous block is processed by using IBC merge mode, then the inter Merge mode for current block is disallowed In an example, in FIG. 33 (a), block 1 and block 2 are in a shared list region (for example, the block 1 and block 2 construct the shared list region, no other block in this region), if block 1 is processed by using IBC merge mode, then block 2 cannot use inter mode when block 2 is inter mode. When block 2 is not processed by using inter mode, all mode is allowed.

In an example, in FIG. 33 (b), block 1, block 2 and block 3 are in a shared list region (for example, the block 1, block 2 and block 3 construct the shared list region, no other block in this region), if block 1 is processed by using IBC merge mode, then block 2 cannot use inter merge mode when block 2 is inter mode. When block 2 is not processed by using inter mode, all mode is allowed. If any of block 1 and block 2 is processed by using IBC merge mode, then block 3 cannot use inter merge mode when block 3 is inter mode. When block 3 is not processed by using inter mode, all mode is allowed.

In an example, in FIG. 33 (c), block 1, block 2, block 3 and block 4 are in a shared list region (for example, the block 1, block 2, block 3 and block 4 construct the shared list region, no other block in this region), if block 1 is processed by using IBC merge mode, then block 2 cannot use inter merge mode when block 2 is inter mode. When block 2 is not processed by using inter mode, all mode is allowed. If any of block 1 and block 2 is processed by using IBC merge mode, then block 3 cannot use inter merge mode when block 3 is inter mode. When block 3 is not processed by using inter mode, all mode is allowed. If any of block 1, block 2 or block 3 is processed by using IBC merge mode, then block 4 cannot use inter merge mode when block 4 is inter mode. When block 4 is not processed by using inter mode, all mode is allowed.

Solution 9

According to the solution 9, the solution 2 of shared LBC AMVP list and regular shared AMVP list (solution 2) can be applied together in the same shared list region.

This solution is avoiding the case that in one shared list region one block is construct a IBC AMVP list and the other block is construct a regular AMVP list.

To avoid such kind of worst case, in solution 9,

If an IBC block belongs to a shared list region, and any of the previous block is processed by using inter AMVP mode, then the IBC AMVP mode for current block is disallowed.

If an inter block belongs to a shared list region, and any of the previous block is processed by using IBC AMVP mode, then the inter AMVP mode for current block is disallowed.

In an example, in FIG. 33 (a), block 1 and block 2 are in a shared list region (for example, the block 1 and block 2 construct the shared list region, no other block in this region), if block 1 is processed by using IBC AMVP mode, then block 2 cannot use AMVP mode when block 2 is inter mode. When block 2 is not processed by using inter mode, all mode is allowed.

In an example, in FIG. 33 (b), block 1, block 2 and block 3 are in a shared list region (for example, the block 1, block 2 and block 3 construct the shared list region, no other block in this region), if block 1 is processed by using IBC AMVP mode, then block 2 cannot use inter AMVP mode when block 2 is inter mode. When block 2 is not processed by using inter mode, all mode is allowed. If any of block 1 and block 2 is processed by using IBC AMVP mode, then block 3 cannot use inter AMVP mode when block 3 is inter mode. When block 3 is not processed by using inter mode, all mode is allowed.

In an example, in FIG. 33 (*c*), block 1, block 2, block 3 and block 4 are in a shared list region (for example, the block 1, block 2, block 3 and block 4 construct the shared list region, no other block in this region), if block 1 is processed by using IBC AMVP mode, then block 2 cannot use inter AMVP mode when block 2 is inter mode. When block 2 is not processed by using inter mode, all mode is allowed. If any of block 1 and block 2 is processed by using IBC AMVP mode, then block 3 cannot use inter AMVP mode when block 3 is inter mode. When block 3 is not processed by using inter mode, all mode is allowed. If any of block 1, block 2 or block 3 is processed by using IBC AMVP mode, then block 4 cannot use inter AMVP mode when block 4 is inter mode. When block 4 is not processed by using inter mode, all mode is allowed.

Solution 10:

According to solution 10, two leaf blocks are considered to be in the same merge estimation region or same MPM estimation region if both of the following conditions are satisfied:

two leaf blocks belong to a same parent block (or parent of a parent block, or parent of a parent of a parent block etc.) and the same parent block is smaller in size than a threshold.

If a prediction mode of a leaf block is inter prediction and the above conditions are satisfied, the two leaf blocks are considered to be in the same merge estimation region; if the prediction mode of the leaf block is intra prediction and the above conditions are satisfied, the two leaf blocks are considered to be in the same MPM estimation region.

If the two leaf blocks are considered to be in the same merge estimation region, motion information of the first leaf block in coding order is set unavailable for prediction by the second block. Otherwise, the motion information of the first leaf block is set available for prediction by the first block.

If the two leaf blocks are considered to be in the same MPM estimation region, the intra prediction mode of the first leaf block in coding order is set unavailable for prediction by the second block. Otherwise, the intra prediction mode of the first leaf block is set available for prediction by the first block.

It is noted that due to the recursive splitting process, a leaf block might have more than one parent block at different hierarchy levels (direct parent, parent of parent etc.). According to the solution 10, if there is at least one parent block (at any hierarchy level) that contains the two leaf blocks, they (the two leaf blocks) are considered to belong to the same parent block. Moreover the hierarchy level might be different for the two leaf blocks, meaning that number of splitting operations starting from the parent block to obtain the leaf block might be different for the two leaf blocks.

According to one implementation, the threshold is computed as the number of pixel samples inside a parent coding block, which is computed as width multiplied by height of that coding block. According to another implementation of solution 10, the threshold is a positive integer number and the size of a block is computed based on the width of the block. According to a third implementation of solution 10, the threshold is a positive integer number and the size of a block is computed based on the height of the block. In general, the size of a block is computed based on the width and the height of the block, taking both of them into account.

Solution 11:

According to solution 11, two leaf blocks are considered to be in the same merge estimation region or same MPM estimation region if both of the following conditions are satisfied:

they belong to a same parent block (or recursively parent of a parent block, or parent of a parent of a parent block etc.) and the number of splitting operations that are performed in order to obtain the parent block are greater than a threshold.

If the two leaf blocks are considered to be in the same merge estimation region, motion information of the first block in coding order is set unavailable for prediction by the second block. Otherwise, the motion information of the first block is set available for prediction by the second block.

If the two leaf blocks are considered to be in the same MPM estimation region, the intra prediction mode of the first block in coding order is set unavailable for prediction by the second block. Otherwise, the motion information of the first block is set available for prediction by the second block.

According to solution 11, the threshold comparison is performed based on the number of quadtree, binary tree and ternary tree splitting operations that were performed in order to obtain the parent block. As an example, assume that the number of quadtree splitting operations that are performed to obtain the parent block is represented by qtDepthThr, and the number of binary and ternary tree splitting operations that are performed are represented collectively by mttDepth (the terms qtDepth and mttDepth are used according to the document JVET-L1001-v1, Versatile Video Coding (Draft 3), which can be obtained from the website http://phenix.it-sudparis.eu/jvet. qtDepth denotes the quadtree partition depth, which is equivalent to number of quadtree splitting operations that are performed to obtain a block. mttDepth denotes the multi-type tree partition depth, which is equivalent to number of binary tree and ternary tree splitting operations that are performed to obtain a block). Then according to solution 11, any two leaf blocks that belong to the same parent block are considered to be in the same MER if the qtDepth plus K multiplied by mttDepth is greater than a specified threshold value (K×qtDepth+mttDepth>Thr). K and Thr can be an integer number 0, 1, 2, . . . K and the threshold value can be predetermined or signaled in the bitstream. In one implementation, K has a predetermined value of 2.

The counting of number of quadtree, binary tree and ternary tree splitting operations can be explained using FIG. 10 and FIG. 11. As an example, block 34 has been obtained by one quadtree splitting of block 50. According to FIG. 11, block 34 is a leaf block, which was obtained by one quadtree splitting operation and zero ternary and zero binary splitting operations.

According to FIG. 11, block 45 has been obtained by two quadtree splitting operations and one binary tree splitting operation. Block 50 (which is the CTB) is first split using quadtree splitting to obtain block 58, block 58 is split using quadtree splitting to obtain block 62 and finally block 62 is split using binary splitting to obtain block 45.

It is noted that the number of splitting operations are counted with respect to the coding tree block (CTB) which is considered as the starting point of the splitting operation.

Figure 23:
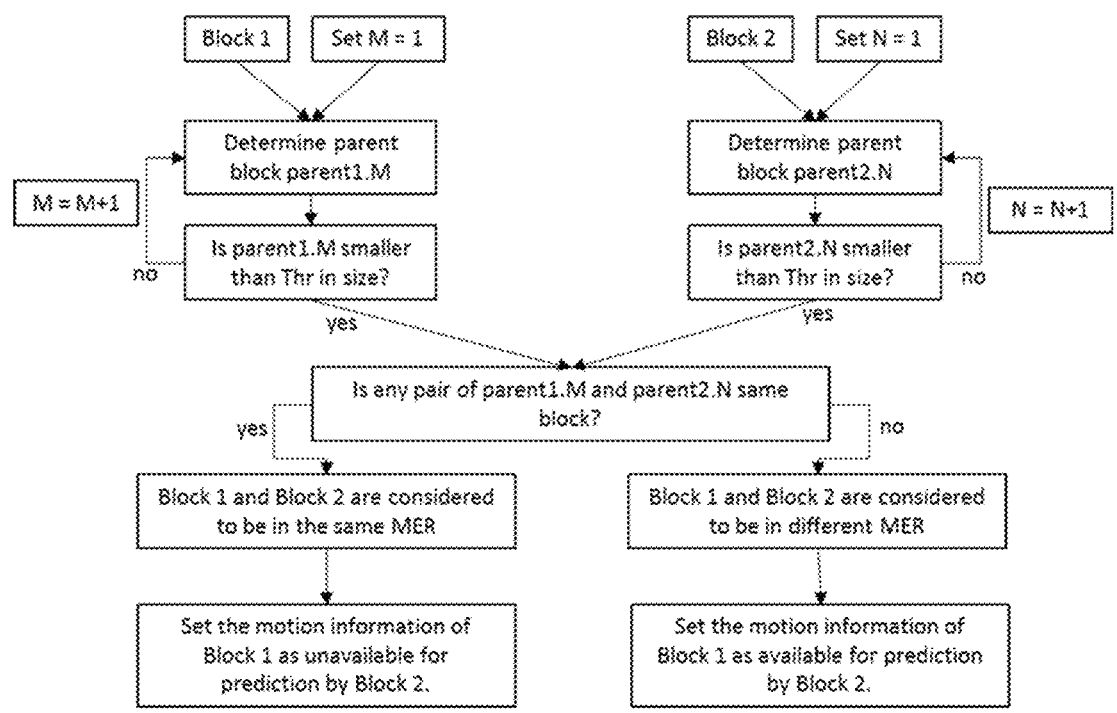
Figure 24:
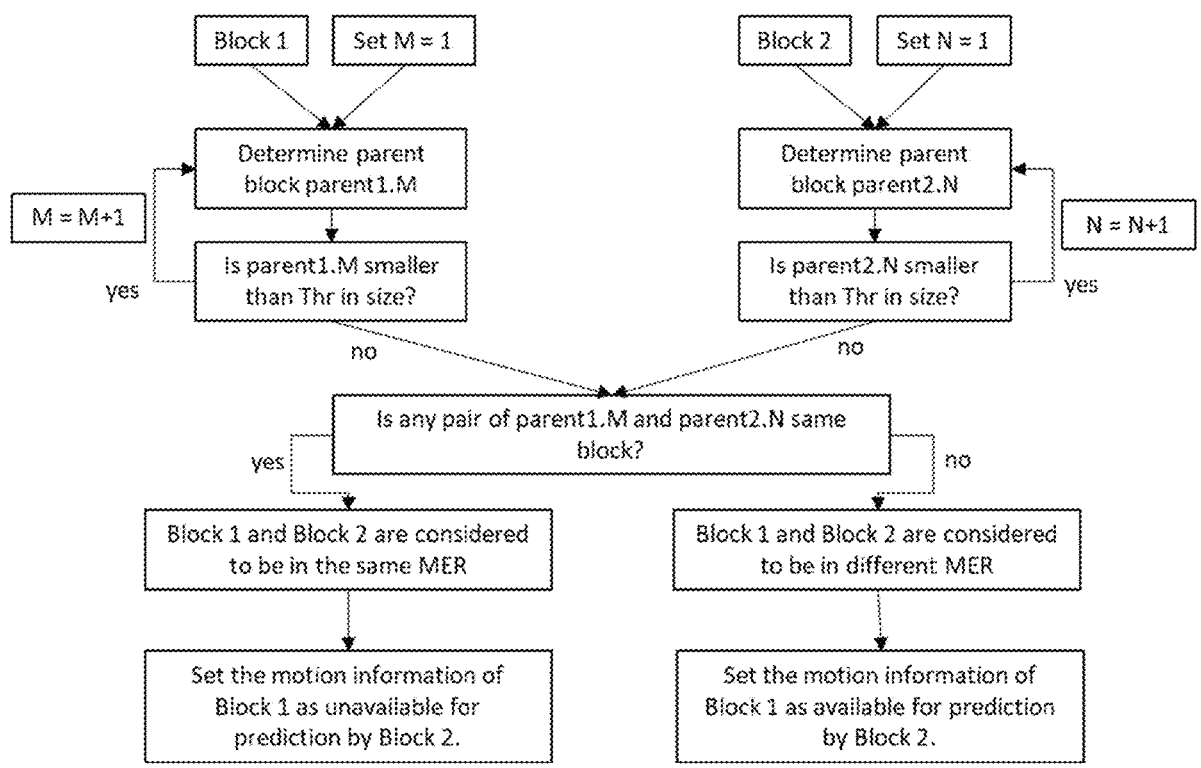
FIG. 24 illustrate an example of the flowchart of the solution 12.

Explanation of Solution 10: Accompanying figure FIG. 23 present the flowchart of the solution 10. It is noted that Block 1 is assumed to precede Block 2 in coding order. According to solution 10, first the parent blocks that are smaller than a specified threshold "Thr" of Block 1 and Block 2 are determined in a recursive manner. Parent1.1 represents the parent block of Block 1 and parent1.2 represents the parent block of parent1.1, and so on. Similarly parent 2.1 represents the parent block of Block 2.

If a parent block of Block1 is the same block of a parent block of Block 2, and if the parent block is smaller than Thr in size, then the motion information or intra prediction mode of Block 1 is set unavailable for prediction by Block 2.

Similarly FIG. 23 can also be used to explain the Solution 13, where the size comparison is replaced by a comparison based on the number of quadtree, binary tree and ternary tree splitting operations that were performed in order to obtain the parent block.

After the Merge Estimation Region (MER) or MPM estimation region is determined, if two blocks (block 1 and block 2) are determined to belong a same MER or same MPM estimation region, three different methods can be applied to enable processing of the 2 blocks in parallel.

Method 1: If the two leaf blocks are determined to be in the same merge estimation region, motion information of the first leaf block in coding order is set unavailable for prediction by the second block; or if the two leaf blocks are determined to be in the same MPM estimation region, intra prediction mode of the first leaf block in coding order is set unavailable for prediction by the second block. Otherwise (if the two leaf blocks are determined not to be in the same MER), the motion information of the first leaf block is set available for prediction by the second block; or if the two leaf blocks are determined not to be in the same MPM estimation region, the intra prediction mode of the first leaf block is set available for prediction by the second block. According to the same method the motion information of the first block is not used by second block if they are determined to belong a same MER, or the intra prediction mode of the first block is not used by second block if they are determined to belong a same MPM estimation region; therefore the second block can be processed in parallel to first block.

Figure 28:
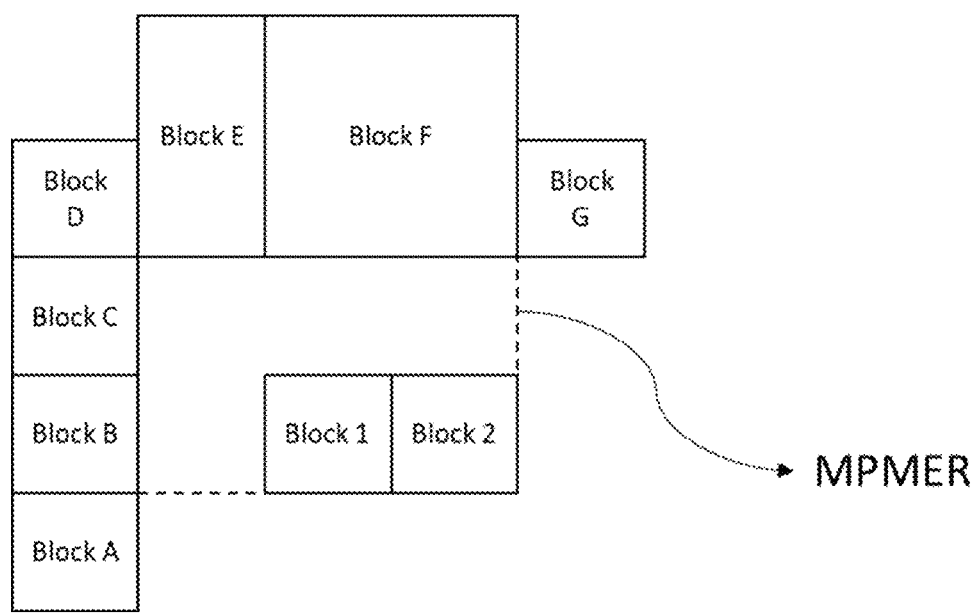
FIG. 28 illustrate an example of neighbor blocks of a MPMER.

Method 2: If the two leaf blocks are determined to be in the same MPM estimation region, the MPM list of block 1 and the MPM list of block 2 are constructed based on the neighbor blocks of the MPM estimation region. FIG. 28 exemplifies Method 2, where Block 1 and Block 2 are two leaf nodes that are determined to belong a same MPM estimation region (MPMER). In this example the spatial neighbor blocks of the MPMER are denoted as Block A to Block G. The spatial neighbor blocks of the MPMER are the blocks that are outside of the MPMER and are adjacent to the MPMER. According to method 2, the MPM list of Block 1 can be constructed based on the blocks A to G. Moreover the MPM list of Block 2 can be constructed based on the blocks A to G. On the other hand the MPM list of Block 2 cannot be constructed by using the intra prediction mode of Block 1.

Method 3: If the two leaf blocks are determined to be in the same MPM estimation region, a MPM list (mpm_list_MPMER) is constructed based on the spatial neighbor blocks of the MPMER. The constructed MPM list is used by block 1 and block 2 for intra prediction. In other words Block 1 and Block 2 use the same MPM list, mpm_list_MPMER, for the intra prediction process. Compared to method 2, where Block 1 and Block 2 can have two different MPM lists, in method 3 only a single MPM list is constructed and the constructed MPM list is used by all of the leaf blocks encapsulated by the MPMER.

According to all methods 1 to 3, the constructed MPM list is used in the intra prediction of the block.

Solution 12:

According to solution 12, two leaf blocks are considered to be in the same merge estimation region or same MPM estimation region based on following conditions.

In one example, if all the following conditions are satisfied, the two leaf blocks are considered to be in the same merge estimation region or same MPM estimation region.

two leaf blocks belong to a same parent block (or parent of a parent block, or parent of a parent of a parent block etc.);

the size of the same parent block is equal to twice of a threshold;

the current split mode of the parent block is ternary tree split (horizontal or vertical).

In one example, if all the following conditions are satisfied, the two leaf blocks are considered to be in the same merge estimation region or in the same MPM estimation region.

two leaf blocks belong to a same parent block (or parent of a parent block, or parent of a parent of a parent block etc.);

the same parent block is equal to twice of a threshold:

the current split mode of the same parent block is quadtree; and both of the vertical coordinators of the top-left samples of the two leaf blocks are smaller than the vertical coordinator of the top-left sample of the same parent block plus half of the height of the same parent block.

In one example, if all the following conditions are satisfied, the two leaf blocks are considered to be in the same merge estimation region or same MPM estimation region.

two leaf blocks belong to a same parent block (or parent of a parent block, or parent of a parent of a parent block etc.);

the same parent block is equal to twice of a threshold;

the current split mode of the same parent block is quadtree; and both of the vertical coordinators of the top-left samples of the two leaf blocks are greater than the vertical coordinator of the top-left sample of the same parent block plus half of the height of the same parent block.

In one example, if all the following conditions are satisfied, the two leaf blocks are considered to be in the same merge estimation region or same MPM estimation region.

two leaf blocks belong to a same parent block (or parent of a parent block, or parent of a parent of a parent block etc.); and the same parent block is smaller than or equal to a threshold.

In another example if one of the above conditions is not satisfied, the two leaf blocks are considered to be not in the same merge estimation region or not in the same MPM estimation region.

In one embodiment, if the two leaf blocks are determined to be in the same MPM estimation region, intra prediction mode of the first leaf block in coding order is set unavailable for prediction by the second block, otherwise the intra prediction mode of the first leaf block is set available for prediction by the second block.

In one embodiment, if the two leaf blocks are (Block 1 and Block 2) determined to be in the same MPM estimation region, the MPM list of the Block 1 and Block 2 are constructed based on the spatial neighbor blocks of the MPMER, and the intra prediction mode of Block 1 is not used by Block 2. Spatial neighbor blocks of the MPMER are blocks that are spatially adjacent to the MPMER and are outside of the MPMER. Accordingly, the intra prediction mode of spatial neighbor blocks of the MPMER are used in the MPM list construction process of Block 1 and Block 2, however the intra prediction mode of block 1 is not used in the MPM list construction of Block 2 (assuming that the coding order is Block 1 followed by Block 2).

In one embodiment, if the two leaf blocks are (Block 1 and Block 2) determined to be in the same MPM estimation region, a single MPM list is constructed based on the spatial neighbor blocks of the MPMER and the two blocks use the said MPM list. In this example, the same MPM list is used by the Block 1 and Block 2, the MPM list is constructed based on the spatial neighbor blocks of the MPMER.

It is noted that due to the recursive splitting process, a leaf block might have more than one parent block at different hierarchy levels (direct parent, parent of parent etc.). According to the solution 12, if there is at least one parent block (at any hierarchy level) that contains the two leaf blocks, they (the two leaf blocks) are considered to belong to the same parent block. Moreover the hierarchy level might be different for the two leaf blocks, meaning that number of splitting operations starting from the parent block to obtain the leaf block might be different for the two leaf blocks.

According to one implementation, the threshold mentioned in the above examples is computed as the number of pixel samples inside a parent coding block, which is computed as width multiplied by height of that coding block. According to another implementation, the threshold is a positive integer number and the size of a block is computed based on the width of the block. According to another implementation, the threshold is a positive integer number and the size of a block is computed based on the width or height of the block. In general, the size of a block is computed based on the width and the height of the block, taking both of them into account.

In one embodiment, the threshold is a positive integer number, where the threshold is equal to 2 power of (2N) or 2 power of (2N+1), the N is a positive integer number and the lower bound of N is log 2(MinCbSize). The log 2( ) is the binary logarithm scaling operation. And the MinCbSize denotes the minimally allowed coding block size of the codec, which is predefined or indicated in the bitstream. In the VVC standard draft document JVET-L1001-v1, Versatile Video Coding (Draft 3), MinCbSize is defined and used.

Solution 13:

According to solution 13, two leaf node blocks (block 1 and block 2) are considered to be in the same merge estimation region or in the same MPM estimation region based on following steps:

Step 1: Defining the CTU of the block 1 (or block 2) as a parent block of block 1.

Step 2: If the parent block does not contain the block 2 (or block1), the two leaf node blocks are NOT considered to be in the same merge estimation region or in the same MPM estimation region. The following steps are not performed and the checking process is terminated; Otherwise (if the parent block contains both block 1 and block 2), if the parent block contains the block 2 (or block 1), the current split mode of the parent blocks is checked, and the parent block size is checked as follows.

Step 3:

If the current split mode of the parent block is binary tree split and the parent block size is equal to a threshold, the two leaf node blocks are considered to be in the same merge estimation region or in the same MPM estimation region, the parent block is defined as the MPMER;

Otherwise, if the current split mode of the parent block is ternary tree split and the parent block size is equal to the said threshold multiplied by 2, the two leaf node blocks are considered to be in the same merge estimation region or in the same MPM estimation region, the parent block is defined as the MER or the MPMER;

Otherwise, if the current split mode of the parent block is quadtree split and the parent block size is equal to the said threshold multiplied by 2, and the two leaf node blocks are both located in the top-half of the parent block, the two leaf node blocks are considered to be in the same merge estimation region or in the same MPM estimation region, the top half of the parent block is defined as the MER or the MPMER;

Otherwise, if the current split mode of the parent block is quadtree split and the parent block size is equal to the said threshold multiplied by 2, and the two leaf node blocks are both located in the bottom-half of the parent block, the two leaf node blocks are considered to be in the same merge estimation region or in the same MPM estimation region, the bottom half of the parent block is defined as the MER or MPMER.

Step 4: If none of the conditions (listed as bullet items) are satisfied in Step 3, the parent block according to the current split mode of the parent block and the resulting child block which contains block 1 (or block 2) is updated as parent block, the updated parent block is recursively checked by going to the step 2.

The location of the two leaf node blocks can be determined by using the coordinator of the top-left samples. For example, if both of the vertical coordinators of the top-left samples of the two leaf blocks are smaller than the vertical coordinator of the top-left sample of the parent block plus half of the height of the parent block, the two leaf blocks are considered to be included in the top half part of the parent block. The two leaf node blocks are located in the left half of the parent block, if both of the vertical coordinators of the top-left samples of the two leaf blocks are greater than the vertical coordinator of the top-left sample of the parent block plus half of the height of the parent block, the two leaf blocks are considered to be included in the bottom half part of the parent block.

In another example, if above conditions are not satisfied, the two leaf blocks are considered to be not in the same merge estimation region; or if above conditions are not satisfied, the two leaf blocks are considered to be not in the same MPM estimation region.

In one embodiment, if the two leaf blocks are determined to be in the same MPM estimation region, intra prediction mode of the first leaf block in coding order is set unavailable for prediction by the second block, otherwise the intra prediction mode of the first leaf block is set available for prediction by the second block.

In one embodiment, if the two leaf blocks are (Block 1 and Block 2) determined to be in the same MPM estimation region, the MPM list of the Block 1 and Block 2 are constructed based on the spatial neighbor blocks of the MPMER, and the intra prediction mode of Block 1 is not used by Block 2. Spatial neighbor blocks of the MPMER are blocks that are spatially adjacent to the MPMER and are outside of the MPMER. Accordingly, the intra prediction mode of spatial neighbor blocks of the MPMER are used in the MPM list construction process of Block 1 and Block 2, however the intra prediction mode of block 1 is not used in the MPM list construction of Block 2 (assuming that the coding order is Block 1 followed by Block 2).

In one embodiment, if the two leaf blocks are (Block 1 and Block 2) determined to be in the same MPM estimation region, a single MPM list is constructed based on the spatial neighbor blocks of the MPMER and the two blocks use the said MPM list. In this example, the same MPM list is used by the Block 1 and Block 2, the MPM list is constructed based on the spatial neighbor blocks of the MPMER It is noted that due to the recursive splitting process, a leaf block might have more than one parent block at different hierarchy levels (direct parent, parent of parent etc.). According to the solution 13, if there is at least one parent block (at any hierarchy level) that contains the two leaf blocks, they (the two leaf blocks) are considered to belong to the same parent block. Moreover the hierarchy level might be different for the two leaf blocks, meaning that number of splitting operations starting from the parent block to obtain the leaf block might be different for the two leaf blocks.

According to one implementation, the threshold mentioned in the above examples is computed as the number of pixel samples inside a parent coding block, which is computed as width multiplied by height of that coding block. According to another implementation, the threshold is a positive integer number and the size of a block is computed based on the width of the block. According to another implementation, the threshold is a positive integer number and the size of a block is computed based on the width or height of the block. In general, the size of a block is computed based on the width and the height of the block, taking both of them into account.

In one embodiment, the threshold is a positive integer number, where the threshold is equal to 2 power of (2N) or 2 power of (2N+1), the N is a positive integer number and the lower bound of N is log 2(MinCbSize). The log 2( ) is the binary logarithm scaling operation. And the MinCbSize denotes the minimally allowed coding block size of the codec, which is predefined or indicated in the bitstream. In the VVC standard draft document JVET-L1001-v1, Versatile Video Coding (Draft 3), MinCbSize is defined and used.
Solution 14:

According to solution 14, two leaf node blocks (block 1 and block 2) are considered to be in the same merge estimation region or same MPM estimation region based on following steps:

Step 1: the block 1 (or block 2) is defined as a current parent block of block 1 (or block 2).

Step 2: If the current parent block is smaller than a threshold, the parent block of the current parent block is define as the updated current parent block of block 1 (or block 2);

Otherwise, determine whether the block 2 (or block 1) is contained by the current parent blocks of block 1 (or block 2).

Step 3: if the current parent block not contains block 2, the two leaf node blocks are NOT considered to be in the same merge estimation region or same MPM estimation region;

Otherwise, the size of the current parent block and the current spit mode of the current parents are checked.

Step 4: if the size of the current parent is equal to the threshold, the two leaf node blocks are considered to be in the same merge estimation region or same MPM estimation region, the current parent block is set as MER or MPMER;

Otherwise, if the size of the current parent is equal to the threshold multiplied by 2, and the current split mode is ternary tree, the two leaf node blocks are considered to be in the same merge estimation region or same MPM estimation region, the current parent block is set as MER or MPMER;

Otherwise, if the size of the current parent is equal to the threshold multiplied by 2, and the current split mode is quadtree tree, the location of the two leaf node blocks in the current parent block is checked.

Step 5: if the two leaf node blocks both are located in the top half of the current parent block, the two leaf node blocks are considered to be in the same merge estimation region or same MPM estimation region, the top half of the current parent block is set as MER or MPMER;

Otherwise, if the two leaf node blocks both are located in the bottom half of the current parent block, the two leaf node blocks are considered to be in the same merge estimation region or same MPM estimation region, the bottom half of the current parent block is set as MER or MPMER;

Otherwise, the two leaf node blocks are NOT considered to be in the same merge estimation region or same MPM estimation region.

The location of the two leaf node blocks can be determined by using the coordinator of the top-left samples. For example if both of the vertical coordinators of the top-left samples of the two leaf blocks are smaller than the vertical coordinator of the top-left sample of the parent block plus half of the height of the parent block, the two leaf blocks are considered to be included in the top half part of the parent block. The two leaf node blocks are located in the left half of the parent block, if both of the vertical coordinators of the top-left samples of the two leaf blocks are greater than the vertical coordinator of the top-left sample of the parent block plus half of the height of the parent block, the two leaf blocks are considered to be included in the bottom half part of the parent block.

In another example, if above conditions is not satisfied, the two leaf blocks are considered to be not in the same merge estimation region; or if above conditions is not satisfied, the two leaf blocks are considered to be not in the same MPM estimation region.

In one embodiment, if the two leaf blocks are determined to be in the same MPM estimation region, intra prediction mode of the first leaf block in coding order is set unavailable for prediction by the second block, otherwise the intra prediction mode of the first leaf block is set available for prediction by the second block.

In one embodiment, if the two leaf blocks are (Block 1 and Block 2) determined to be in the same MPM estimation region, the MPM list of the Block 1 and Block 2 are constructed based on the spatial neighbor blocks of the MPMER, and the intra prediction mode of Block 1 is not used by Block 2. Spatial neighbor blocks of the MPMER are blocks that are spatially adjacent to the MPMER and are outside of the MPMER. Accordingly, the intra prediction mode of spatial neighbor blocks of the MPMER are used in the MPM list construction process of Block 1 and Block 2, however the intra prediction mode of block 1 is not used in the MPM list construction of Block 2 (assuming that the coding order is Block 1 followed by Block 2).

In one embodiment, if the two leaf blocks are (Block 1 and Block 2) determined to be in the same MPM estimation region, a single MPM list is constructed based on the spatial neighbor blocks of the MPMER and the two blocks use the said MPM list. In this example, the same MPM list is used by the Block 1 and Block 2, the MPM list is constructed based on the spatial neighbor blocks of the MPMER It is noted that due to the recursive splitting process, a leaf block might have more than one parent block at different hierarchy levels (direct parent, parent of parent etc.). According to the solution 14, if there is at least one parent block (at any hierarchy level) that contains the two leaf blocks, they (the two leaf blocks) are considered to belong to the same parent block. Moreover the hierarchy level might be different for the two leaf blocks, meaning that number of splitting operations starting from the parent block to obtain the leaf block might be different for the two leaf blocks.

According to one implementation, the threshold mentioned in the above examples is computed as the number of pixel samples inside a parent coding block, which is computed as width multiplied by height of that coding block. According to another implementation, the threshold is a positive integer number and the size of a block is computed based on the width of the block. According to another implementation, the threshold is a positive integer number and the size of a block is computed based on the width or height of the block. In general, the size of a block is computed based on the width and the height of the block, taking both of them into account.

In one embodiment, the threshold is a positive integer number, where the threshold is equal to 2 power of (2N) or 2 power of (2N+1), the N is a positive integer number and the lower bound of N is log 2(MinCbSize). The log 2( ) is the binary logarithm scaling operation. And the MinCbSize denotes the minimally allowed coding block size of the codec, which is predefined or indicated in the bitstream. In the VVC standard draft document JVET-L1001-v1, Versatile Video Coding (Draft 3), MinCbSize is defined and used.

Solution 15:

According to solution 15, two leaf blocks are considered to be in the same merge estimation region or in the same MPM estimation region based on following conditions.

In one example, if all the following conditions are satisfied, the two leaf blocks are considered to be in the same merge estimation region or in the same MPM estimation region:

two leaf blocks belong to a same parent block (or recursively parent of a parent block, or parent of a parent of a parent block etc.);

the number of splitting operations that are performed in order to obtain the parent block are equal to a threshold minus 1;

the current split mode of the same parent block is ternary tree split (horizontal or vertical). In one example, if all the following conditions are satisfied, the two leaf blocks are considered to be in the same merge estimation region or in the same MPM estimation region:

two leaf blocks belong to a same parent block (or parent of a parent block, or parent of a parent of a parent block etc.);

the number of splitting operations that are performed in order to obtain the parent block are equal to a threshold minus 1;

the current split mode of the same parent block is quadtree;

both of the vertical coordinators of the top-left samples of the two leaf blocks are smaller than the vertical coordinator of the top-left sample of the same parent block plus half of the height of the same parent block.

In one example, if all the following conditions are satisfied, the two leaf blocks are considered to be in the same merge estimation region or in the same MPM estimation region:

two leaf blocks belong to a same parent block (or parent of a parent block, or parent of a parent of a parent block etc.);

the number of splitting operations that are performed in order to obtain the parent block are equal to a threshold minus 1;

the current split mode of the same parent block is quadtree;

both of the vertical coordinators of the top-left samples of the two leaf blocks are greater than the vertical coordinator of the top-left sample of the same parent block plus half of the height of the same parent block.

In one example, if all the following conditions are satisfied, the two leaf blocks are considered to be in the same merge estimation region or in the same MPM estimation region:

two leaf blocks belong to a same parent block (or parent of a parent block, or parent of a parent of a parent block etc.);

the number of splitting operations that are performed in order to obtain the parent block are equal to or greater than a threshold.

In another example, if one of the above conditions is not satisfied, the two leaf blocks are considered to be not in the same merge estimation region or in the same MPM estimation region.

If the two leaf blocks are considered to be in the same MPM estimation region, intra prediction mode of the first block in coding order is set unavailable for prediction by the second block. If the two leaf blocks are considered to be not in the same MPM estimation region, the intra prediction mode of the first block is set available for prediction by the second block.

In one embodiment, if the two leaf blocks are (Block 1 and Block 2) determined to be in the same MPM estimation region, the MPM list of the Block 1 and Block 2 are constructed based on the spatial neighbor blocks of the MPMER, and the intra prediction mode of Block 1 is not used by Block 2. Spatial neighbor blocks of the MPMER are blocks that are spatially adjacent to the MPMER and are outside of the MPMER. Accordingly, the intra prediction mode of spatial neighbor blocks of the MPMER are used in the MPM list construction process of Block 1 and Block 2, however the intra prediction mode of block 1 is not used in the MPM list construction of Block 2 (assuming that the coding order is Block 1 followed by Block 2).

In one embodiment, if the two leaf blocks are (Block 1 and Block 2) determined to be in the same MPM estimation region, a single MPM list is constructed based on the spatial neighbor blocks of the MPMER and the two blocks use the said MPM list. In this embodiment, the same MPM list is used by the Block 1 and Block 2, which is constructed based on the spatial neighbor blocks of the MPMER.

According to solution 15, the threshold comparison is performed based on the number of quadtree, binary tree and ternary tree splitting operations that were performed in order to obtain the parent block. As an example, assume that the number of quadtree splitting operations that are performed to obtain the parent block is represented by qtDepthThr and the number of binary and ternary tree splitting operations that are performed are represented collectively by mttDepth (the terms qtDepth and mttDepth are used according to the document JVET-L1001-v1, Versatile Video Coding (Draft 3), which can be obtained from the website http://phenix.it-sudparis.eu/jvet. qtDepth denotes the quadtree partition depth, which is equivalent to number of quadtree splitting operations that are performed to obtain a block. mttDepth denotes the multi-type tree partition depth, which is equivalent to number of binary tree and ternary tree splitting operations that are performed to obtain a block). In JVET-L1001-v1 for example, for the children blocks resulting from binary tree split, the mttDepth is increased by 1. For the middle (big) child block resulting from the ternary tree split, the mttDetph is increased by 1. For the bot side (small) children block resulting from the ternary tree split, the mttDepth is increased by 2. Then according to solution 15, any two leaf blocks that belong to the same parent block are considered to be in the same MER if the qtDepth plus K multiplied by mttDepth is greater than a specified threshold value (K×qtDepth+mttDepth>Thr). K and Thr can be an integer number 0, 1, 2, . . . K and the threshold value can be predetermined or signaled in the bitstream. In one preferred implementation K has a predetermined value of 2.

The counting of number of quadtree, binary tree and ternary tree splitting operations can be explained using FIG. 10 and FIG. 11. As an example block 34 has been obtained by one quadtree splitting of block 50. According to FIG. 11 block 34 is a leaf block, which was obtained by one quadtree splitting operation and zero ternary and zero binary splitting operations.

According to FIG. 11, block 45 has been obtained by two quadtree splitting operations and one binary tree splitting operation. Block 50 (which is the CTB) is first split using quadtree splitting to obtain block 58, block 58 is split using quadtree splitting to obtain block 62 and finally block 62 is split using binary splitting to obtain block 45.

It is noted that the number of splitting operations are counted w.r.t. the coding tree block (CTB) which is considered as the starting point of the splitting operation.

Figure 25:
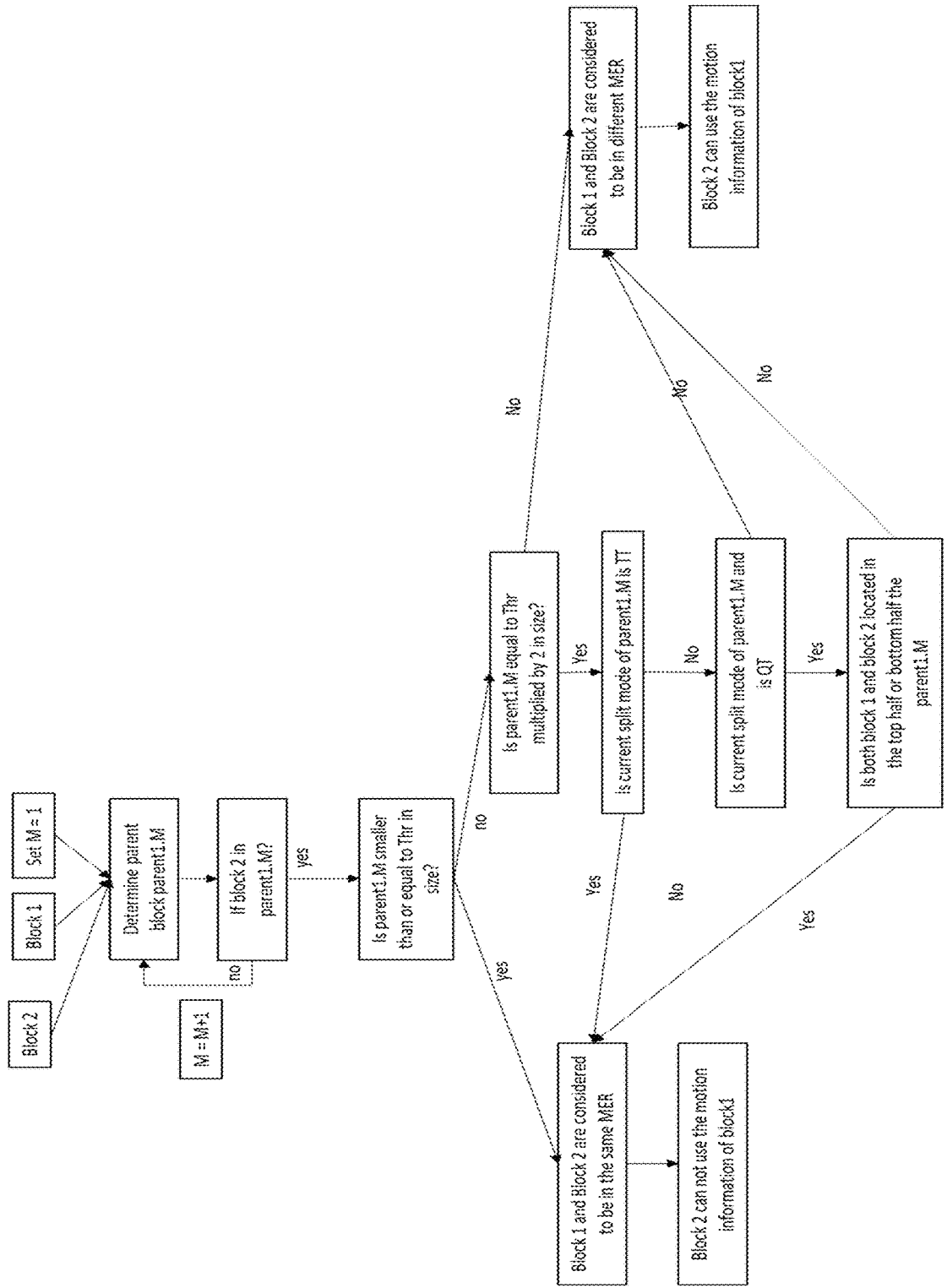
FIG. 25 illustrate an example of the flowchart of the solution 14.

Explanation of Solution 15: Accompanying figure FIG. 25 present the flowchart of the solution 15. It is noted that Block 1 is assumed to precede Block 2 in coding order. According to solution 15, first the parent blocks that are smaller than a specified threshold "Thr" of Block 1 and Block 2 are determined in a recursive manner. Parent1.1 represents the parent block of Block 1 and parent1.2 represents the parent block of parent1.1, and so on. Similarly parent 2.1 represents the parent block of Block 2.

If a parent block of Block1 is the same block of a parent block of Block 2 and if the parent block is smaller than Thr in size, then the motion information of Block 1 is set unavailable for prediction by Block 2.

Similarly FIG. 25 can also be used to explain the Solution 15, where the size comparison is replaced by a comparison based on the number of quadtree, binary tree and ternary tree splitting operations that were performed in order to obtain the parent block.

Solution 16:

According to solution 16, two leaf blocks are considered to be in the same merge estimation region based on following steps or two leaf blocks are considered to be in the same MPM estimation region based on following steps:

Step 1: Defining the CTU of the block 1 (or block 2) as a parent block of block 1.

Step 2: If the parent block does not contain the block 2 (or block1) the two leaf node blocks are NOT considered to be in the same merge estimation region or the same MPM estimation region. The following steps are not performed and the checking process is terminated.

Otherwise (if the parent block contains both block 1 and block 2), if the parent block contains the block 2 (or block 1), the current split mode of the parent blocks is checked, and the parent block size is checked as follows.

Step 3:

If the current split mode of the parent block is binary tree split, and the number of splitting operations that are performed in order to obtain the parent block are equal to a threshold, the two leaf node blocks are considered to be in the same merge estimation region or the same MPM estimation region, the parent block is defined as the MER or the MPMER;

Otherwise, if the current split mode of the parent block is ternary tree split and the number of splitting operations that are performed in order to obtain the parent block are equal to said threshold minus 1, the two leaf node blocks are considered to be in the same merge estimation region or the same MPM estimation region, the parent block is defined as the MER or the MPMER;

Otherwise, if the current split mode of the parent block is quadtree split, the number of splitting operations that are performed in order to obtain the parent block are equal to said threshold minus 1, and the two leaf node blocks are both located in the top-half of the parent block, the two leaf node blocks are considered to be in the same merge estimation region or the same MPM estimation region, the top half of the parent block is defined as the MER or the MPMER;

Otherwise, if the current split mode of the parent block is quadtree split, and the number of splitting operations that are performed in order to obtain the parent block are equal to said threshold minus 1, and the two leaf node blocks are both located in the bottom-half of the parent block, the two leaf node blocks are considered to be in the same merge estimation region or the same MPM estimation region, the bottom half of the parent block is defined as the MER or the MPMER.

Step 4: If none of the conditions (listed as bullet items) are satisfied in Step 3, the parent block according to the current split mode of the parent block and the resulting child block which contains block 1 (or block 2) is updated as parent block, the updated parent block is recursively checked by going to the step 2.

Step 1: Defining the CTU of the block 1 (or block 2) is defined as a parent block of block 1;

Step 2: If the parent block not contains the block 2 (or block1), the two leaf node blocks are NOT considered to be in the same merge estimation region or if the parent block not contains the block 2 (or block1), the two leaf node blocks are NOT considered to be in the same MPM estimation region;

Otherwise, if the parent block contains the block 2 (or block 1), the current split mode of the parent blocks is checked, and the parent block size is checked.

Step 3: If the current split mode of the parent block is binary tree split, and the number of splitting operations that are performed in order to obtain the parent block are equal to a threshold, the two leaf node blocks are considered to be in the same merge estimation region or the same MPM estimation region, the parent block is defined as the MER or the MPMER;

Otherwise, if the current split mode of the parent block is ternary tree split, and the number of splitting operations that are performed in order to obtain the parent block are equal to the threshold minus 1, the two leaf node blocks are considered to be in the same merge estimation region or the same MPM estimation region, the parent block is defined as the MER or the MPMER;

Otherwise, if the current split mode of the parent block is quadtree split, and the number of splitting operations that are performed in order to obtain the parent block are equal to the threshold minus 1, and the two leaf node blocks are both located in the top-half of the parent block, the two leaf node blocks are considered to be in the same merge estimation region or the same MPM estimation region, the top half of the parent block is defined as the MER or the MPMER;

Otherwise, if the current split mode of the parent block is quadtree split, and the number of splitting operations that are performed in order to obtain the parent block are equal to the threshold minus 1, and the two leaf node blocks are both located in the bottom-half of the parent block, the two leaf node blocks are considered to be in the same merge estimation region or the same MPM estimation region, the bottom half of the parent block is defined as the MER or the MPMER;

Otherwise, split the parent block with the current split mode of the parent block and set the resulting child block which contains block 1 (or block 2) as the updated parent block, the updated parent block is recursively checked in step 2.

The location of the two leaf node blocks can be determined by using the coordinator of the top-left samples. For example, if both of the vertical coordinators of the top-left samples of the two leaf blocks are smaller than the vertical coordinator of the top-left sample of the parent block plus half of the height of the parent block, the two leaf blocks are considered to be included in the top half part of the parent block. The two leaf node blocks are located in the left half of the parent block, if both of the vertical coordinators of the top-left samples of the two leaf blocks are greater than the vertical coordinator of the top-left sample of the parent block plus half of the height of the parent block, the two leaf blocks are considered to be included in the bottom half part of the parent block. In another example, if above conditions is not satisfied, the two leaf blocks are considered to be not in the same merge estimation region or the same MPM estimation region.

If the two leaf blocks are considered to be in the same MPM estimation region, intra prediction mode of the first block in coding order is set unavailable for prediction by the second block. If the two leaf blocks are considered to be not in the same MPM estimation region, the intra prediction mode of the first block is set available for prediction by the second block.

In one embodiment, if the two leaf blocks are (Block 1 and Block 2) determined to be in the same MPM estimation region, the MPM list of the Block 1 and Block 2 are constructed based on the spatial neighbor blocks of the MPMER, and the intra prediction mode of Block 1 is not used by Block 2. Spatial neighbor blocks of the MPMER are blocks that are spatially adjacent to the MIPMER and are outside of the MPMER. Accordingly, the intra prediction mode of spatial neighbor blocks of the MPMER are used in the MPM list construction process of Block 1 and Block 2, however the intra prediction mode of block 1 is not used in the MPM list construction of Block 2 (assuming that the coding order is Block 1 followed by Block 2).

In one embodiment, if the two leaf blocks are (Block 1 and Block 2) determined to be in the same MPM estimation region, a single MPM list is constructed based on the spatial neighbor blocks of the MPMER and the two blocks use the said MPM list. In this embodiment, the same MPM list is used by the Block 1 and Block 2, which is constructed based on the spatial neighbor blocks of the MPMER.

According to solution 16, the threshold comparison is performed based on the number of quadtree, binary tree and ternary tree splitting operations that were performed in order to obtain the parent block. As an example, assume that the number of quadtree splitting operations that are performed to obtain the parent block is represented by qtDepthThr and the number of binary and ternary tree splitting operations that are performed are represented collectively by mttDepth (the terms qtDepth and mttDepth are used according to the document JVET-L1001-v1, Versatile Video Coding (Draft 3), which can be obtained from the website http://phenix.it-sudparis.eu/jvet. qtDepth denotes the quadtree partition depth, which is equivalent to number of quadtree splitting operations that are performed to obtain a block. mttDepth denotes the multi-type tree partition depth, which is equivalent to number of binary tree and ternary tree splitting operations that are performed to obtain a block). In JVET-L1001-v1 for example, for the children blocks resulting from binary tree split, the mttDepth is increased by 1. For the middle (big) child block resulting from the ternary tree split, the mttDetph is increased by 1. For the bot side (small) children block resulting from the ternary tree split, the mttDepth is increased by 2. Then according to solution 16, any two leaf blocks that belong to the same parent block are considered to be in the same MER if the qtDepth plus K multiplied by mttDepth is greater than a specified threshold value (K×qtDepth+mttDepth>Thr). K and Thr can be an integer number 0, 1, 2, . . . K and the threshold value can be predetermined or signaled in the bitstream. In one preferred implementation K has a predetermined value of 2.

The counting of number of quadtree, binary tree and ternary tree splitting operations can be explained using FIG. 10 and FIG. 11. As an example block 34 has been obtained by one quadtree splitting of block 50. According to FIG. 11 block 34 is a leaf block, which was obtained by one quadtree splitting operation and zero ternary and zero binary splitting operations.

According to FIG. 11, block 45 has been obtained by two quadtree splitting operations and one binary tree splitting operation. Block 50 (which is the CTB) is first split using quadtree splitting to obtain block 58, block 58 is split using quadtree splitting to obtain block 62 and finally block 62 is split using binary splitting to obtain block 45.

It is noted that the number of splitting operations are counted with respect to the coding tree block (CTB) which is considered as the starting point of the splitting operation.

Figure 27:
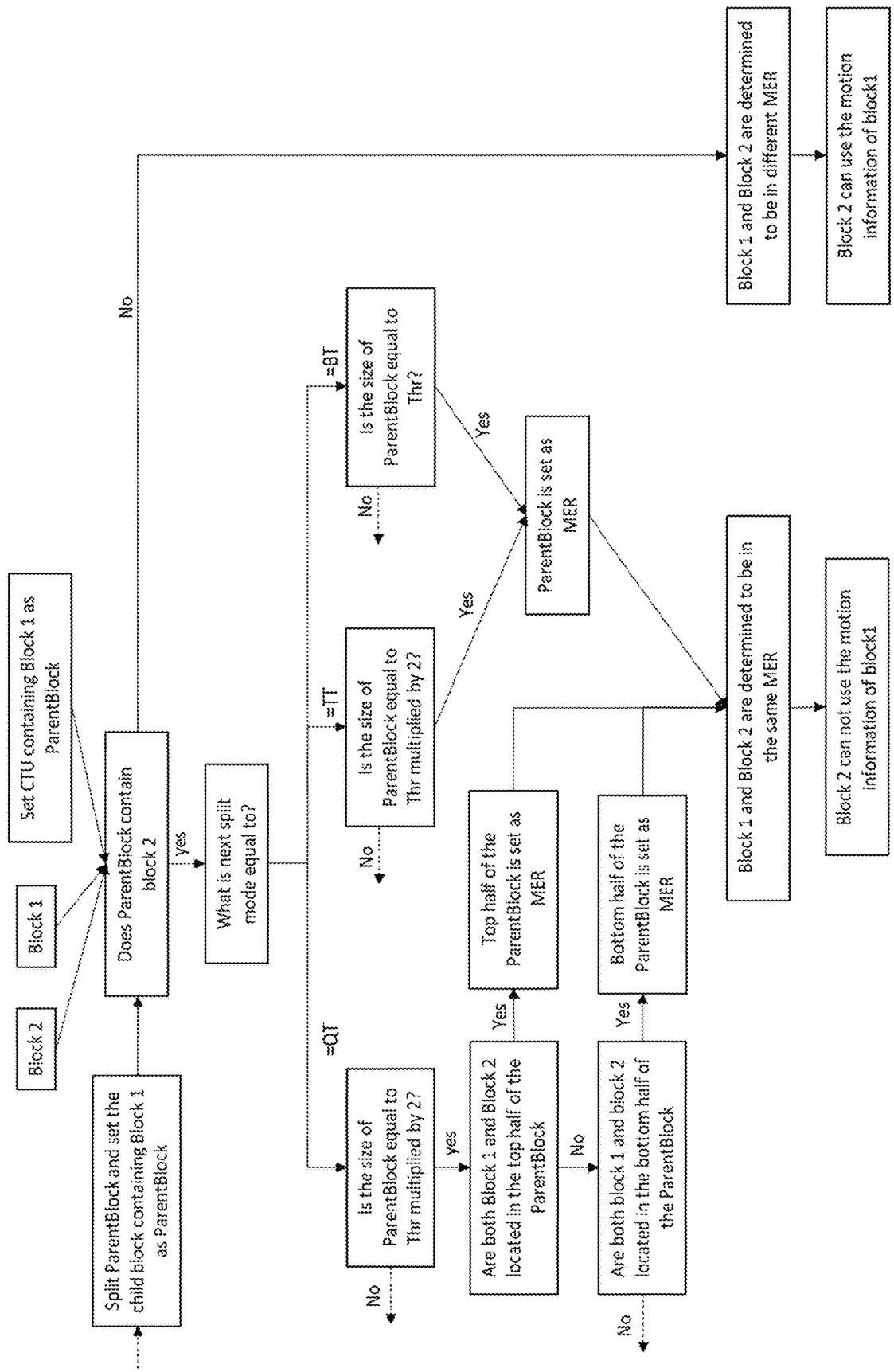
FIG. 27 illustrate an example of the flowchart of the solution 15.

Explanation of Solution 16: Accompanying figure FIG. 27 present the flowchart of the solution 16. It is noted that Block 1 is assumed to precede Block 2 in coding order. According to solution 16, first the parent blocks that are smaller than a specified threshold "Thr" of Block 1 and Block 2 are determined in a recursive manner. Parent1.1 represents the parent block of Block 1 and parent1.2 represents the parent block of parent1.1, and so on. Similarly parent 2.1 represents the parent block of Block 2.

If a parent block of Block1 is the same block of a parent block of Block 2 and if the parent block is smaller than Thr in size, then the motion information of Block 1 is set unavailable for prediction by Block 2.

Similarly FIG. 27 can also be used to explain the Solution 16, where the size comparison is replaced by a comparison based on the number of quadtree, binary tree and ternary tree splitting operations that were performed in order to obtain the parent block.

Solution 17:

According to solution 17, two leaf blocks are considered to be in the same merge estimation region based on following steps or two leaf blocks are considered to be in the same MPM estimation region based on following steps:

Step 1: the block 1 (or block 2) is defined as a current parent block of block 1 (or block 2).

Step 2: If the number of splitting operations that are performed in order to obtain the parent block are greater than a threshold, the parent block of the current parent block is define as the updated current parent block of block 1 (or block 2);

Otherwise, whether the block 2 (or block 1) is contained by the current parent blocks of block 1 (or block 2).

Step 3: if the current parent block not contains block 2, the two leaf node blocks are NOT considered to be in the same merge estimation region or the same MPM estimation region;

Otherwise, the number of splitting operations that are performed in order to obtain the parent block and the current spit mode of the current parents are checked.

Step 4: if the number of splitting operations that are performed in order to obtain the parent block are greater than the threshold, the two leaf node blocks are considered to be in the same merge estimation region or the same MPM estimation region, the current parent block is set as MER or MPMER;

Otherwise, if the number of splitting operations that are performed in order to obtain the parent block are greater than the threshold minus 1, and the current split mode is ternary tree, the two leaf node blocks are considered to be in the same merge estimation region or the same MPM estimation region, the current parent block is set as MER or MPMER;

Otherwise, if the number of splitting operations that are performed in order to obtain the parent block are greater than the threshold minus 1, and the current split mode is quadtree tree, the location of the two leaf node blocks in the current parent block is checked.

Step 5: if the two leaf node blocks both are located in the top half of the current parent block, the two leaf node blocks are considered to be in the same merge estimation region or the same MPM estimation region, the top half of the current parent block is set as MER or MPMER;

Otherwise, if the two leaf node blocks both are located in the bottom half of the current parent block, the two leaf node blocks are considered to be in the same merge estimation region or the same MPM estimation region, the bottom half of the current parent block is set as MER or MPMER;

Otherwise, the two leaf node blocks are NOT considered to be in the same merge estimation region or the same MPM estimation region.

The location of the two leaf node blocks can be determined by using the coordinator of the top-left samples. For example, if both of the vertical coordinators of the top-left samples of the two leaf blocks are smaller than the vertical coordinator of the top-left sample of the parent block plus half of the height of the parent block, the two leaf blocks are considered to be included in the top half part of the parent block. The two leaf node blocks are located in the left half of the parent block, if both of the vertical coordinators of the top-left samples of the two leaf blocks are greater than the vertical coordinator of the top-left sample of the parent block plus half of the height of the parent block, the two leaf blocks are considered to be included in the bottom half part of the parent block. In another example, if above conditions is not satisfied, the two leaf blocks are considered to be not in the same merge estimation region or the same MPM estimation region.

If the two leaf blocks are considered to be in the same MPM estimation region, motion information of the first block in coding order is set unavailable for prediction by the second block. If the two leaf blocks are considered to be not in the same MPM estimation region, the intra prediction mode of the first block is set available for prediction by the second block.

In one embodiment, if the two leaf blocks are (Block 1 and Block 2) determined to be in the same MPM estimation region, the MPM list of the Block 1 and Block 2 are constructed based on the spatial neighbor blocks of the MPMER, and the intra prediction mode of Block 1 is not used by Block 2. Spatial neighbor blocks of the MPMER are blocks that are spatially adjacent to the MPMER and are outside of the MPMER. Accordingly, the intra prediction mode of spatial neighbor blocks of the MPMER are used in the MPM list construction process of Block 1 and Block 2, however the intra prediction mode of block 1 is not used in the MPM list construction of Block 2 (assuming that the coding order is Block 1 followed by Block 2).

In one embodiment, if the two leaf blocks are (Block 1 and Block 2) determined to be in the same MPM estimation region, a single MPM list is constructed based on the spatial neighbor blocks of the MPMER and the two blocks use the said MPM list. In this embodiment, the same MPM list is used by the Block 1 and Block 2, which is constructed based on the spatial neighbor blocks of the MPMER.

According to solution 17, the threshold comparison is performed based on the number of quadtree, binary tree and ternary tree splitting operations that were performed in order to obtain the parent block. As an example, assume that the number of quadtree splitting operations that are performed to obtain the parent block is represented by qtDepthThr, and the number of binary and ternary tree splitting operations that are performed are represented collectively by mttDepth (the terms qtDepth and mttDepth are used according to the document JVET-L1001-v1, Versatile Video Coding (Draft 3), which can be obtained from the website http://phenix.it-sudparis.eu/jvet. qtDepth denotes the quadtree partition depth, which is equivalent to number of quadtree splitting operations that are performed to obtain a block. mttDepth denotes the multi-type tree partition depth, which is equivalent to number of binary tree and ternary tree splitting operations that are performed to obtain a block). In JVET-L1001-v1 for example, for the children blocks resulting from binary tree split, the mttDepth is increased by 1. For the middle (big) child block resulting from the ternary tree split, the mttDetph is increased by 1. For the bot side (small) children block resulting from the ternary tree split, the mttDepth is increased by 2. Then according to solution 13, any two leaf blocks that belong to the same parent block are considered to be in the same MPMER, if the qtDepth plus K multiplied by mttDepth is greater than a specified threshold value (K×qtDepth+mttDepth>Thr). K and Thr can be an integer number 0, 1, 2, . . . K and the threshold value can be predetermined or signaled in the bitstream. In one implementation, K has a predetermined value of 2.

The counting of number of quadtree, binary tree and ternary tree splitting operations can be explained using FIG. 10 and FIG. 11. As an example, block 34 has been obtained by one quadtree splitting of block 50. According to FIG. 11, block 34 is a leaf block, which was obtained by one quadtree splitting operation and zero ternary and zero binary splitting operations.

According to FIG. 11, block 45 has been obtained by two quadtree splitting operations and one binary tree splitting operation. Block 50 (which is the CTB) is first split using quadtree splitting to obtain block 58, block 58 is split using quadtree splitting to obtain block 62 and finally block 62 is split using binary splitting to obtain block 45.

It is noted that the number of splitting operations are counted with respect to the coding tree block (CTB) which is considered as the starting point of the splitting operation.

Figure 26:
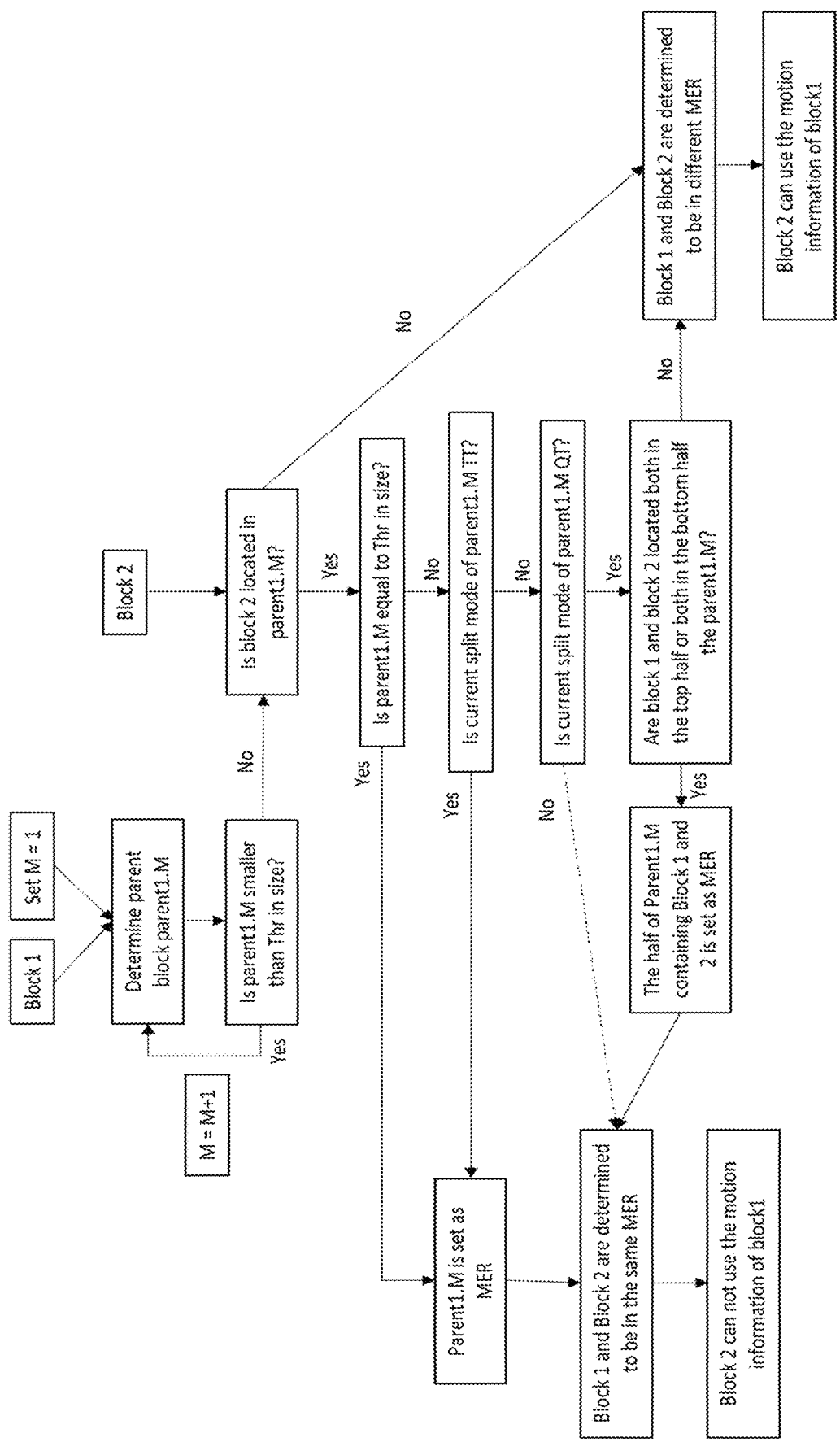
FIG. 26 illustrate an example of the flowchart of the solution 16.

Explanation of Solution 17: Accompanying figure FIG. 26 present the flowchart of the solution 17. It is noted that Block 1 is assumed to precede Block 2 in coding order. According to solution 17, first the parent blocks that are smaller than a specified threshold "Thr" of Block 1 and Block 2 are determined in a recursive manner. Parent1.1 represents the parent block of Block 1 and parent1.2 represents the parent block of parent1.1, and so on. Similarly parent 2.1 represents the parent block of Block 2.

If a parent block of Block1 is the same block of a parent block of Block 2, and if the parent block is smaller than Thr in size, then the motion information of Block 1 is set unavailable for prediction by Block 2.

Similarly FIG. 23 can also be used to explain the Solution 17, where the size comparison is replaced by a comparison based on the number of quadtree, binary tree and ternary tree splitting operations that were performed in order to obtain the parent block.

Solution 18:

According to solution 18, two leaf node blocks (block 1 and block 2) are considered to be in the same MPM estimation region based on following steps:

Step 1: Defining the CTU of the block 1 (or block 2) as a parent block of block 1.

Step 2: If the parent block does not contain the block 2 (or block1), the two leaf node blocks are NOT considered to be in the same MPM estimation region. The following steps are not performed and the checking process is terminated;

Otherwise (if the parent block contains both block 1 and block 2), if the parent block contains the block 2 (or block 1), the parent block size is checked as follows:

Step 3:

If the size of the parent block is equal to a threshold, the two leaf node blocks (block 1 and block 2) are determined to be in the same MPM estimation region, the parent block is defined as the MPMER. Checking process is terminated.

Step 4:

If the size of the parent block is determined not to be equal to the said threshold in Step 3:

If the current split mode of the parent block is binary tree split, then the parent block split according to the current split mode of the parent block (binary tree split) and the resulting child block which contains block 1 (or block 2) is updated as parent block, the updated parent block is recursively checked by going to the step 2.

If the current split mode of the parent block is ternary tree split and the parent block size is equal to the said threshold multiplied by 2, the two leaf node blocks are determined to be in the same MPM estimation region, the parent block is defined as the MPMER.

If the current split mode of the parent block is quadtree split, and the parent block size is equal to the said threshold multiplied by 2, and the two leaf node blocks are both located in the top-half of the parent block, the two leaf node blocks are determined to be in the same MPM estimation region, the top half of the parent block is defined as the MPMER If the current split mode of the parent block is quadtree split and the parent block size is equal to the said threshold multiplied by 2, and the two leaf node blocks are both located in the bottom-half of the parent block, the two leaf node blocks are determined to be in the same MPM estimation region, the bottom half of the parent block is defined as the MPMER.

Step 5: If none of the conditions (listed as bullet items) are satisfied in Steps 3 and 4, the parent block is split according to the current split mode of the parent block and the resulting child block which contains block 1 (or block 2) is updated as parent block, the updated parent block is recursively checked by going to the step 2. After the parent block is split into child blocks according to the splitting mode of the parent block, if the two blocks (block 1 and block 2) are not located in a same child block, then the block 1 and block 2 are determined not to belong the same MPMER and the checking process is terminated.

The location of the two leaf node blocks can be determined by using the coordinator of the top-left samples. For example if both of the vertical coordinators of the top-left samples of the two leaf blocks are smaller than the vertical coordinator of the top-left sample of the parent block plus half of the height of the parent block, the two leaf blocks are considered to be included in the top half part of the parent block. The two leaf node blocks are located in the left half of the parent block, if both of the vertical coordinators of the top-left samples of the two leaf blocks are greater than the vertical coordinator of the top-left sample of the parent block plus half of the height of the parent block, the two leaf blocks are considered to be included in the bottom half part of the parent block.

In another example, if above conditions are not satisfied, the two leaf blocks are considered to be not in the same MPM estimation region.

In one embodiment, if the two leaf blocks are determined to be in the same MPM estimation region, intra prediction mode of the first leaf block in coding order is set unavailable for prediction by the second block, otherwise the intra prediction mode of the first leaf block is set available for prediction by the second block.

In one embodiment, if the two leaf blocks are (Block 1 and Block 2) determined to be in the same MPM estimation region, the MPM list of the Block 1 and Block 2 are constructed based on the spatial neighbor blocks of the MPMER, and the intra prediction mode of Block 1 is not used by Block 2. Spatial neighbor blocks of the MPMER are blocks that are spatially adjacent to the MPMER and are outside of the MPMER. Accordingly, the intra prediction mode of spatial neighbor blocks of the MPMER are used in the MPM list construction process of Block 1 and Block 2, however the intra prediction mode of block 1 is not used in the MPM list construction of Block 2 (assuming that the coding order is Block 1 followed by Block 2).

In one embodiment, if the two leaf blocks are (Block 1 and Block 2) determined to be in the same MPM estimation region, a single MPM list is constructed based on the spatial neighbor blocks of the MPMER and the two blocks use the said MPM list. In this example, the same MPM list is used by the Block 1 and Block 2, the MPM list is constructed based on the spatial neighbor blocks of the MPMER.

It is noted that due to the recursive splitting process, a leaf block might have more than one parent block at different hierarchy levels (direct parent, parent of parent etc.). According to the solution 18, if there is at least one parent block (at any hierarchy level) that contains the two leaf blocks, they (the two leaf blocks) are considered to belong to the same parent block. Moreover the hierarchy level might be different for the two leaf blocks, meaning that number of splitting operations starting from the parent block to obtain the leaf block might be different for the two leaf blocks.

According to one implementation, the threshold mentioned in the above examples is computed as the number of pixel samples inside a parent coding block, which is computed as width multiplied by height of that coding block. According to another implementation, the threshold is a positive integer number and the size of a block is computed based on the width of the block. According to another implementation, the threshold is a positive integer number and the size of a block is computed based on the width or height of the block. In general, the size of a block is computed based on the width and the height of the block, taking both of them into account.

In one embodiment, the threshold is a positive integer number, where the threshold is equal to 2 power of (2N) or 2 power of (2N+1), the N is a positive integer number and the lower bound of N is log 2(MinCbSize). The log 20 is the binary logarithm scaling operation. And the MinCbSize denotes the minimally allowed coding block size of the codec, which is predefined or indicated in the bitstream. In the VVC standard draft document JVET-L1001-v1, Versatile Video Coding (Draft 3), MinCbSize is defined and used.

Solution 19:

According to solution 19, two leaf blocks are considered to be in the same MPM estimation region based on following steps:

Step 1: Defining the CTU of the block 1 (or block 2) as a parent block of block 1.

Step 2: If the parent block does not contain the block 2 (or block1), the two leaf node blocks are NOT considered to be in the same MPM estimation region. The following steps are not performed and the checking process is terminated;

Otherwise (if the parent block contains both block 1 and block 2), if the parent block contains the block 2 (or block 1), the parent block size is checked as follows:

Step 3:

If the number of splitting operations that are performed in order to obtain the parent block are equal to a threshold, then the two leaf node blocks (block 1 and block 2) are determined to be in the same mpm estimation region and the parent block is defined as the MPMER. Checking process is terminated.

Step 4:

If the number of splitting operations that are performed in order to obtain the parent block is not equal to the said threshold in Step 3:

If the current split mode of the parent block is binary tree split, then the parent block split according to the current split mode of the parent block (binary tree split) and the resulting child block which contains block 1 (or block 2) is updated as parent block, the updated parent block is recursively checked by going to the step 2.

If the current split mode of the parent block is ternary tree split and the number of splitting operations that are performed in order to obtain the parent block are equal to the threshold minus 1, then the two leaf node blocks are determined to be in the same MPM estimation region, the parent block is defined as the MPMER.

If the current split mode of the parent block is quadtree split and the number of splitting operations that are performed in order to obtain the parent block are equal to the said threshold minus 1, and the two leaf node blocks are both located in the top-half of the parent block, the two leaf node blocks are determined to be in the same MPM estimation region, the top half of the parent block is defined as the MPMER.

If the current split mode of the parent block is quadtree split and the number of splitting operations that are performed in order to obtain the parent block are equal to the said threshold minus 1, and the two leaf node blocks are both located in the bottom-half of the parent block, the two leaf node blocks are determined to be in the same MPM estimation region, the bottom half of the parent block is defined as the MPMER.

Step 5: If none of the conditions (listed as bullet items) are satisfied in Steps 3 and 4, the parent block is split according to the current split mode of the parent block and the resulting child block which contains block 1 (or block 2) is updated as parent block, the updated parent block is recursively checked by going to the step 2. After the parent block is split into child blocks according to the splitting mode of the parent block, if the two blocks (block 1 and block 2) are not located in a same child block, then the block 1 and block 2 are determined not to belong the same MPMER and the checking process is terminated.

The location of the two leaf node blocks can be determined by using the coordinator of the top-left samples. For example, if both of the vertical coordinators of the top-left samples of the two leaf blocks are smaller than the vertical coordinator of the top-left sample of the parent block plus half of the height of the parent block, the two leaf blocks are considered to be included in the top half part of the parent block. The two leaf node blocks are located in the left half of the parent block, if both of the vertical coordinators of the top-left samples of the two leaf blocks are greater than the vertical coordinator of the top-left sample of the parent block plus half of the height of the parent block, the two leaf blocks are considered to be included in the bottom half part of the parent block. In another example, if above conditions is not satisfied, the two leaf blocks are considered to be not in the same MPM estimation region.

If the two leaf blocks are considered to be in the same MPM estimation region, intra prediction mode of the first block in coding order is set unavailable for prediction by the second block. If the two leaf blocks are considered to be not in the same MPM estimation region, the intra prediction mode of the first block is set available for prediction by the second block.

In one embodiment, if the two leaf blocks are (Block 1 and Block 2) determined to be in the same MPM estimation region, the MPM list of the Block 1 and Block 2 are constructed based on the spatial neighbor blocks of the MPMER, and the intra prediction mode of Block 1 is not used by Block 2. Spatial neighbor blocks of the MPMER are blocks that are spatially adjacent to the MPMER and are outside of the MPMER. Accordingly, the intra prediction mode of spatial neighbor blocks of the MPMER are used in the MPM list construction process of Block 1 and Block 2, however the intra prediction mode of block 1 is not used in the MPM list construction of Block 2 (assuming that the coding order is Block 1 followed by Block 2).

In one embodiment, if the two leaf blocks are (Block 1 and Block 2) determined to be in the same MPM estimation region, a single MPM list is constructed based on the spatial neighbor blocks of the MPMER and the two blocks use the said MPM list. In this embodiment, the same MPM list is used by the Block 1 and Block 2, which is constructed based on the spatial neighbor blocks of the MPMER According to solution 19, the threshold comparison is performed based on the number of quadtree, binary tree and ternary tree splitting operations that were performed in order to obtain the parent block. As an example, assume that the number of quadtree splitting operations that are performed to obtain the parent block is represented by qtDepthThr and the number of binary and ternary tree splitting operations that are performed are represented collectively by mttDepth (the terms qtDepth and mttDepth are used according to the document JVET-L1001-v1, Versatile Video Coding (Draft 3), which can be obtained from the website http://phenix.it-sudparis.eujvet. qtDepth denotes the quadtree partition depth, which is equivalent to number of quadtree splitting operations that are performed to obtain a block. mttDepth denotes the multi-type tree partition depth, which is equivalent to number of binary tree and ternary tree splitting operations that are performed to obtain a block). In JVET-L1001-v1 for example, for the children blocks resulting from binary tree split, the mttDepth is increased by 1. For the middle (big) child block resulting from the ternary tree split, the mttDetph is increased by 1. For the bot side (small) children block resulting from the ternary tree split, the mttDepth is increased by 2. Then according to solution 19, any two leaf blocks that belong to the same parent block are considered to be in the same MER if the qtDepth plus K multiplied by mttDepth is greater than a specified threshold value (K×qtDepth+mttDepth>Thr). K and Thr can be an integer number 0, 1, 2, . . . K and the threshold value can be predetermined or signaled in the bitstream. In one implementation, K has a predetermined value of 2.

The counting of number of quadtree, binary tree and ternary tree splitting operations can be explained using FIG. 10 and FIG. 11. As an example block 34 has been obtained by one quadtree splitting of block 50. According to FIG. 11 block 34 is a leaf block, which was obtained by one quadtree splitting operation and zero ternary and zero binary splitting operations.

According to FIG. 11, block 45 has been obtained by two quadtree splitting operations and one binary tree splitting operation. Block 50 (which is the CTB) is first split using quadtree splitting to obtain block 58, block 58 is split using quadtree splitting to obtain block 62 and finally block 62 is split using binary splitting to obtain block 45.

It is noted that the number of splitting operations are counted with respect to the coding tree block (CTB) which is considered as the starting point of the splitting operation.

Figure 29:
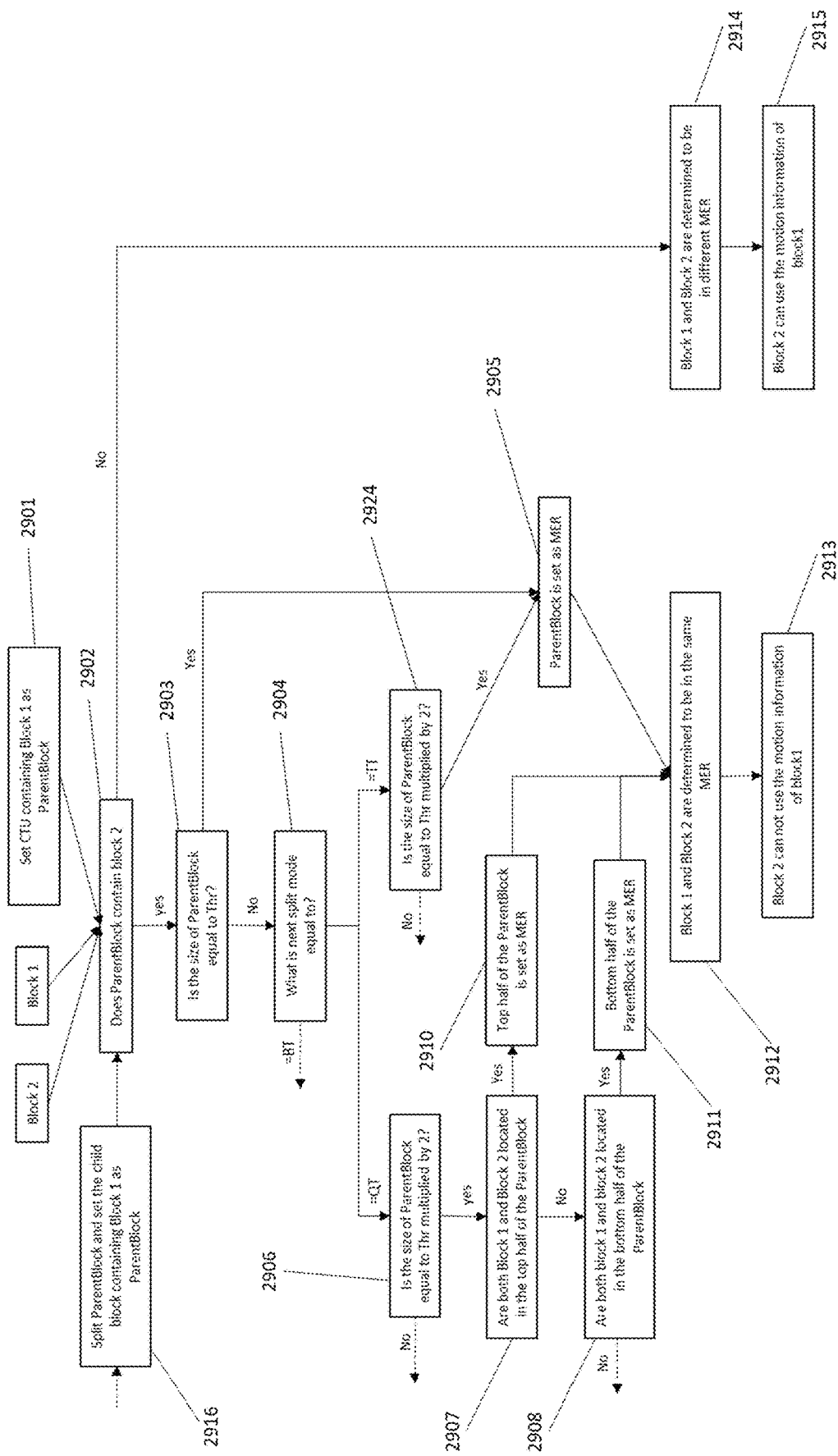
FIG. 29 illustrate an example of the flowchart of one solution.

Explanation of Solutions 18 and 19:

The FIG. 29 illustrates the flowchart of solutions 18 and 19. In order to determine if two blocks belong to a same MPMER (and the MPMER that the two blocks both belong to), the following ordered steps are performed:

Set the CTU that contains the block 1 as ParentBlock according to 2901.

Check if the ParentBlock comprises block 2 according to 2902. If no, Blocks 1 and 2 are determined to not belong to a same MPMER (2914). If yes the size of the ParentBlock is checked.

If the size (or the number of splitting operations that are performed to obtain the ParentBlock) of the ParentBlock is equal to a threshold (According to 2903), then the parentBlock is set as MPMER (according to 2905) and Block 1 and Block 2 are determined to be in the same MPMER (2912). Otherwise (if the result of the checking step 2903 is negative), the split mode of the parentBlock is checked.

If the split mode of parentBlock is binary Split (=BT branch) in step 2904, then the ParentBlock is split and set the child block containing Block 1 as ParentBlock (according to 2916). The checking process is repeated for the new parent-Block starting with step 2902.

If the split mode of parentBlock is Ternary Split (=TT branch) in step 2904 and if the size of ParentBlock equal to Thr multiplied by 2 (according to step 2924), then the parentBlock is set as MER (according to 2905) and Block 1 and Block 2 are determined to be in the same MPMER (2912). Otherwise (if the result of the checking step 2924 is negative), then the ParentBlock is split according to ternary split and the child block containing Block 1 is set as ParentBlock (according to 2916). The checking process is repeated for the new parentBlock starting with step 2902.

If the split mode of parentBlock is Quadtree Split (=QT branch) in step 2904 and if the size of ParentBlock equal to Thr multiplied by 2 (according to 2906), then the next checking step is performed (2907). Otherwise (if the result of the checking step 2906 is negative), then the ParentBlock is split according to Quadtree split and the child block containing Block 1 is set as ParentBlock (according to 2916). The checking process is repeated for the new parent-Block starting with step 2902.

Step 2907 checks whether blocks 1 and 2 are both located in the upper half of the parent block. If determined positively Top half of the ParentBlock is set as MPMER (2910) and Block 1 and Block 2 are determined to be in the same MPMER (2912).

If the result of the checking step in 2907 is negative, 2908 is performed.

Step 2908 checks whether blocks 1 and 2 are both located in the bottom half of the parent block. If determined positively bottom half of the ParentBlock is set as MPMER (2911) and Block 1 and Block 2 are determined to be in the same MPMER (2912). If the result of the checking step in 2908 is negative, ParentBlock is split according to Quadtree split and the child block containing Block 1 is set as ParentBlock (according to 2916).

Solution 20:

According to the solution 12-19, if the current split mode of the determined current parent block is quadtree, and if the two leaf node blocks are both located in left half of the parent block, the left half part of the parent block is defined as MPMER.

According to the solutions 12-19, if the current split mode of the determined current parent block is quadtree, and if the two leaf node blocks are both located in right half of the parent block, the right half part of the parent block is defined as MPMER.

The location of the two leaf node blocks can be determined by using the coordinator of the top-left samples. For example, if both of the horizontal coordinators of the top-left samples of the two leaf blocks are smaller than the horizontal coordinator of the top-left sample of the parent block plus half of the width of the parent block, the two leaf blocks are determined to be in the left half of the parent block. If both of the horizontal coordinators of the top-left samples of the two leaf blocks are greater than or equal to the horizontal coordinator of the top-left sample of the parent block plus half of the width of the parent block, the two leaf node blocks are determined to be located in the right half of the parent block.

Solution 21

According to the solution 12-19, if the current split mode of the determined current parent block is quadtree, one of the leaf node block is located in the top-left quarter of the current parent block, the other one of the leaf node block is located in the right-bottom quarter of the current parent block, the top-left quarter plus right-bottom quarter region is defined as MPMER.

The location of the two leaf node blocks can be determined by using the coordinator of the top-left samples. For example, if the horizontal coordinators of the top-left samples of the two leaf blocks are smaller than the horizontal coordinator of the top-left sample of the parent block plus half of the width of the parent block, the vertical coordinators of the top-left samples of the two leaf blocks are smaller than the vertical coordinator of the top-left sample of the parent block plus half of the height of the parent block, this block is located in top-left quarter the parent block.

if the horizontal coordinators of the top-left samples of the two leaf blocks are greater than the horizontal coordinator of the top-left sample of the parent block plus half of the width of the parent block, the vertical coordinators of the top-left samples of the two leaf blocks are greater than the vertical coordinator of the top-left sample of the parent block plus half of the height of the parent block, this block is located in bottom-right quarter the parent block.

Solution 22

According to the solution 12-19, if the current split mode of the determined current parent block is quadtree, one of the leaf node block is located in the bottom-left quarter of the current parent block, the other one of the leaf node block is located in the right-top quarter of the current parent block, the bottom-left quarter plus right-top quarter region is defined as MPMER.

The location of the two leaf node blocks can be determined by using the coordinator of the top-left samples. For example, if the horizontal coordinators of the top-left samples of the two leaf blocks are smaller than the horizontal coordinator of the top-left sample of the parent block plus half of the width of the parent block, the vertical coordinators of the top-left samples of the two leaf blocks are greater than the vertical coordinator of the top-left sample of the parent block plus half of the height of the parent block, this block is located in bottom-left quarter the parent block.

if the horizontal coordinators of the top-left samples of the two leaf blocks are greater than the horizontal coordinator of the top-left sample of the parent block plus half of the width of the parent block, the vertical coordinators of the top-left samples of the two leaf blocks are smaller than the vertical coordinator of the top-left sample of the parent block plus half of the height of the parent block, this block is s located in top-right quarter the parent block.

Solution 23:

According to the solution 12-19, if the current split mode of the determined current parent block is quadtree, the whole parent block is defined as MPMER. In other words, the corresponding checking operation for parent block with current split mode equal to quadtree split is changed alternatively as follows:

"Otherwise, if the current split mode of the parent block is quadtree split and the parent block size is equal to the said threshold multiplied by 2, and the two leaf node blocks are both located in the parent block, the two leaf node blocks are considered to be in the same merge estimation region and the parent block is defined as the MPMER."

The other steps are identical and are not repeated here for the sake of brevity.

Solution 24:

According to the solution 12-19, if the current split mode of the determined current parent block is ternary tree, the parent block size is equal to the said threshold multiplied by 2, and if the two leaf node blocks are both located in left ¼ part of the parent block, then the left ¼ part of the parent block is defined as MPMER and the two blocks (block 1 and 2) are determined to be located in the same MPMER.

According to the solutions 12-19, if the current split mode of the determined current parent block is ternary tree, the parent block size is equal to the said threshold multiplied by 2, and if the two leaf node blocks are both located in right ¾ part of the parent block, then the right ¾ part of the parent block is defined as MPMER and the two blocks (block 1 and 2) are determined to be located in the same MPMER.

The location of the two leaf node blocks can be determined by using the coordinator of the top-left samples. For example if both of the horizontal coordinators of the top-left samples of the two leaf blocks are smaller than the horizontal coordinator of the top-left sample of the parent block plus ¼ of the width of the parent block, the two leaf blocks are determined to be in the left ¼ of the parent block. If both of the horizontal coordinators of the top-left samples of the two leaf blocks are greater than or equal to the horizontal coordinator of the top-left sample of the parent block plus ¼ of the width of the parent block, the two leaf node blocks are determined to be located in the right ¾ of the parent block.

Solution 25:

According to the solution 12-19, if the current split mode of the determined current parent block is ternary tree, and if the two leaf node blocks are both located in top % part of the parent block, the top ¼ part of the parent block is defined as MPMER.

According to the solutions 12-19, if the current split mode of the determined current parent block is ternary tree, and if the two leaf node blocks are both located in bottom % part of the parent block, the bottom ¾ part of the parent block is defined as MPMER.

Solution 26: According to solutions 24 and 25, the left (top) % to right (bottom) % partition rule can be changed to left (top) % and right (bottom) %.

Solution 27:

According to the solution all of the solutions above, if the two leaf blocks are (Block 1 and Block 2) determined to be in the same merge estimation region, the merge list of the Block 1 and Block 2 are constructed based on the spatial neighbor blocks of the determined MPMER (that comprises Block 1 and Block 2) and the motion information of Block 1 is not used by Block 2. Spatial neighbor blocks of the MER are blocks that are spatially adjacent to the MER and are outside of the MER.

Accordingly the motion information of spatial neighbor blocks of the MPMER are used in the merge list construction process of Block 1 and Block 2, however the motion information of block 1 is not used in the merge list construction of Block 2 (assuming that the coding order is Block 1 followed by Block 2).

Alternatively if the two leaf blocks are (Block 1 and Block 2) determined to be in the same MPM estimation region, a single MPM list is constructed based on the spatial neighbor blocks of the determined MPMER (that comprises Block 1 and Block 2) and the two blocks use the said MPM list (inter prediction process is performed according to the said MPM list). The said MPM list can be called a shared MPM list, since the MPM list is shared by two blocks. In this alternative, compared to the previous alternative) the same MPM list is used by the Block 1 and Block 2, which is constructed based on the spatial neighbor blocks of the MPMER.

The solutions 10 to 27 describe how two blocks are determined to belong to the same MER. According to any one of the solutions 10 to 27:

If the two leaf blocks are determined to be in the same merge estimation region, motion information of the first leaf block in coding order is set unavailable for prediction by the second block. Otherwise the motion information of the first leaf block is set available for prediction by the first block.

Alternatively if the two leaf blocks are (Block 1 and Block 2) determined to be in the same merge estimation region, one merge list is constructed (denoted as "shared merge list") and the shared merge list is used to predict both blocks. In other words if two blocks are determined to be included in the same MER, a single merge list is used in the prediction of the Block 1 and Block 2, whereas the shared merge list does not include the motion information of Block 1 and Block2. Otherwise (if Block 1 and Block 2 are determined to be not included in the same MER), two merge lists are constructed for Block 1 and Block 2 whereas the merge list of Block 2 might include the motion information of Block 1 (assuming that the coding order is Block 1 followed by Block 2).

The solutions 10 to 27 can also be used for MPM estimation region determination, In other words, the MPM estimation region describes how two blocks are determined to belong to the same MPM region, according to any of the solution 10 to 27.

If the two leaf blocks are determined to be in the same MPM estimation region, intra mode of the first leaf block in coding order is set unavailable for prediction by the second block. Otherwise, the intra mode of the first leaf block is set available for prediction by the first block.

Alternatively, if the two leaf blocks (Block 1 and Block 2) are both used intra prediction mode or both in the intra frame and they are in the same MPM estimate region. Instead of constructing 2 separate MPM list for both block 1 and block 2, in the embodiment only one MPM list is constructed based on the MPM estimation region, the constructed MPM list used to predict the intra mode for both blocks. In other words, if two block are determined to be included in the same MPM estimation region, a single MPM list is used in the intra mode prediction of the block 1 and block2, whereas the shared MPM list does not include the intra mode of Block 1 and Block2. Otherwise (if Block 1 and Block 2 are determined to be not included in the same MPM estimation region), two MPM lists are constructed for Block 1 and Block 2 whereas the MPM list of Block 2 might include the intra mode of Block 1 (assuming that the coding order is Block 1 followed by Block 2).

In general, if two blocks are determined to be in the same MER, the motion information of one block cannot be used in the prediction of the second block. Otherwise (if two blocks are determined to be not included in the same MER), the motion information of one of the block might be used in the prediction of the second block.

Compared to the solutions 10 and 11, in the solutions 12-27, in one case that number of only one sequential merge list construction processes are necessary for a given MER size (given by number of samples). Which means that in the case of Method 1 and Method 2 (where Block 1 is set unavailable for prediction by Block 2, which are determined to be in the same MER), although 2 merge lists need to be constructed, one to be used by Block 1 and the other merge list to be used by Block 2, the 2 merge lists can be constructed in parallel (at the same time). In the case of Method 3 (where a single merge list is constructed for the whole MER, which is used by all blocks contained within the MER), the worst case number of merge lists construction processes per MER is equal to 1. The following example compare the solutions 10 and 12. It is noted that the MER size is given as 32 samples in the examples below.

For example, if a threshold is defined as 32, in one case, 1 sequential merge list construction process per 32 samples need to be performed. It is noted that in the case of Method 1 and Method 2, more than 1 merge list construction process might need to be performed, all of the merge list construction processes can be performed in parallel, due to the fact that all of the interdependencies in the merge list construction process are eliminated. In this case, according to the method disclosed in the solution 10, assume that the same parent block has 64 samples with width equal to 16, height equal to 4, and ternary tree is the current split mode of this block. This same parent block will be divided into 3 blocks with sizes 4×4, 8×4 and 4×4. Based on the merge estimation region definition in solution 10, these three children blocks are not located in the same merge estimation region that has a size of 32 samples. Therefore, these 3 children blocks are not determined to be in the same MER. As a result, 3 merge list construction processes per 64 samples (1.5 merge list construction processes per 32 samples) need to be performed, which is worse than 1 or 1 merge list per 32 samples.

According to the solution 10, assume that the same parent block has 64 samples with width equal to 8, height equal to 8 and quadtree split is the current split mode of this block. This same parent block will be divided into four (the block size is 4×4) blocks. Based on the merge estimation region definition in solution 10, these four children blocks are not located in the same merge estimation region (since 64 is greater than the MER size 32). Therefore, these 4 children blocks need to construct 4 merge lists sequentially (not in parallel). Namely, 4 merge list per 64 samples (2 merge list construction processes per 32 samples), which is worse than 1 merge list construction process per 32 samples.

On the other hand, according to solution 12, assume that the same parent block has 64 samples with width is 16, height is 4 and ternary tree is the current split mode of this block. This same parent block will be divided into 3 block with size 4×4, 8×4 and 4×4. Based on the merge estimation region definition in solution 12, these three children blocks are determined to be located in the same merge estimation region. Therefore, these 3 children blocks can construct their merge lists in parallel (which means one merge list construction process needs to be performed sequentially). Namely, 1 sequential merge list construction process per 64 samples (0.5 merge list per 32 samples), which is lower than the case of 1 sequential merge list construction process per 32 samples. According to the solution 12, assume that the same parent block has 64 samples with width is 8, height is 8, and quadtree split is the current split mode of this block. This same parent block will be divided into four (the block size is 4×4) blocks. Based on the merge estimation region definition in solution 12, the upper two children blocks are located in the same merge estimation region and the lower two children block are located in another same merge estimation region. Therefore, since 2 MERs are created in this case, 2 sequential merge list construction processes need to be performed. Namely, 2 merge list construction processes per 64 samples (1 merge list per 32 samples), which is equal to the case of 1 merge list construction processes per 32 samples.

The motion compensation unit is configured to obtain, e.g. receive, an inter prediction parameter and to perform inter prediction based on or using the inter prediction parameter to obtain an inter prediction block 245. Motion compensation, performed by motion compensation unit (not shown in FIG. 2), may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit 246 may locate the prediction block to which the motion vector points in one of the reference picture lists. Motion compensation unit 246 may also generate syntax elements associated with the blocks and the video slice for use by video decoder 300 in decoding the picture blocks of the video slice.

The intra prediction unit 254 is configured to obtain, e.g. receive, the picture block 203 (current picture block) and one or a plurality of previously reconstructed blocks, e.g. reconstructed neighbor blocks, of the same picture for intra estimation. The encoder 200 may, e.g., be configured to select an intra prediction mode from a plurality of (predetermined) intra prediction modes.

Example 1. A method of coding implemented by an encoding/decoding device for marking the availability of a potential candidate coding block for intra prediction mode estimation of a current coding block, comprising:

obtaining a parent block of the current coding block (denoted as parentCurr), and a parent block of a candidate coding block (denoted as parentCand), wherein the current coding block is obtained by splitting (in an example, the splitting process could be performed one or multiple times, for example, according to a recursive process) of the parentCurr, the candidate coding block is obtained by splitting (in an example, the splitting process could be performed one or multiple times, for example, according to a recursive process) of the parentCand; and the current block cannot use the intra prediction mode of the potential candidate coding block, when parentCand and parentCurr are the same block, a size of the parentCand (In an example, the size of the parentCand is obtained according to width multiplied by height of the parentCand) is equal to twice of a threshold, and when a split mode of the parent block of the current coding block is a ternary tree split.

Example 2. A method of coding implemented by an encoding/decoding device for marking the availability of a potential candidate coding block for intra prediction mode estimation of a current coding block, comprising:

obtaining a parent block of the current coding block (denoted as parentCurr), and a parent block of a candidate coding block (denoted as parentCand), wherein the current coding block is obtained by splitting (in an example, the splitting process could be performed one or multiple times, for example, according to a recursive process) of the parentCurr, the candidate coding block is obtained by splitting (in an example, the splitting process could be performed one or multiple times, for example, according to a recursive process) of the parentCand; and the current block cannot use the intra prediction mode of the potential candidate coding block, when parentCand and parentCurr are the same block, a size of the parentCand (In an example, the size of the parentCand is obtained according to width multiplied by height of the parentCand) is equal to twice of a threshold, a split mode of the parent block of the current coding block is a quadtree split, both of the vertical coordinators of the top-left samples of the current coding block and the candidate coding block are smaller than the vertical coordinator of the top-left sample of the same parent block plus half of the height of the parent block of the current coding block (or both of the horizontal coordinators of the top-left samples of the current coding block and the candidate coding block are smaller than the horizontal coordinator of the top-left sample of the same parent block plus half of the width of the parent block of the current coding block).

Example 3. A method of coding implemented by an encoding/decoding device for marking the availability of a potential candidate coding block for merge intra prediction mode of a current coding block, comprising:

obtaining a parent block of the current coding block (denoted as parentCurr), and a parent block of a candidate coding block (denoted as parentCand), wherein the current coding block is obtained by splitting (in an example, the splitting process could be performed one or multiple times, for example, according to a recursive process) of the parentCurr, the candidate coding block is obtained by splitting (in an example, the splitting process could be performed one or multiple times, for example, according to a recursive process) of the parentCand; and the current block cannot use the intra prediction mode of the potential candidate coding block, when parentCand and parentCurr are the same block, a size of the parentCand (In an example, the size of the parentCand is obtained according to width multiplied by height of the parentCand) is equal to twice of a threshold, a split mode of the parent block of the current coding block is a quadtree split, both of the vertical coordinators of the top-left samples of the current coding block and the candidate coding block are greater than the vertical coordinator of the top-left sample of the same parent block plus half of the height of the parent block of the current coding block (or both of the horizontal coordinators of the top-left samples of the current coding block and the candidate coding block are greater than the horizontal coordinator of the top-left sample of the same parent block plus half of the width of the parent block of the current coding block).

Example 4. A method of coding implemented by an encoding/decoding device for marking the availability of a potential candidate coding block for intra prediction mode estimation of a current coding block, comprising:

obtaining a parent block of the current coding block (denoted as parentCurr), and a parent block of a candidate coding block (denoted as parentCand), wherein the current coding block is obtained by splitting (in an example, the splitting process could be performed one or multiple times, for example, according to a recursive process) of the parentCurr, the candidate coding block is obtained by splitting (in an example, the splitting process could be performed one or multiple times, for example, according to a recursive process) of the parentCand; and the current block cannot use the intra prediction mode of the potential candidate coding, when parentCand and parentCurr are the same block, a function of number of quadtree, ternary tree and binary tree splitting operations that are performed to obtain parentCand block is greater than a threshold minus 1, and a split mode of the parent block of the current coding block is a ternary tree split (In an example, the function of splitting operations to obtain parentCand block greater than a threshold is implemented by K×qtDepth+mttDepth>Thr, the qtDepth indicates the number of quadtree split operations that had been performed to obtain the parentCand, mttDepth indicates the number of binary split and ternary split operations that had been performed to obtain parentCand, Thr is the threshold.

In a second example, the function of splitting operations to obtain parentCand block greater than a threshold is implemented by number of "K×quadtree splitting+number of binary tree splitting+M×number of ternary tree splitting>Thr", Thr is the threshold).

Example 5. A method of coding implemented by an encoding/decoding device for marking the availability of a potential candidate coding block for intra prediction mode estimation of a current coding block, comprising:

obtaining a parent block of the current coding block (denoted as parentCurr), and a parent block of a candidate coding block (denoted as parentCand), wherein the current coding block is obtained by splitting (in an example, the splitting process could be performed one or multiple times, for example, according to a recursive process) of the parentCurr, the candidate coding block is obtained by splitting (in an example, the splitting process could be performed one or multiple times, for example, according to a recursive process) of the parentCand; and the current block cannot use the intra prediction mode of the potential candidate coding, when parentCand and parentCurr are the same block, a function of number of quadtree, ternary tree and binary tree splitting operations that are performed to obtain parentCand block is greater than a threshold minus 1, and when a split mode of the parent block of the current coding block is a quadtree split, and both of the vertical coordinators of the top-left samples of the current coding block and the candidate coding block are smaller than the vertical coordinator of the top-left sample of the same parent block plus half of the height of the parent block of the current coding block (or both of the horizontal coordinators of the top-left samples of the current coding block and the candidate coding block are smaller than the horizontal coordinator of the top-left sample of the same parent block plus half of the width of the parent block of the current coding block)

(In an example, the function of splitting operations to obtain parentCand block greater than a threshold is implemented by K×qtDepth+mttDepth>Thr, the qtDepth indicates the number of quadtree split operations that had been performed to obtain the parentCand, mttDepth indicates the number of binary split and ternary split operations that had been performed to obtain parentCand, Thr is the threshold.

In a second example, the function of splitting operations to obtain parentCand block greater than a threshold is implemented by number of "quadtree splitting+K×number of binary tree splitting+M×number of ternary tree splitting>Thr", Thr is the threshold).

Example 6. A method of coding implemented by an encoding/decoding device for marking the availability of a potential candidate coding block for intra prediction mode estimation of a current coding block, comprising:
obtaining a parent block of the current coding block (denoted as parentCurr), and a parent block of a candidate coding block (denoted as parentCand), wherein the current coding block is obtained by splitting (in an example, the splitting process could be performed one or multiple times, for example, according to a recursive process) of the parentCurr, the candidate coding block is obtained by splitting (in an example, the splitting process could be performed one or multiple times, for example, according to a recursive process) of the parentCand; and the current block cannot use the intra prediction mode of the potential candidate coding, when parentCand and parentCurr are the same block, a function of number of quadtree, ternary tree and binary tree splitting operations that are performed to obtain parentCand block is greater than a threshold minus 1, and when a split mode of the parent block of the current coding block is a quadtree split, and both of the vertical coordinators of the top-left samples of the current coding block and the candidate coding block are greater than the vertical coordinator of the top-left sample of the same parent block plus half of the height of the parent block of the current coding block (or both of the horizontal coordinators of the top-left samples of the current coding block and the candidate coding block are greater than the horizontal coordinator of the top-left sample of the same parent block plus half of the width of the parent block of the current coding block)

(In an example, the function of splitting operations to obtain parentCand block greater than a threshold is implemented by K×qtDepth+mttDepth>Thr, the qtDepth indicates the number of quadtree split operations that had been performed to obtain the parentCand, mttDepth indicates the number of binary split and ternary split operations that had been performed to obtain parentCand, Thr is the threshold.

In a second example, the function of splitting operations to obtain parentCand block greater than a threshold is implemented by number of "quadtree splitting+K×number of binary tree splitting+M×number of ternary tree splitting>Thr", Thr is the threshold).

Example 7. A method of coding implemented by an encoding/decoding device for marking the availability of a potential candidate coding block for intra prediction mode estimation of a current coding block, comprising:
obtaining a parent block of the current coding block (denoted as parentCurr), and a parent block of a candidate coding block (denoted as parentCand), wherein the current coding block is obtained by splitting (in an example, the splitting process could be performed one or multiple times, for example, according to a recursive process) of the parentCurr, the candidate coding block is obtained by splitting (in an example, the splitting process could be performed one or multiple times, for example, according to a recursive process) of the parentCand; and
the current block cannot use the intra prediction mode of the potential candidate coding, when parentCand and parentCurr are the same block, and when a size of the parentCand (In an example, the size of the parentCand is obtained according to width multiplied by height of the parentCand) is smaller than or equal to a threshold.

Example 8. A method of coding implemented by an encoding/decoding device for marking the availability of a potential candidate coding block for intra prediction mode estimation of a current coding block, comprising:
obtaining a parent block of the current coding block (denoted as parentCurr), and a parent block of a candidate coding block (denoted as parentCand), wherein the current coding block is obtained by splitting (in an example, the splitting process could be performed one or multiple times, for example, according to a recursive process) of the parentCurr, the candidate coding block is obtained by splitting (in an example, the splitting process could be performed one or multiple times, for example, according to a recursive process) of the parentCand:
the current block cannot use the intra prediction mode of the potential candidate coding, when parentCand and parentCurr are the same block, and when a function of number of quadtree, ternary tree and binary tree splitting operations that are performed to obtain parentCand block is greater than a threshold (In an example, the function of splitting operations to obtain parentCand block greater than a threshold is implemented by K×qtDepth+mttDepth>Thr, the qtDepth indicates the number of quadtree split operations that had been performed to obtain the parentCand, mttDepth indicates the number of binary split and ternary split operations that had been performed to obtain parentCand, Thr is the threshold.

In a second example, the function of splitting operations to obtain parentCand block greater than a threshold is implemented by number of "quadtree splitting+K×number of binary tree splitting+M×number of ternary tree splitting>Thr", Thr is the threshold).

Example 9. A method of coding implemented by an encoding/decoding device for marking the availability of a potential candidate coding block for intra prediction mode estimation of a current coding block, comprising:
obtaining a parent block of the current coding block (denoted as parentCurr), and a parent block of a candidate coding block (denoted as parentCand), wherein the current coding block is obtained by splitting (in an example, the splitting process could be performed one or multiple times, for example, according to a recursive process) of the parentCurr, the candidate coding block is obtained by splitting (in an example, the splitting process could be performed one or multiple times, for example, according to a recursive process) of the parentCand; and the current block cannot use the intra prediction mode of the potential candidate coding block, when parentCand and parentCurr are the same block, a size of the parentCand (In an example, the size of the parentCand is obtained according to width multiplied by height of the parentCand) is equal to twice of a threshold, a split mode of the parent block of the current coding block is a quadtree split.

Example 10. A method according to any one of examples 1 to 9, wherein the intra prediction mode of the candidate coding block is not used in the prediction of the current block when the potential candidate coding block is marked unavailable.

Example 11. A method according to any one of examples 1 to 10, wherein the intra prediction mode of the candidate coding block is not used in the prediction of the current block when the current block is predicted using intra prediction mode and when the potential candidate coding block is marked unavailable.

Example 12. A method according to any one of examples 4 to 11, K is equal to 2.

Example 13. A method according to example 12, K is a positive integer number or zero.

Example 14. A method according to any one of the examples 4 to 13, Thr is included in the bitstream and has a positive integer value or zero.

Example 15. An encoder/decoder comprising processing circuitry for carrying out the method according to any one of examples 1 to 14.

Example 16. A non-transitory computer program product comprising a program code for performing the method according to any one of examples 1 to 14.

Example 17. An encoder/decoder, comprising:
one or more processors; and
a non-transitory computer-readable storage medium coupled to the processors and storing programming for execution by the processors, wherein the programming, when executed by the processors, configures the decoder to carry out the method according to any one of examples 1 to 14.

The arithmetic right shift operation is defined as follows:
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

The binary logarithm can be defined as follows:
the binary logarithm $\log_2(n)$ is the power to which the number 2 must be raised to obtain the value n.

If $x=\log_2(n)$, then $2^x=n$

According to above definitions, the following equality holds:

floor (X/mer_width)=X>log 2_mer_width, where log 2_mer_width is the binary logarithm of mer_width.

Embodiments of the encoder 200 may be configured to select the intra-prediction mode based on an optimization criterion, e.g. minimum residual (e.g. the intra-prediction mode providing the prediction block 255 most similar to the current picture block 203) or minimum rate distortion.

The intra prediction unit 254 is further configured to determine based on intra prediction parameter, e.g. the selected intra prediction mode, the intra prediction block 255. In any case, after selecting an intra prediction mode for a block, the intra prediction unit 254 is also configured to provide intra prediction parameter, i.e. information indicative of the selected intra prediction mode for the block to the entropy encoding unit 270. In one example, the intra prediction unit 254 may be configured to perform any combination of the intra prediction techniques described later.

The entropy encoding unit 270 is configured to apply an entropy encoding algorithm or scheme (e.g. a variable length coding (VLC) scheme, an context adaptive VLC scheme (CALVC), an arithmetic coding scheme, a context adaptive binary arithmetic coding (CABAC), syntax-based context-adaptive binary arithmetic coding (SBAC), probability interval partitioning entropy (PIPE) coding or another entropy encoding methodology or technique) on the quantized residual coefficients 209, inter prediction parameters, intra prediction parameter, and/or loop filter parameters, individually or jointly (or not at all) to obtain encoded picture data 21 which can be output by the output 272, e.g. in the form of an encoded bitstream 21. The encoded bitstream 21 may be transmitted to video decoder 30, or archived for later transmission or retrieval by video decoder 30. The entropy encoding unit 270 can be further configured to entropy encode the other syntax elements for the current video slice being coded.

Other structural variations of the video encoder 200 can be used to encode the video stream. For example, a non-transform based encoder 200 can quantize the residual signal directly without the transform processing unit 206 for certain blocks or frames. In another implementation, an encoder 200 can have the quantization unit 208 and the inverse quantization unit 210 combined into a single unit.

FIG. 3 shows an exemplary video decoder 300 that is configured to implement the techniques of this present application. The video decoder 300 configured to receive encoded picture data (e.g. encoded bitstream) 271, e.g. encoded by encoder 200, to obtain a decoded picture 331. During the decoding process, video decoder 300 receives video data, e.g. an encoded video bitstream that represents picture blocks of an encoded video slice and associated syntax elements, from video encoder 200.

In the example of FIG. 3, the decoder 300 comprises an entropy decoding unit 304, an inverse quantization unit 310, an inverse transform processing unit 312, a reconstruction unit 314 (e.g. a summer 314), a buffer 316, a loop filter 320, a decoded picture buffer 330 and a prediction processing unit 360. The prediction processing unit 360 may include an inter prediction unit 344, an intra prediction unit 354, and a mode selection unit 362. Video decoder 300 may, in some examples, perform a decoding pass generally reciprocal to the encoding pass described with respect to video encoder 200 from FIG. 2.

The entropy decoding unit 304 is configured to perform entropy decoding to the encoded picture data 271 to obtain, e.g., quantized coefficients 309 and/or decoded coding parameters (not shown in FIG. 3), e.g. (decoded) any or all of inter prediction parameters, intra prediction parameter, loop filter parameters, and/or other syntax elements. Entropy decoding unit 304 is further configured to forward inter prediction parameters, intra prediction parameter and/or other syntax elements to the prediction processing unit 360. Video decoder 300 may receive the syntax elements at the video slice level and/or the video block level.

The inverse quantization unit 310 may be identical in function to the inverse quantization unit 110, the inverse transform processing unit 312 may be identical in function to the inverse transform processing unit 112, the reconstruction unit 314 may be identical in function reconstruction unit 114, the buffer 316 may be identical in function to the buffer 116, the loop filter 320 may be identical in function to the loop filter 120, and the decoded picture buffer 330 may be identical in function to the decoded picture buffer 130.

The prediction processing unit 360 may comprise an inter prediction unit 344 and an intra prediction unit 354, wherein the inter prediction unit 344 may resemble the inter prediction unit 144 in function, and the intra prediction unit 354 may resemble the intra prediction unit 154 in function. The prediction processing unit 360 are typically configured to perform the block prediction and/or obtain the prediction block 365 from the encoded data 21 and to receive or obtain (explicitly or implicitly) the prediction related parameters and/or the information about the selected prediction mode, e.g. from the entropy decoding unit 304.

When the video slice is coded as an intra coded (I) slice, intra prediction unit 354 of prediction processing unit 360 is configured to generate prediction block 365 for a picture block of the current video slice based on a signaled intra prediction mode and data from previously decoded blocks of the current frame or picture. When the video frame is coded as an inter coded (i.e., B, or P) slice, inter prediction unit 344 (e.g. motion compensation unit) of prediction processing unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 300 may construct the reference frame lists, List 0 and List 1, using default construction techniques based on reference pictures stored in DPB 330.

Prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize, i.e., de-quantize, the quantized transform coefficients provided in the bitstream and decoded by entropy decoding unit 304. The inverse quantization process may include use of a quantization parameter calculated by video encoder 100 for each video block in the video slice to determine a degree of quantization and, likewise, a degree of inverse quantization that should be applied.

Inverse transform processing unit 312 is configured to apply an inverse transform, e.g., an inverse DCT, an inverse integer transform, or a conceptually similar inverse transform process, to the transform coefficients in order to produce residual blocks in the pixel domain.

The reconstruction unit 314 (e.g. Summer 314) is configured to add the inverse transform block 313 (i.e. reconstructed residual block 313) to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. In one example, the loop filter unit 320 may be configured to perform any combination of the filtering techniques described later. The loop filter unit 320 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 320 is shown in FIG. 3 as being an in loop filter, in other configurations, the loop filter unit 320 may be implemented as a post loop filter.

The decoded video blocks 321 in a given frame or picture are then stored in decoded picture buffer 330, which stores reference pictures used for subsequent motion compensation.

The decoder 300 is configured to output the decoded picture 311, e.g. via output 312, for presentation or viewing to a user.

Other variations of the video decoder 300 can be used to decode the compressed bitstream. For example, the decoder 300 can produce the output video stream without the loop filtering unit 320. For example, a non-transform based decoder 300 can inverse-quantize the residual signal directly without the inverse-transform processing unit 312 for certain blocks or frames. In another implementation, the video decoder 300 can have the inverse-quantization unit 310 and the inverse-transform processing unit 312 combined into a single unit.

FIG. 4 is a schematic diagram of a network device 400 (e.g., a coding device) according to an embodiment of the disclosure. The network device 400 is suitable for implementing the disclosed embodiments as described herein. In an embodiment, the network device 400 may be a decoder such as video decoder 300 of FIG. 1A or an encoder such as video encoder 200 of FIG. 1A. In an embodiment, the network device 400 may be one or more components of the video decoder 300 of FIG. 1A or the video encoder 200 of FIG. 1A as described above.

The network device 400 comprises ingress ports 410 and receiver units (Rx) 420 for receiving data, a processor, logic unit, or central processing unit (CPU) 430 to process the data; transmitter units (Tx) 440 and egress ports 450 for transmitting the data; and a memory 460 for storing the data. The network device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the network device 400 and effects a transformation of the network device 400 to a different state. Alternatively, the coding module 470 is implemented as instructions stored in the memory 460 and executed by the processor 430.

The memory 460 comprises one or more disks, tape drives, and solid-state drives and may be used as an overflow data storage device, to store programs when such programs are selected for execution, and to store instructions and data that are read during program execution. The memory 460 may be volatile and/or non-volatile and may be read-only memory (ROM), random access memory (RAM), ternary content-addressable memory (TCAM), and/or static random-access memory (SRAM).

Figure 5:
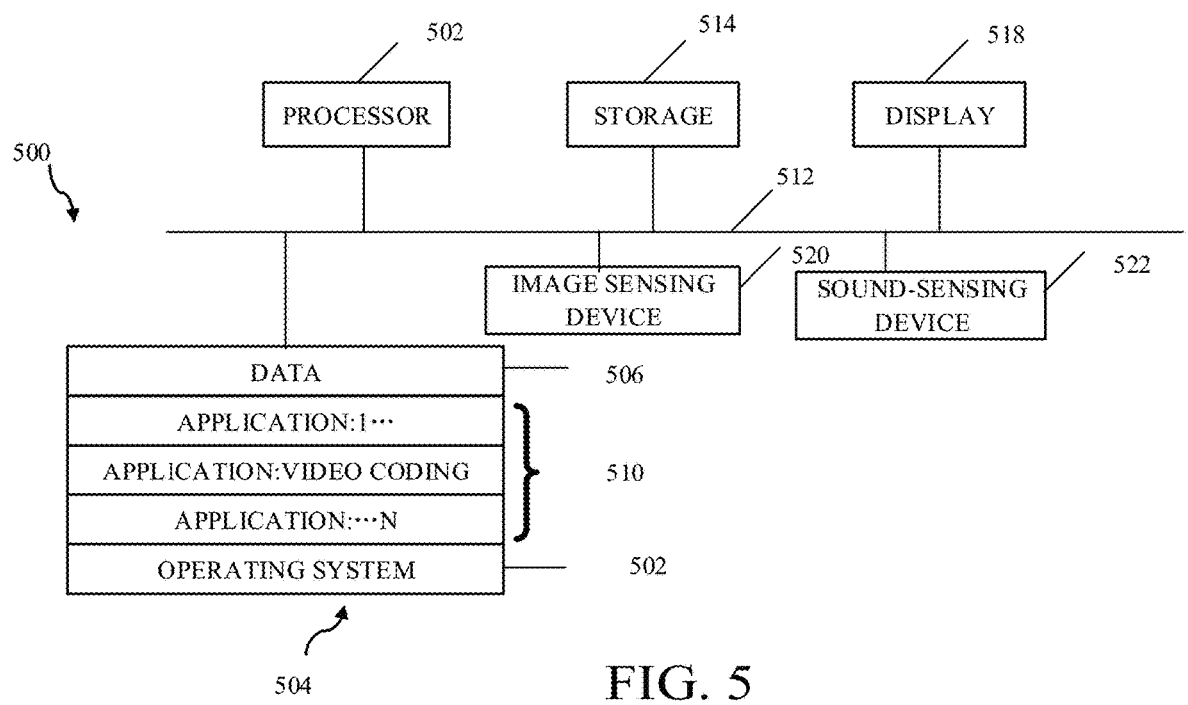
FIG. 5 is a simplified block diagram of an apparatus 500 that may be used as either or both of the source device 12 and the destination device 14 from FIG. 1A according to an exemplary embodiment.

FIG. 5 is a simplified block diagram of an apparatus 500 that may be used as either or both of the source device 12 and the destination device 14 from FIG. 1A according to an exemplary embodiment. The apparatus 500 can implement techniques of this present application. The apparatus 500 can be in the form of a computing system including multiple computing devices, or in the form of a single computing device, for example, a mobile phone, a tablet computer, a laptop computer, a notebook computer, a desktop computer, and the like.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here. The apparatus 500 can also include additional memory in the form of a secondary storage 514, which can, for example, be a memory card used with a mobile computing device. Because the video communication sessions may contain a significant amount of information, they can be stored in whole or in part in the secondary storage 514 and loaded into the memory 504 as needed for processing.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512. Other output devices that permit a user to program or otherwise use the apparatus 500 can be provided in addition to or as an alternative to the display 518. When the output device is or includes a display, the display can be implemented in various ways, including by a liquid crystal display (LCD), a cathode-ray tube (CRT) display, a plasma display or light emitting diode (LED) display, such as an organic LED (OLED) display.

The apparatus 500 can also include or be in communication with an image-sensing device 520, for example a camera, or any other image-sensing device 520 now existing or hereafter developed that can sense an image such as the image of a user operating the apparatus 500. The image-sensing device 520 can be positioned such that it is directed toward the user operating the apparatus 500. In an example, the position and optical axis of the image-sensing device 520 can be configured such that the field of vision includes an area that is directly adjacent to the display 518 and from which the display 518 is visible.

The apparatus 500 can also include or be in communication with a sound-sensing device 522, for example a microphone, or any other sound-sensing device now existing or hereafter developed that can sense sounds near the apparatus 500. The sound-sensing device 522 can be positioned such that it is directed toward the user operating the apparatus 500 and can be configured to receive sounds, for example, speech or other utterances, made by the user while the user operates the apparatus 500.

Although FIG. 5 depicts the processor 502 and the memory 504 of the apparatus 500 as being integrated into a single unit, other configurations can be utilized. The operations of the processor 502 can be distributed across multiple machines (each machine having one or more of processors) that can be coupled directly or across a local area or other network. The memory 504 can be distributed across multiple machines such as a network-based memory or memory in multiple machines performing the operations of the apparatus 500. Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of coding implemented by an encoding/decoding device, the method comprising:
   obtaining a parent block of a current coding block (denoted as parentCurr) and a parent block of a candidate coding block (denoted as parentCand);
   obtaining the current coding block by splitting of the parentCurr; and
   obtaining the candidate coding block by splitting of the parentCand, wherein the current coding block cannot use an intra prediction mode of a potential candidate coding block, when:
   the parentCand and the parentCurr are the same block,
   a function of a number of quadtree, ternary tree, and binary tree splitting operations that are performed to obtain the candidate coding block is greater than a threshold minus 1, and
   a split mode of the parentCurr is a ternary tree split.

2. The method according to claim 1, wherein the intra prediction mode of the candidate coding block is not used in a prediction of the current coding block when the potential candidate coding block is marked unavailable.

3. The method according to claim 1, wherein the intra prediction mode of the candidate coding block is not used in a prediction of the current coding block when the current coding block is predicted using intra prediction mode and when the potential candidate coding block is marked unavailable.

4. A method of coding implemented by an encoding/decoding device, the method comprising:
   obtaining a parent block of a current coding block (denoted as parentCurr) and a parent block of a candidate coding block (denoted as parentCand);
   obtaining the current coding block by splitting of the parentCurr; and
   obtaining the candidate coding block by splitting of the parentCand, wherein the current coding block cannot use an intra prediction mode of a potential candidate coding block, when:
   the parentCand and the parentCurr are the same block,
   a function of a number of quadtree, ternary tree, and binary tree splitting operations that are performed to obtain the candidate coding block is greater than a threshold minus 1, and
   a split mode of the parentCurr is a quadtree split and both vertical coordinators of top-left samples of the current coding block and the candidate coding block are smaller than a vertical coordinator of a top-left sample of the same parent block plus half of a height of the parentCurr.

5. The method according to claim 4, wherein the intra prediction mode of the candidate coding block is not used in a prediction of the current coding block when the potential candidate coding block is marked unavailable.

6. The method according to claim 4, wherein the intra prediction mode of the candidate coding block is not used in a prediction of the current coding block when the current coding block is predicted using intra prediction mode and the potential candidate coding block is marked unavailable.

7. A method of coding implemented by an encoding/decoding device, the method comprising:
   obtaining a parent block of a current coding block (denoted as parentCurr) and a parent block of a candidate coding block (denoted as parentCand);
   obtaining the current coding block by splitting of the parentCurr; and
   obtaining the candidate coding block by splitting of the parentCand, wherein the current coding block cannot use an intra prediction mode of a potential candidate coding block, when:
   the parentCand and the parentCurr are the same block,
   a function of a number of quadtree, ternary tree, and binary tree splitting operations that are performed to obtain the candidate coding block is greater than a threshold minus 1, and
   a split mode of the parentCurr is a quadtree split, and both vertical coordinators of top-left samples of the current coding block and the candidate coding block are greater than a vertical coordinator of a top-left sample of the same parent block plus half of a height of the parentCurr.

8. The method according to claim 7, wherein the intra prediction mode of the candidate coding block is not used in a prediction of the current coding block when the potential candidate coding block is marked unavailable.

9. The method according to claim 7, wherein the intra prediction mode of the candidate coding block is not used in a prediction of the current coding block when the current coding block is predicted using intra prediction mode and when the potential candidate coding block is marked unavailable.

10. A non-transitory computer program product comprising instructions which, when executed by one or more processors, cause the one or more processors to perform operations comprising:
   obtaining a parent block of a current coding block (denoted as parentCurr) and a parent block of a candidate coding block (denoted as parentCand);
   obtaining the current coding block by splitting of the parentCurr; and
   obtaining the candidate coding block by splitting of the parentCand, wherein the current coding block cannot use an intra prediction mode of a potential candidate coding block, when:
      the parentCand and the parentCurr are the same block,
      a function of a number of quadtree, ternary tree, and binary tree splitting operations that are performed to obtain the candidate coding block is greater than a threshold minus 1, and
      a split mode of the parentCurr is a ternary tree split.

11. The non-transitory computer program product according to claim 10, wherein the intra prediction mode of the candidate coding block is not used in a prediction of the current coding block when the potential candidate coding block is marked unavailable.

12. The non-transitory computer program product according to claim 10, wherein the intra prediction mode of the candidate coding block is not used in a prediction of the current coding block when the current coding block is predicted using intra prediction mode and when the potential candidate coding block is marked unavailable.

13. An encoder/decoder, comprising:
   one or more processors; and
   a non-transitory computer-readable storage medium coupled to the processors and storing instructions for execution by the processors, wherein the instructions, when executed by the one or more processors, configure the encoder/decoder to perform operations comprising:
      obtaining a parent block of a current coding block (denoted as parentCurr) and a parent block of a candidate coding block (denoted as parentCand);
      obtaining the current coding block by splitting of the parentCurr; and
      obtaining the candidate coding block by splitting of the parentCand, wherein the current coding block cannot use an intra prediction mode of a potential candidate coding block, when:
         the parentCand and the parentCurr are the same block,
         a function of a number of quadtree, ternary tree, and binary tree splitting operations that are performed to obtain the candidate coding block is greater than a threshold minus 1, and
         a split mode of the parentCurr is a ternary tree split.

14. The encoder/decoder according to claim 13, wherein the intra prediction mode of the candidate coding block is not used in a prediction of the current coding block when the potential candidate coding block is marked unavailable.

15. The encoder/decoder according to claim 13, wherein the intra prediction mode of the candidate coding block is not used in a prediction of the current coding block when the current coding block is predicted using intra prediction mode and when the potential candidate coding block is marked unavailable.

* * * * *

UNITED STATES PATENT AND TRADEMARK OFFICE
CERTIFICATE OF CORRECTION

PATENT NO. : 11,659,175 B2
APPLICATION NO. : 17/245037
DATED : May 23, 2023
INVENTOR(S) : Han Gao et al.

Page 1 of 1

It is certified that error appears in the above-identified patent and that said Letters Patent is hereby corrected as shown below:

On the Title Page

Column 1, Related U.S. Application Data (63)/Line 2 - Delete "PCT/CN2019/012295," and insert -- PCT/CN2019/0122958, --.

Signed and Sealed this
Fifteenth Day of August, 2023

Katherine Kelly Vidal
*Director of the United States Patent and Trademark Office*